US012806560B2

(12) United States Patent
Novek

(10) Patent No.: US 12,806,560 B2

(45) Date of Patent: Nov. 24, 2026

(54) SYSTEMS AND METHODS FOR SEPARATING GASES

(71) Applicant: SolvCor Technologies LLC, Houston, TX (US)

(72) Inventor: Ethan J. Novek, Houston, TX (US)

(73) Assignee: SolvCor Technologies LLC, Houston, TX (US)

( * ) Notice: Subject to any disclaimer, the term of this patent is extended or adjusted under 35 U.S.C. 154(b) by 351 days.

(21) Appl. No.: 18/595,995

(22) Filed: Mar. 5, 2024

(65) Prior Publication Data

US 2024/0269606 A1 Aug. 15, 2024

Related U.S. Application Data

(63) Continuation of application No. 17/028,340, filed on Sep. 22, 2020, now Pat. No. 11,918,953, which is a continuation of application No. 16/797,110, filed on Feb. 21, 2020, now Pat. No. 10,799,829, which is a continuation-in-part of application No. 16/226,182, filed on Dec. 19, 2018, now Pat. No. 10,576,413, which is a continuation-in-part of application No. 15/424,218, filed on Feb. 3, 2017, now abandoned.

(60) Provisional application No. 62/771,923, filed on Nov. 27, 2018, provisional application No. 62/760,155, filed on Nov. 13, 2018, provisional application No. 62/734,398, filed on Sep. 21, 2018, provisional application No. 62/375,471, filed on Aug. 16, 2016, provisional application No. 62/363,445, filed on Jul. 18, 2016, provisional application No. 62/325,620, filed on Apr. 21, 2016, provisional application No.

(Continued)

(51) Int. Cl.

| | |
|---|---|
| ***B01D 53/14*** | (2006.01) |
| ***B01D 53/26*** | (2006.01) |
| ***B01D 53/28*** | (2006.01) |
| ***H01M 8/18*** | (2006.01) |

(52) U.S. Cl.

CPC ..... *B01D 53/1475* (2013.01); *B01D 53/1425* (2013.01); *B01D 53/1431* (2013.01); *B01D 53/1487* (2013.01); *B01D 53/1493* (2013.01); *B01D 53/263* (2013.01); *B01D 53/28* (2013.01); *H01M 8/188* (2013.01); *B01D 53/1406* (2013.01); *B01D 2252/20* (2013.01); *Y02P 20/10* (2015.11)

(58) Field of Classification Search

None

See application file for complete search history.

(56) References Cited

U.S. PATENT DOCUMENTS

| | | | |
|---|---|---|---|
| 4,490,985 | A | 1/1985 | Wells |
| 2018/0043300 | A1 | 2/2018 | Subramanian |

(Continued)

FOREIGN PATENT DOCUMENTS

| | | | | | |
|---|---|---|---|---|---|
| TW | 201434751 | A | * | 9/2014 | ......... B01D 53/1418 |

OTHER PUBLICATIONS

PCT Search Report & Written Opinion (PCT/US2021/017316), dated May 31, 2021 [Cited in Parent case U.S. Appl. No. 17/028,340, filed Sep. 22, 2020).

*Primary Examiner* — Daniel Berns

(74) *Attorney, Agent, or Firm* — HUNTON ANDREWS KURTH LLP

(57) ABSTRACT

The invention pertains to processes for separating water from air. The processes may employ using an LCST solution with or without subsequent reverse osmosis, nanofiltration, or ultrafiltration.

7 Claims, 25 Drawing Sheets

Related U.S. Application Data

62/309,666, filed on Mar. 17, 2016, provisional application No. 62/290,519, filed on Feb. 3, 2016.

(56) References Cited

U.S. PATENT DOCUMENTS

| | | | | |
|---|---|---|---|---|
| 2019/0123260 | A1 | 4/2019 | Kakamu | |
| 2019/0143260 | A1 * | 5/2019 | Novek | B01D 53/1487 95/206 |

* cited by examiner

SYSTEMS AND METHODS FOR SEPARATING GASES

CROSS REFERENCE TO RELATED APPLICATIONS

The instant application is a continuation of U.S. Ser. No. 16/797,110, filed Feb. 21, 2020, which is a continuation-in-part of U.S. Ser. No. 16/226,182 filed Dec. 19, 2018 which is a continuation-in-part of U.S. Ser. No. 15/424,218 filed Feb. 3, 2017 which claims priority to U.S. Ser. No. 62/290,519 filed Feb. 3, 2016 and U.S. Ser. No. 62/309,666 filed Mar. 17, 2016 and 62/325,620 filed Apr. 21, 2016 and 62/363,445 filed Jul. 18, 2016 and 62/375,471 filed Aug. 16, 2016. The instant application also claims priority to U.S. Ser. No. 62/760,155 filed Nov. 13, 2018 and U.S. Ser. No. 62/734,398 filed Sep. 21, 2018. This application is also related to PCT/US2015/064669 filed Dec. 9, 2015 claiming priority to U.S. Ser. No. 14/826,771 filed Aug. 14, 2015 which is now U.S. Pat. No. 9,624,111 and which claims priority to U.S. Serial Nos. 62/106,822 filed Jan. 23, 2015 and 62/090,272 filed Dec. 10, 2014 and 62/159,481 filed May 11, 2015. This application is also related to U.S. Ser. No. 15/476,494 filed Mar. 31, 2017 which is currently allowed and was a divisional of U.S. Ser. No. 14/826,771 filed Aug. 14, 2015 which is now U.S. Pat. No. 9,624,111. All the aforementioned applications are incorporated herein by reference for U.S. purposes.

BACKGROUND AND SUMMARY OF INVENTION

Among human activities, $CO_2$ emissions from electricity generation and industry make up 65% of global greenhouse gas emissions. Considering the world's growing energy demand and continued dependence on fossil fuels, there is an unprecedented need to develop technologies to significantly reduce $CO_2$ emissions.

One promising means of reducing $CO_2$ emissions is post-combustion $CO_2$ capture and utilization (CCU), which transforms low concentrations of $CO_2$ in emissions into high purity $CO_2$ for utilization or disposal. However, implementation of these technologies, such as the chilled ammonia and monoethanolamine (MEA) carbon capture processes, has been limited to pilot plants due to enormous operating costs. The most effective prior art processes require elevated temperature heat, generally supplied by steam diverted from power generation, increasing electricity costs by over 70% in some cases. Elevated temperature heat constitutes >80% of the energy consumption in current carbon capture processes and is the costliest component of $CO_2$ capture. A significantly lower operating and capital cost $CO_2$ capture system is necessary to make CCU an effective means of reducing $CO_2$ emissions.

Another means of reducing $CO_2$ emissions is pre-combustion $CO_2$ capture. Pre-combustion $CO_2$ capture involves removing the carbon or carbon dioxide from fuel before combustion is completed. For example, pre-combustion $CO_2$ capture may involve transforming natural gas and water into hydrogen and $CO_2$ using steam reforming and water gas shift reaction, and subsequently separating said $CO_2$ from said hydrogen before employing said hydrogen as a fuel. Pre-combustion $CO_2$ capture, as well as other applications for acid gas separation, including, for example, $CO_2$ separation from natural gas or biogas, employ separation technologies based on physical absorption, chemical absorption, gas phase membrane separation, or adsorption. Physical absorption $CO_2$ separation technologies involve pressurized absorption of $CO_2$ into an inert solvent, such as water or an organic solvent, then the desorption of $CO_2$ under reduced pressure conditions, often with the application of heat. Prior art physical absorption $CO_2$ separation technologies consume significant electricity in the compression or pressurization of the acid gas laden gas stream and the electricity required to pump the relatively substantial amounts of liquid throughout the separation process. Current physical absorption $CO_2$ separation technologies absorb acid gas in the same liquid reagent composition and liquid phase as they desorb acid gas. As a result, a trade-off occurs—the more soluble acid gas is in a physical solvent, the more energy that is required during desorption to regenerate the physical solvent; the less soluble acid gas is in a physical solvent, the more energy that is required during the pressurization/compression during absorption. Furthermore, in prior art technologies, solubility change or absorption or desorption almost entirely driven by changing the partial pressure and/or temperature of a liquid, while the solubility parameters or properties of the liquid itself remain unchanged.

Pure $CO_2$ is a valuable product with 80 Mt per year commercial market. Due to the cost prohibitive nature of current $CO_2$ capture systems, over 80 percent of the demand for pure $CO_2$ is supplied by the unsustainable drilling of $CO_2$ source fields, which contain $CO_2$ that has been sequestered for millions of years. An effective system that captures $CO_2$ from flue gas below market prices would at least partially displace the pure $CO_2$ production from these unsustainable and counterproductive sources.

Advantageously, the present invention pertains to new highly efficient, low energy, and low-cost systems and methods to separate gases such as an acid gas (e.g., one comprising $CO_2$), a basic gas, a hydrocarbon, an inert gas, air, or a combination thereof. In one embodiment the invention involves a process for separating gas comprising absorbing one or more gases in a liquid system comprising one or more physical solvents, wherein said one or more physical solvents comprise one or more liquid phases in the liquid system. The conditions are controlled to change the number and composition of liquid phases in said liquid system. The system may exhibit a phase transition at a lower critical solution temperature, upper critical solution temperature, or both. Said phase transitions may result in a change in the equilibrium solubility or kinetics of absorption or desorption, or combination thereof of one or more gases in one or more liquid phases.

In another embodiment, the invention involves a process for separating gas comprising absorbing a first gas and a second gas with a one phase liquid solution and changing the one phase liquid solution to a second liquid solution comprising two or more phases wherein one phase of the two or more phases is selective for said first gas relative to said second gas.

In another embodiment, the invention involves process for separating gas comprising absorbing a first gas and a second gas with a liquid solution comprising two or more phases and transforming the two-phase liquid solution to a second liquid solution comprising one phase wherein the second liquid solution is selective for dissolving said first gas relative to said second gas.

In another embodiment, the invention involves a process for separating gas comprising absorbing one or more gases with a liquid solution comprising one or more physical solvents; mixing an antisolvent with said liquid solution to form a second liquid solution; desorbing at least one gas from said second liquid solution; and treating at least a portion of said second liquid solution with one or more membranes to separate antisolvent from said one or more physical solvents. These and other embodiments are described in detail below.

DETAILED DESCRIPTION OF THE INVENTION

Gas Separation—General Processes

Figure 1A:
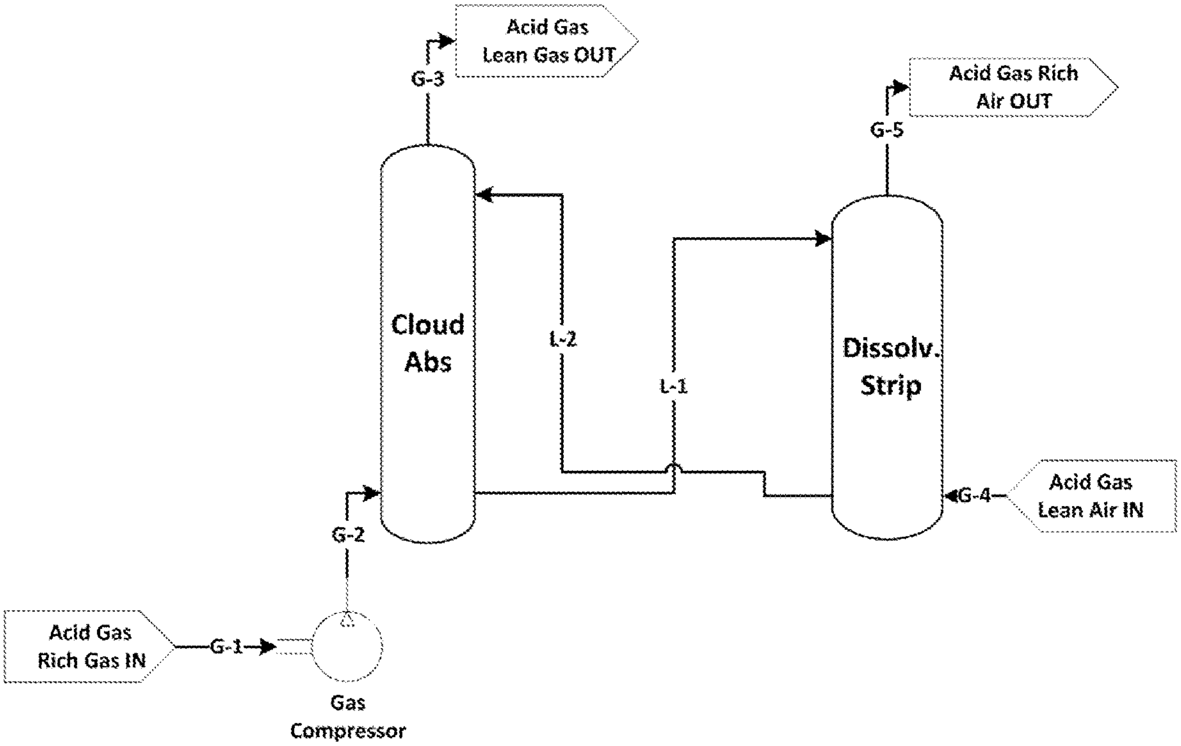
FIGS. 1A and 1B illustrate specific gas separation embodiments employing a physical solvent with the number of phases changing.

In some embodiments the present invention pertains to systems and processes for separating gases such as acid gases. In one embodiment the process involves absorbing one or more gases in a liquid system comprising one or more physical solvents. A physical solvent is generally a solvent that does not chemically react with the gas or gases being absorbed. The physical solvents employed may vary depending upon the gases to be absorbed, the conditions employed, other steps, and desired results. Suitable physical solvents may include, for example, an organic solvent, an organic polymer, or a combination thereof. The temperature and pressure of the absorbing step may vary depending upon the other conditions and the ingredients. Generally, room temperature and pressure or higher is suitable, although other temperatures and pressures may also be suitable depending upon solvent(s) and desired results.

Next, the conditions of the liquid system are controlled or modified to change the number and composition of liquid phases in said liquid system. That is, the number of liquid phases may change from one phase to two or more phases. Alternatively, or additionally, a two or more-phase system may be reduced to one phase. Similarly, the composition in the various liquid phases may change.

The change in number and composition of liquid phases may be accomplished in any convenient manner. Typically, the controlled conditions of the liquid system involve employing conditions such that the system pass through a critical solution temperature, e.g., a lower critical solution temperature, upper critical solution temperature, or both, to accomplish the desired change in number and composition of liquid phases. These changes in phases and compositions may occur before, during, or after said absorbing step. In one embodiment, during said absorbing step the liquid system changes phases at a lower critical solution temperature wherein at least a portion of any heat generated is absorbed by the endothermic phase change. At least a portion of any heat generated may be recovered in any convenient manner. For example, following said endothermic phase change into two or more liquid phases, said heat may be released prior to or during a subsequent desorbing step, wherein the two or more liquid phases undergo an exothermic phase change into a single liquid phase. In some instances, it may be desirable to include a separation step prior to and/or after the absorbing step or desorbing step. Liquid phases may be separated and/or undergo purification or treatment prior to or after absorption. Gases may be separated and/or purified prior to or after absorption or desorption.

In another embodiment the liquid system may change from two or more liquid phases to one liquid phase, for example, at or below one or more LCSTs or at or above one or more UCSTs. Said formation of one liquid phase from two or more liquid phases may occur, for example, prior to or during the desorption or absorption of one or more gases. Said formation of liquid phase from two or more liquid phases may facilitate said absorbing or desorbing. In the case of desorbing, said formation of one liquid phase from two or more liquid phases may occur in a manner such that (1) the solubility of one or more gases is reduced; (2) the partial pressure of one or more gases increased; (3) heat results to facilitate desorption; (4) the solubility of the gas to be desorbed is decreased relative to other absorbed gases; or (5) a combination thereof. In the case of absorbing, said formation of one liquid phase from two or more liquid phases may occur in a manner such that (1) the solubility of one or more gases is increased; (2) the partial pressure of one or more gases is decreased; (3) heat is absorbed to facilitate absorption; (4) the solubility of the gas to be desorbed is decreased relative to other absorbed gases; or (5) a combination thereof. The single liquid phase may be regenerated into two or more liquid phases, for example, by changing one or more conditions such that two or more liquid phases form at or above one or more LCSTs or at or below one or more UCSTs. The two or more liquid phases may be separated or remain as a liquid mixture.

Similarly, in another embodiment the liquid system may change from one liquid phase to two or more liquid phases, for example, at or above one or more LCSTs or at or below one or more UCSTs. Said formation of two liquid phases from one liquid phase may occur, for example, prior to or during the desorption or absorption of one or more gases. Said formation of two or more liquid phases from one liquid phase may facilitate said absorbing or desorbing. In the case of desorbing, said formation of two or more liquid phases from one liquid phase may occur in a manner such that (1) the solubility of one or more gases is reduced; (2) the partial pressure of one or more gases increased; (3) heat results to facilitate desorption; (4) the solubility of the gas to be desorbed is decreased relative to other absorbed gases; or (5) a combination thereof. In the case of absorbing, said formation of two or more liquid phases from one liquid phase may occur in a manner such that (1) the solubility of one or more gases is increased; (2) the partial pressure of one or more gases is decreased; (3) heat is absorbed to facilitate absorption; (4) the solubility of the gas to be desorbed is decreased relative to other absorbed gases; or (5) a combination thereof. The single liquid phase may be regenerated into two or more liquid phases, for example, by changing one or more conditions such that two or more liquid phases form at or above one or more LCSTs or at or below one or more UCSTs. The two or more liquid phases may be separated or remain as a liquid mixture.

One or more liquid phases may comprise an antisolvent and one or more liquid phases may comprise a physical solvent. An antisolvent is generally a substance which may change the solubility of or selectivity for one or more gases. Antisolvents employed, if any, will generally vary depending upon the gas or gases, ingredients of the liquid system, and desired results. Antisolvents employed to reduce the solubility of one or more gases may be selected from the group consisting of water, ionic compound, a reagent with a low gas solubility, or a combination thereof. Antisolvents employed to increase the solubility of one or more gases may be selected from the group consisting of water, ionic compound, an organic solvent, a reagent with a high gas solubility, or a combination thereof. In some embodiments antisolvent may be regenerated in a convenient manner. One manner may be to control the conditions such that at least one liquid phase comprises a substantial concentration of the antisolvent.

Other embodiments of the invention may involve separating gas by absorbing a first gas and a second gas with a one phase liquid solution the one phase liquid solution can then be changed or converted or transitioned to a second liquid solution comprising two or more phases wherein one phase of the two or more phases is selective for said first gas relative to said second gas. The one phase liquid solution may comprise one or more physical solvents, if desired. In some cases it may be desirable that one phase of the two or more liquid phases is selected such that it exhibits one or more up to all of the following properties relative to a second phase of the two or more phases (1) higher selectivity for one more gases; (2) higher concentration of one more gases; (3) greater desorption kinetics for one or more gases, (4) greater equilibrium partial pressure of one or more gases, (5) lower energy of regeneration of one or more gases; (6) higher reactivity for one or more gases; (7) higher liquifying ability for one or more gases; (8) higher gas equilibrium partial pressure; (9) faster desorption kinetics for one or more gases; (10) greater desorption capability for one or more gases; (11) lower viscosity; (12) lower volatility; (13) lower degradation (14) lower corrosiveness; (15) higher compatibility with impurities; and (16) fewer total impurities in desorbed gases. Following absorption, the first gas may be desorbed, if desired, in any convenient manner.

In another embodiment, the invention involves a process for separating gas comprising first absorbing a first gas and a second gas with a liquid solution comprising two or more phases. The two-phase liquid solution may then be transformed or converted to a second liquid solution comprising one phase wherein the second liquid solution is selective for dissolving said first gas relative to said second gas.

In yet another embodiment, the invention involves a process for separating gas comprising first absorbing one or more gases with a liquid solution comprising one or more physical solvents. An antisolvent may then be mixed with said liquid solution to form a second liquid solution and at least one gas may be desorbed from said second liquid solution. At least a portion of said second liquid solution may then be treated with one or more membranes to separate antisolvent from said one or more physical solvents. Typical useful membranes may include, for example, membranes that separate by having a molecular weight cutoff while one or more of the physical solvents has a molecular weight below the membrane's molecular weight cutoff. Suitable physical solvents vary depending upon the circumstances but often may include, for example, those selected from the group consisting of water, organic solvent, glycol, carbonate, carbonate ester, ester, ether, diol, lactam, protic solvents, aprotic solvents, amide, alcohol, fluorinated compound, hydrocarbon, organic polymer, alkylene glycol, alkylene carbonate, polyol, urea, and mixtures thereof. If desired, the antisolvent may be mixed with said liquid solution under conditions to modify the pH of the second liquid solution and facilitate desorbing. The antisolvent may work in any number of ways. For example, the antisolvent may modify the solubility of one or more gases relative to the physical solvent alone. For example, the antisolvent may modify the solubility of at least one dissolved gas relative to at least one other different dissolved gas in the second liquid solution. In some embodiments it may be desirable to enrich the antisolvent with one or more dissolved gases relative to the total solubility of said gases in said antisolvent. Typical other useful membranes may include, for example, membranes that separate by having a molecular weight cutoff while one or more of the antisolvents comprises one or more compounds with a molecular weight or hydration radius greater than the molecular weight cutoff of the membrane. Suitable antisolvents may include, for example, those that comprise an organic acid, an inorganic acid, an acid with a hydration radius greater than 80 Daltons, a polymer, an acidic polymer, an ionic compound, an acidic ionic compound, a weak base—strong acid, a cation-hydrogen or dihydrogen-anion or trihydrogen-anion salt, an alkali hydrogen sulfate salt, an ammonium—strong acid salt, a common-ion salt, a citric acid, base, an amine, an imine, an azine, an organic base, an inorganic base, a strong base, a base with a hydration radius greater than 80 Daltons, a polymer, a basic polymer, an ionic compound, a basic ionic compound, a strong base—weak acid, a common-ion salt water, water, an organic solvent or a mixture thereof.

In some cases, it may be desirable that the solubility of one or more gases in the second liquid solution is (1) less than the solubility of one or more gases in the liquid solution or (2) less than the solubility of one or more gases in the antisolvent or (3) combination thereof. In other cases, it may be desirable that the solubility of one or more gases in the second liquid solution is (1) greater than the solubility of one or more gases in the liquid solution or (2) greater than the solubility of one or more gases in the antisolvent or (3) combination thereof. The one or more gases may be any that are capable of being separated by the aforementioned processes. Suitable gases may comprise and acid gas, a basic gas, a hydrocarbon, an inert gas, air, or a combination thereof.

Process Embodiments in FIGS. 1-9

FIG. 1A: A gas separation embodiment employing a physical solvent with LCST or UCST phase change wherein the physical solvent undergoes endothermic phase change, such as forming less or more liquid phases, in the absorber, absorbing a portion of the heat of absorption. The embodiment may further comprise releasing said absorbed heat through the reverse exothermic phase change in the desorber. The present figure undergoes endothermic LCST phase change in the absorber, forming two or more liquid phases, and undergoes an exothermic dissolution LCST phase change in the desorber, forming a single liquid phase or less liquid phases or smaller liquid phases.

Figure 1B:
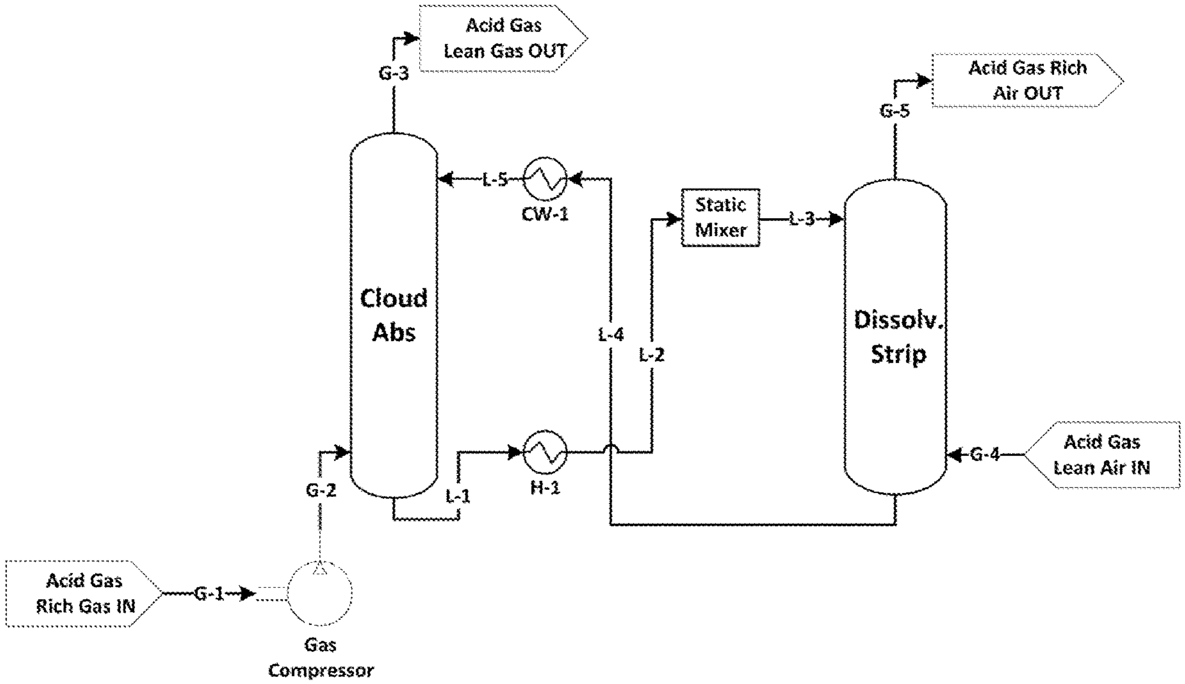

FIG. 1B: A gas separation embodiment employing a physical solvent with a UCST phase change wherein the physical solvent is cooled to form two or more liquid phases at or below a UCST and gas is absorbed into the two or more liquid phases in the absorber. The embodiment further comprises heating said two or more liquid phases at or above a UCST temperature, resulting in the dissolution of the two or more liquid phases into, for example, a single liquid phase. The solubility of one or more gases may be greater in the two or more liquid phases than in the combined single liquid phase solution, further facilitating gas partial pressure swing. If desired, heat may be applied, for example, during desorption. If desired, the embodiment may undergo, including, but not limited to, desorption using heat or without a carrier gas or using the desorption methods described in, for example, FIG. 2B, or a combination thereof.

Figure 2A:
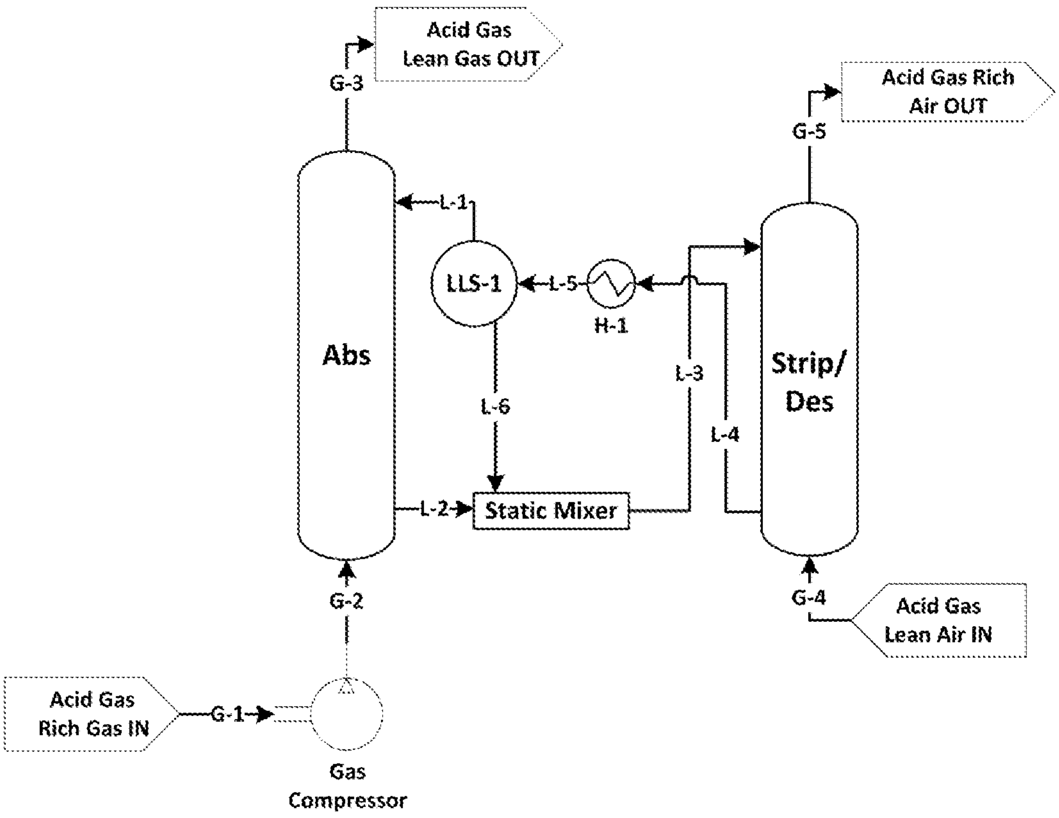
FIGS. 2A and 2B illustrate specific gas separation embodiments employing a physical solvent with the number of phases changing.

FIG. 2A: A gas separation embodiment employing a physical solvent with a LCST phase change wherein gas is absorbed one of the two at least partially separated liquid separated liquid phases originating from a LCST phase change. The 'gas-rich' phase is mixed with the other liquid phase before or, if employed, within the desorber. The combined solution may, for example, have a lower solubility of gas than the liquid phase employed in gas absorption. The present embodiment may employ, for example, air stripping or other carrier gas stripping to facilitate the desorption of one or more dissolved gases.

Figure 2B:
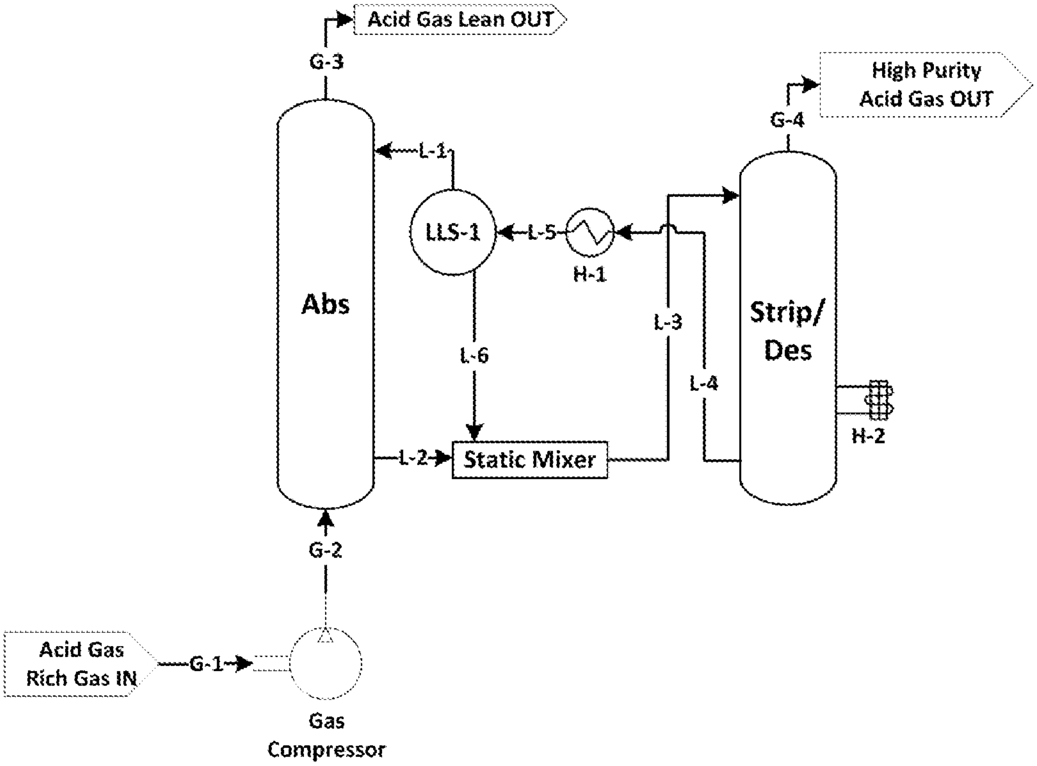

FIG. 2B: An embodiment similar to FIG. 2A, except the present embodiment may employ heat input, depressurization, or a combination thereof to desorb dissolved gas. Additionally, the present embodiment may form pure or relatively separated desorbed gas using, for example, including, but not limited to, flashing, depressurization, or desorption with a condensable, or separable stripping gas, or combination thereof.

Figure 3A:
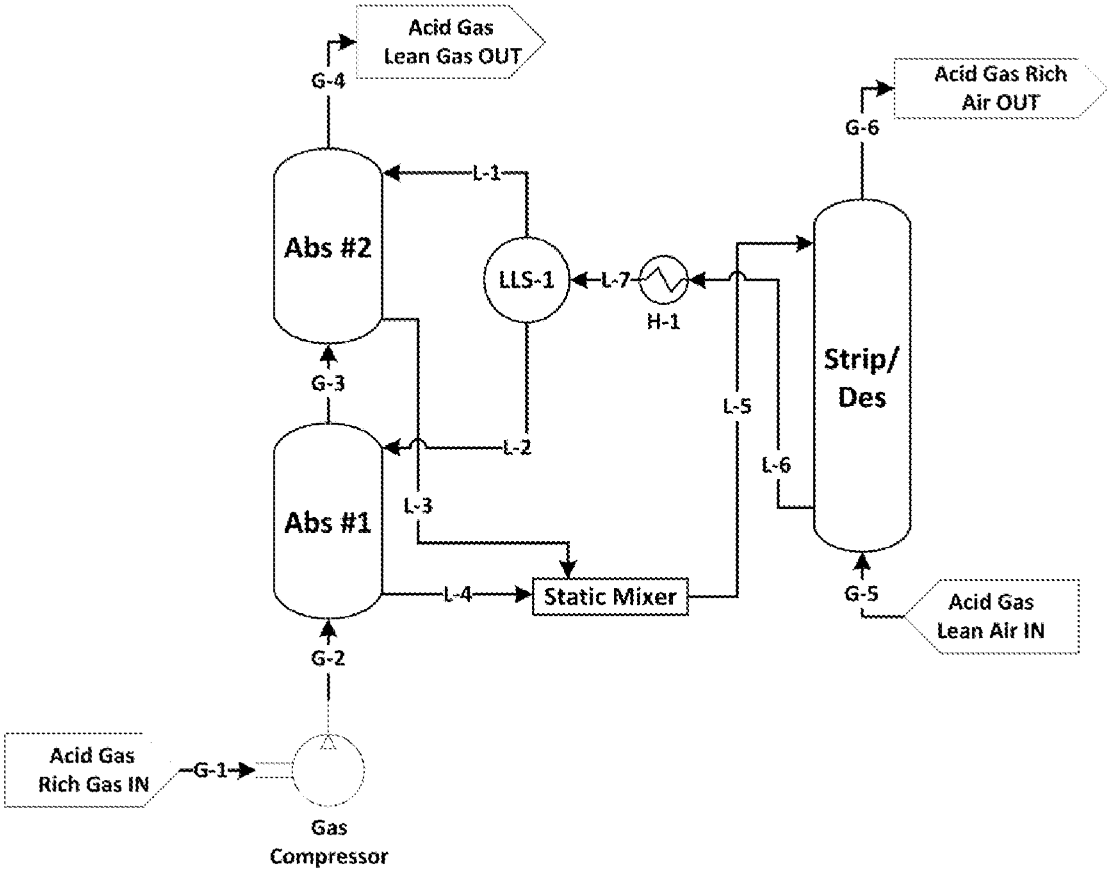
FIGS. 3A and 3B illustrate specific gas separation embodiments employing a physical solvent with the number of phases changing.

FIG. 3A: A gas separation embodiment employing a physical solvent with a LCST phase change wherein gas is absorbed in two or more separated liquid phases originating from a LCST phase change. Said two or more separated liquid phases may be placed in individual absorption columns specific to each liquid phase (for example: Abs #1 and Abs #2). The two or more liquid phases may be mixed or dissolved or combination thereof before or during the desorption of one or more gases.

Figure 3B:
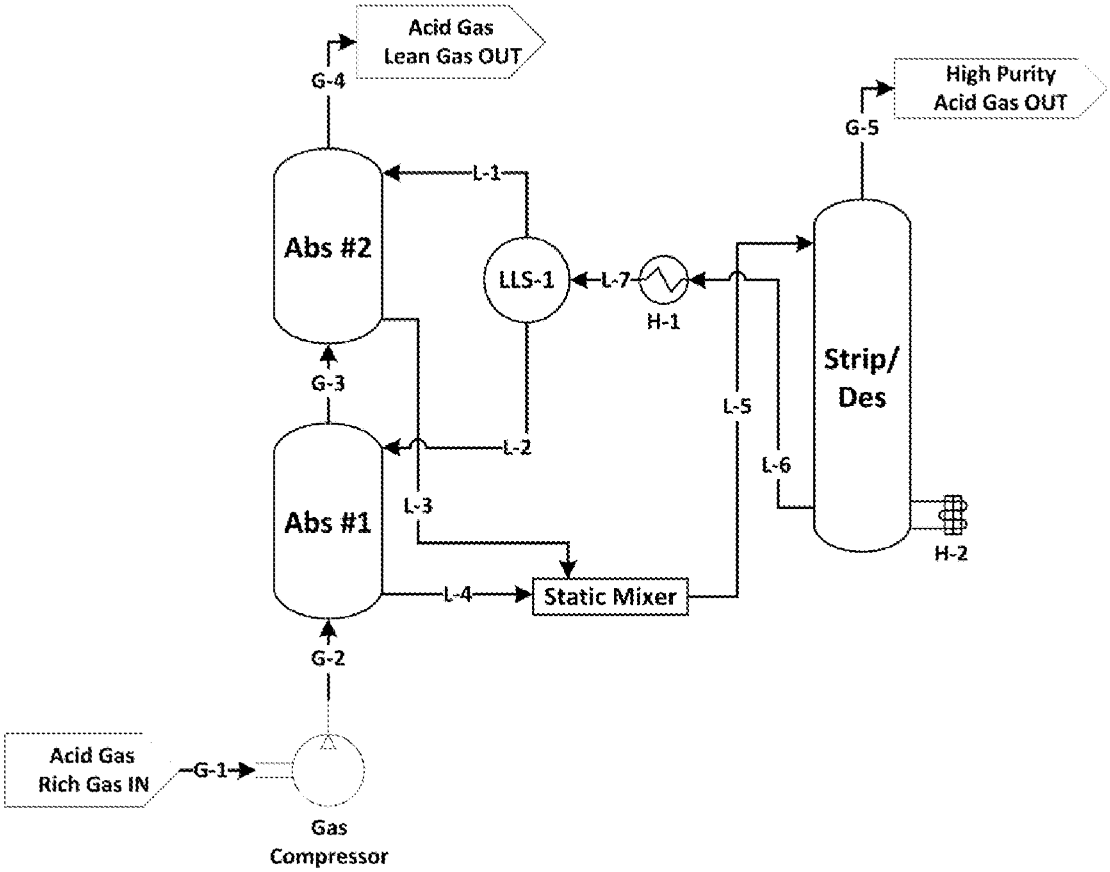

FIG. 3B: An embodiment similar to FIG. 3A. The present embodiment may employ heat input, depressurization, or a combination thereof to desorb dissolved gas. Additionally, the present embodiment may form pure or relatively separated desorbed gas using, for example, including, but not limited to, flashing, depressurization, or desorption with a condensable or separable stripping gas, or combination thereof.

Figure 4:
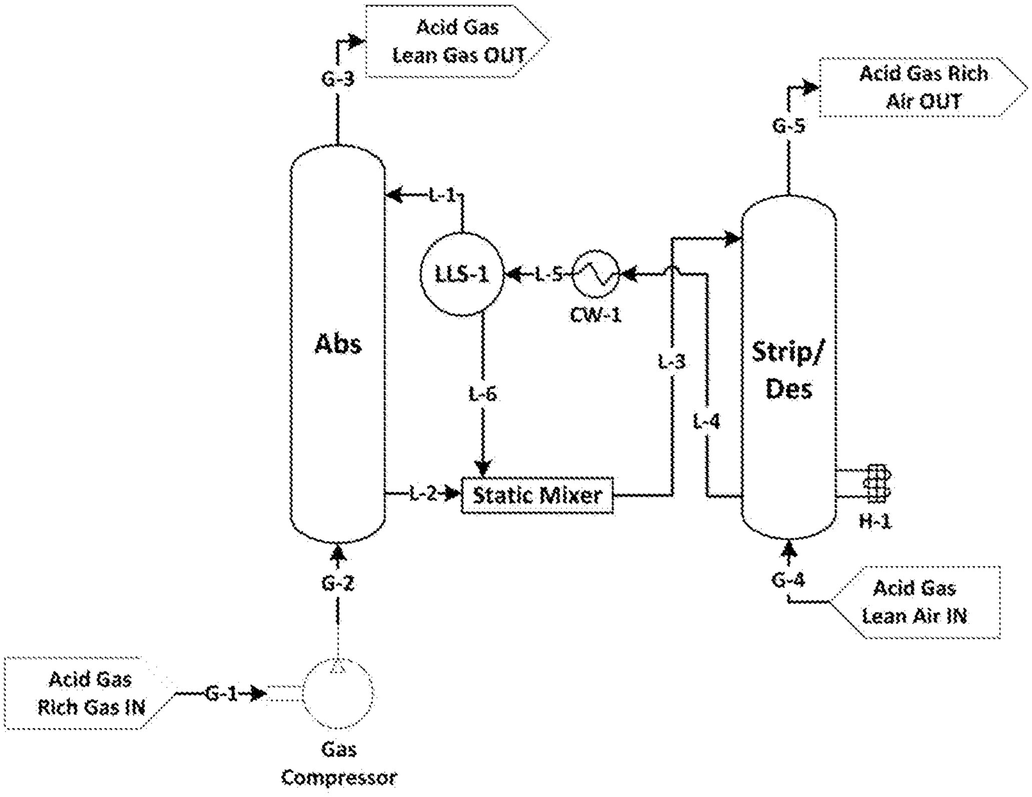
FIG. 4 illustrates a specific gas separation embodiment employing a gas absorbing solvent with the number of phases changing.

FIG. 4: A gas separation embodiment employing a gas absorbing solvent with a UCST phase change. The embodiment may comprise, for example, cooling a UCST solvent at or below its UCST and at least partially separating the resulting two or more liquid phases. The embodiment may further comprise absorbing one or more gases into one of said at least partially separated liquid phases. The embodiment may further comprise combining said two or more liquid phases and desorbing gases from the resulting combined mixture or solution, the application of heat, the presence of a stripping gas, or a combination thereof.

Figure 5:
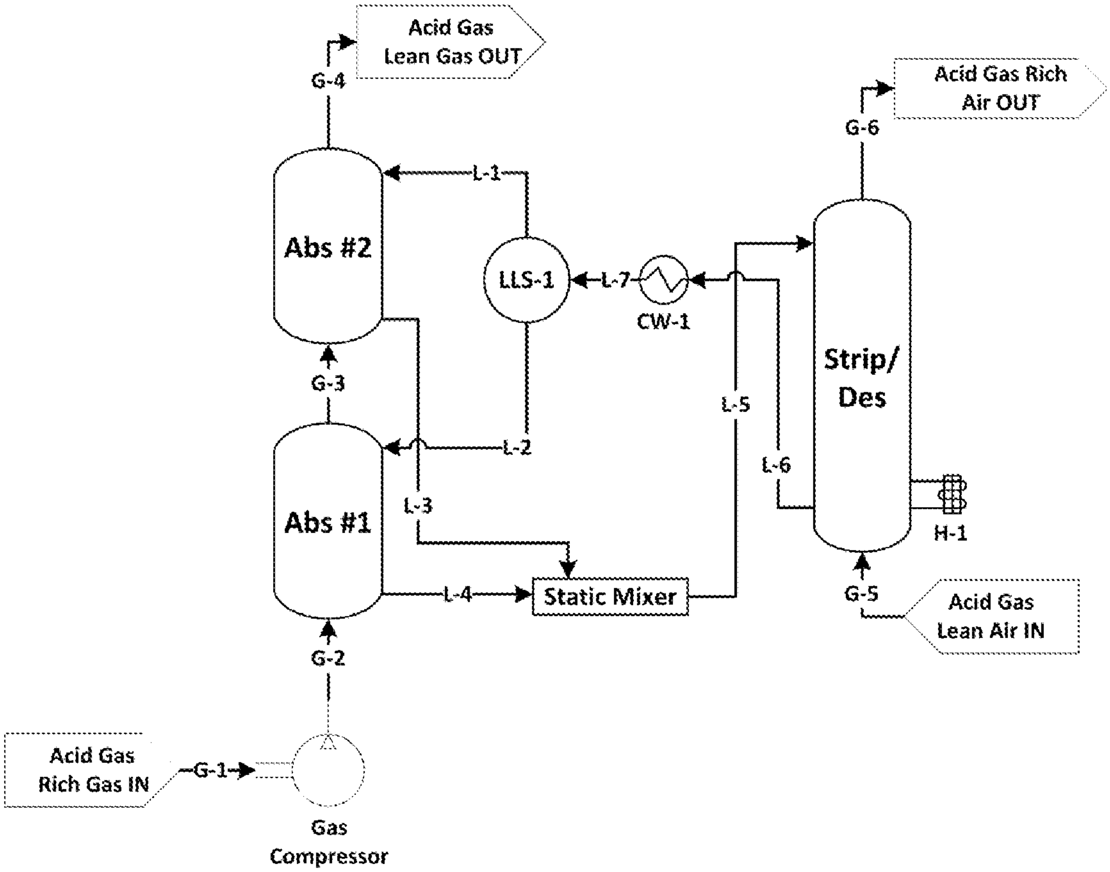
FIG. 5 illustrates a specific gas separation embodiment employing a gas absorbing solvent with the number of phases changing.

FIG. 5: A gas separation embodiment employing a gas absorbing solvent with a UCST phase change. The embodiment may comprise, for example, cooling a UCST solvent at or below its UCST and separating the resulting two or more liquid phases. The embodiment may further comprise transferring said two or more liquid phases into separate absorption columns and absorbing one or more gases into one or more of said separated liquid phases. The embodiment may further comprise desorbing said one or more gases from said one or more liquid phases or a mixture or combined solution of said liquid phases. For example, the present embodiment may involve combining said two or more liquid phases and desorbing gases from the resulting combined mixture or solution, the application of heat, the presence of a stripping gas, or a combination thereof.

Figure 6A:
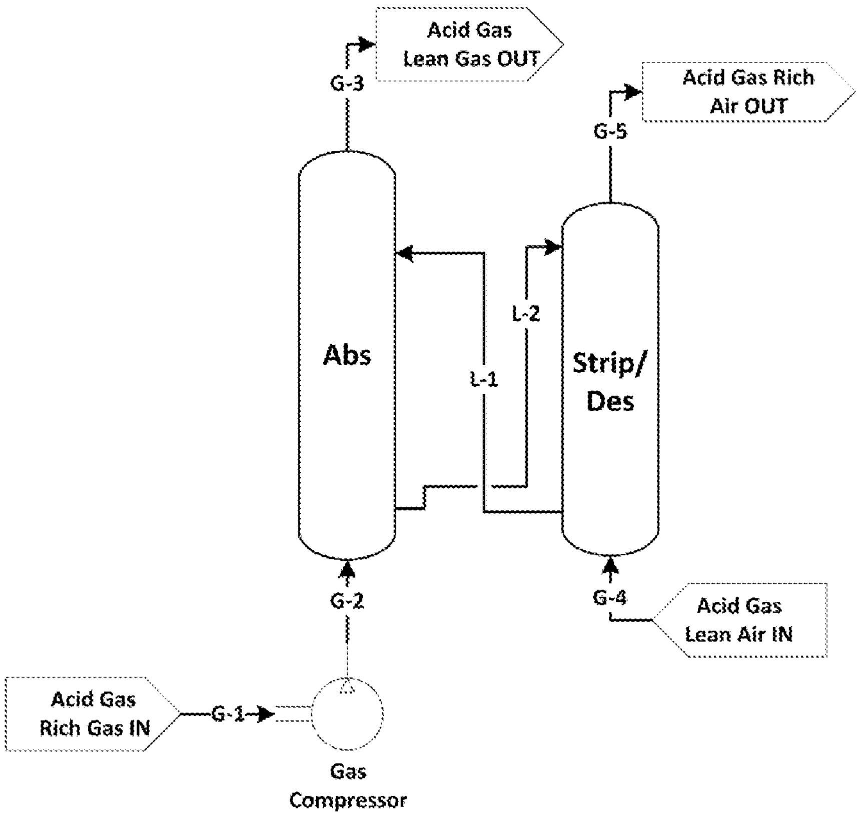
FIGS. 6A and 6B illustrate specific gas separation embodiments employing a gas absorbing solvent and mild basic or acidic conditions.

FIG. 6A: A gas separation embodiment employing a gas absorbing solvent comprising a mildly basic or acidic solution. The mildly basic or acidic solution may possess greater absorption capacity of acid gases or basic gases, respectively, than, for example, water. However, the mildly basic or acidic solution may function similarly to a conventional physical solvent in that, for example, it has relatively weak interactions with said acidic or basic gases. If desired, it may not possess a metathesis or displacement reaction with said acidic or basic gases and, for example, may have stronger affinity for its current anion or cation than the one or more anions or cations associated with said acidic or basic gases, respectively. The present embodiment may employ air stripping or carrier gas stripping of the one or more absorbed gases.

Figure 6B:
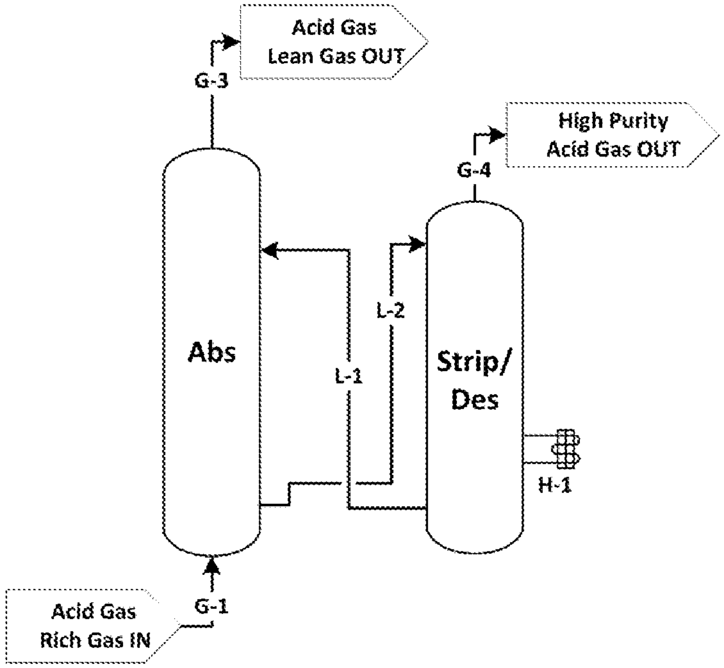

FIG. 6B: An embodiment similar to FIG. 6A, except employs heat input, depressurization, or a combination thereof to desorb one or more dissolved gases. Additionally, the present embodiment may form pure desorbed gas through flashing, through depressurization, or desorption with a condensable or separable stripping gas.

Figure 8:
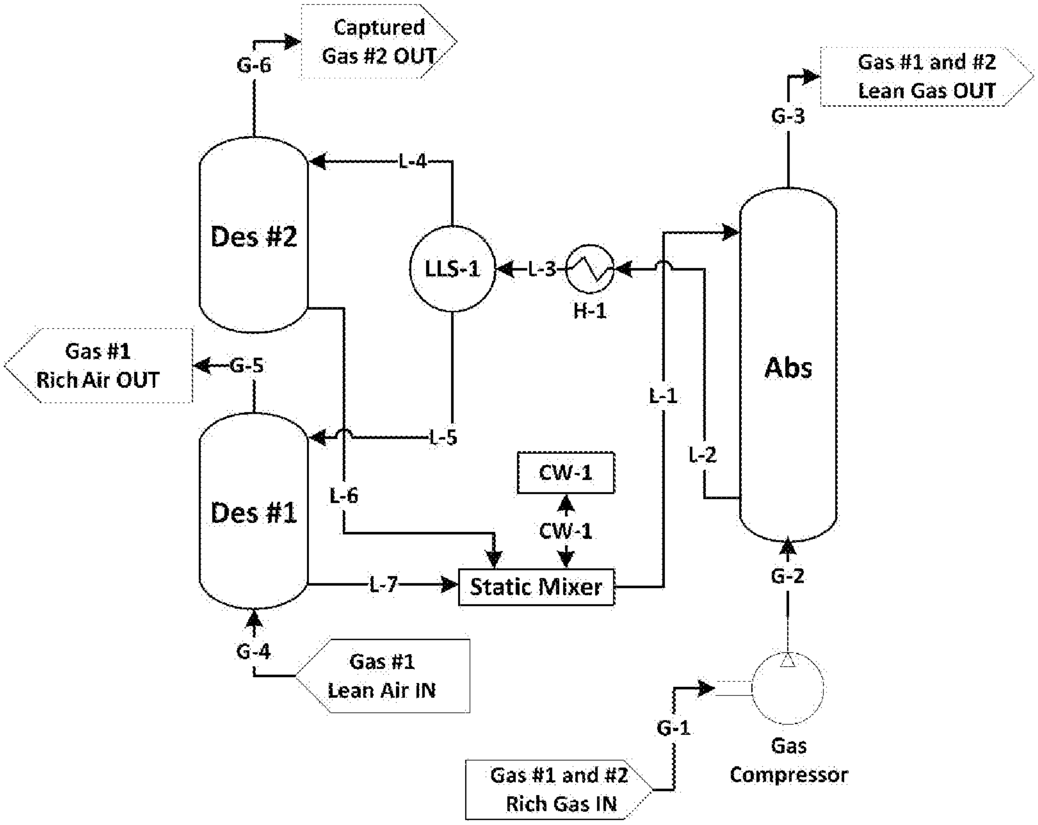
FIG. 8 illustrates specific gas separation embodiments wherein two or more gases are absorbed in a single liquid phase.

FIG. 8: Systems & Methods for Gas Separation Comprising Selective Gas Separation Wherein Two or More Gases are Absorbed in a Single Liquid Phase Solution. The present embodiment may further comprise LCST or UCST phase change of the combined solution into two or more liquid phases. The present embodiment may further comprise wherein at least one or more of said liquid phases are selective for desorption of one or more of said absorbed gases.

Figure 9A:
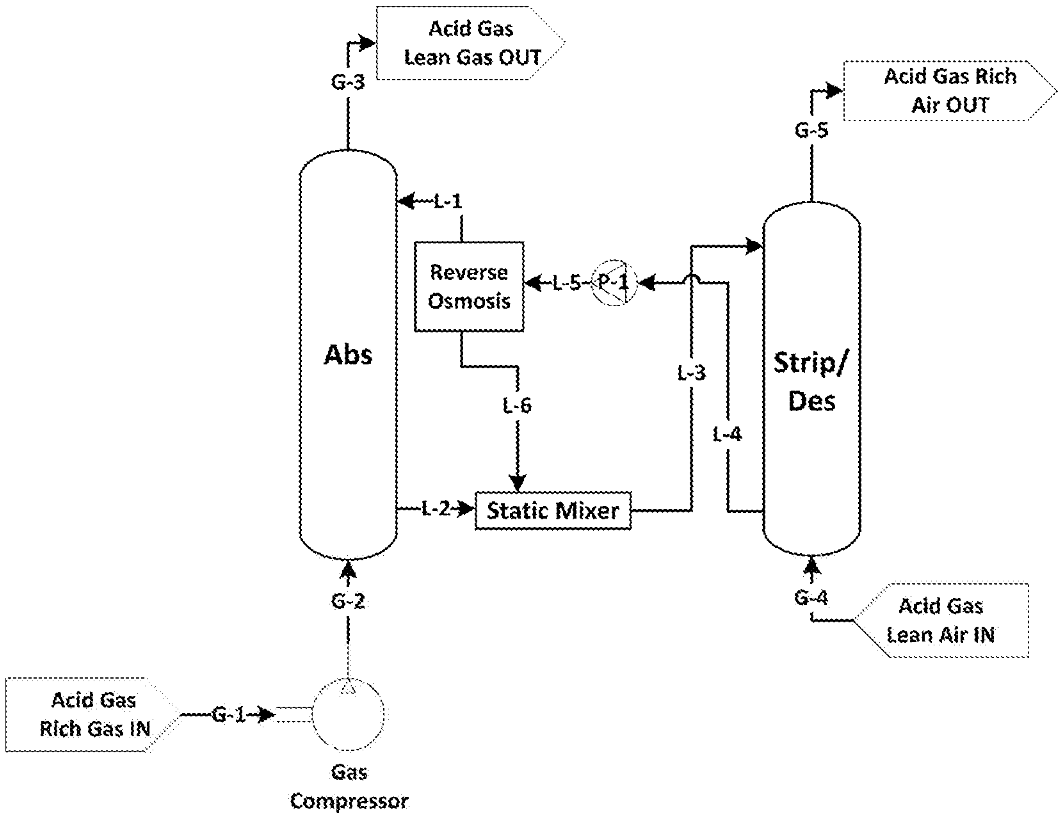
FIGS. 9A and 9B and 9C illustrate specific gas separation embodiments using a physical solvent, antisolvent, and membrane.

FIG. 9A: Systems & Methods for Gas Separation comprising 1) a physical solvent for absorption of one or more gases, 2) an antisolvent, which when mixed with said physical solvent reduces the solubility of one or more gases relative to the physical solvent alone, 3) a semi-permeable membrane which separates at least a portion of said physical solvent from said antisolvent to, for example, regenerate the process. The present embodiment may, for example, employ an absorption column to absorb one or more gases and a desorption column or unit to desorb said one or more gases from, for example, the combined physical solvent+ antisolvent solution. The present embodiment may desorb one or more gases as pure gases or using carrier gas stripping or air stripping.

Figure 9B:
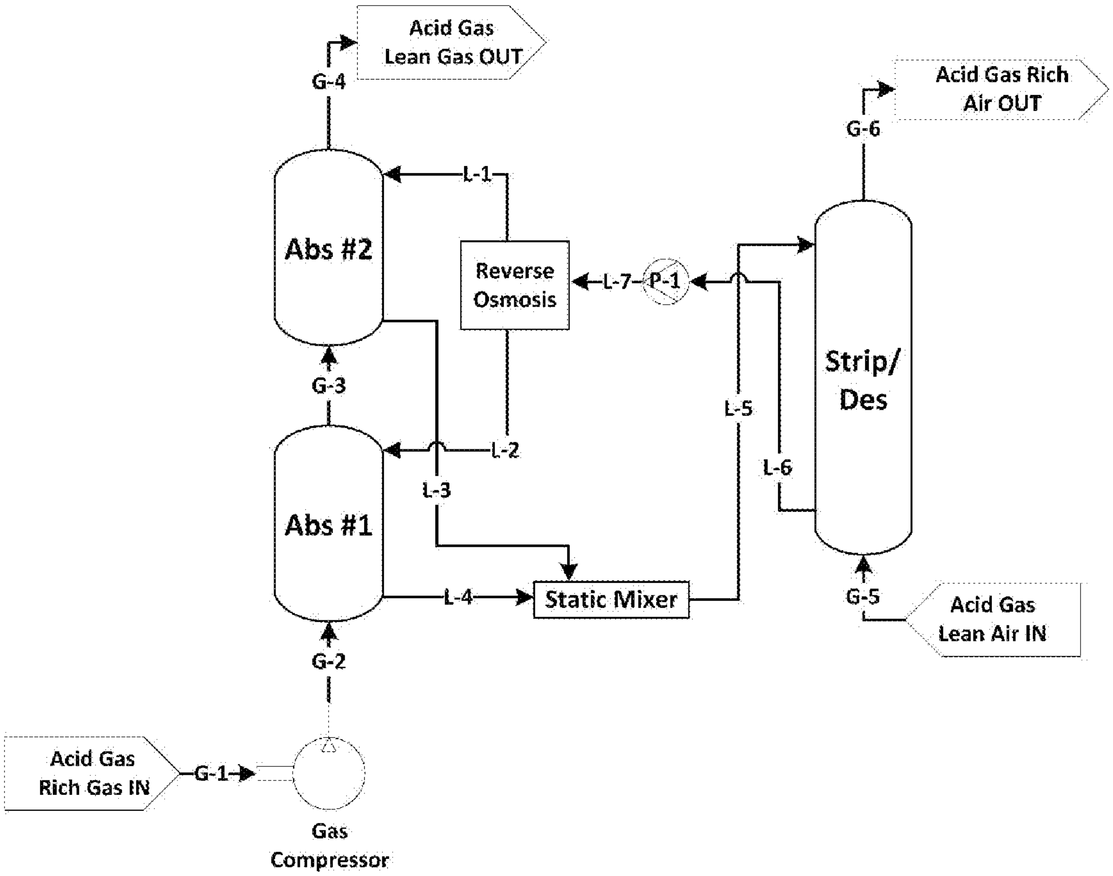

FIG. 9B: An embodiment similar to FIG. 9A, except employs two separate absorbers or gas contactors, wherein one absorber enriches the physical solvent solution with one or more gases and another absorber enriches the antisolvent with one or more gases. Although the antisolvent may possess lower or significantly lower solubility of one or more gases than the physical solvent, it may be desirable to enrich the antisolvent with one or more gases before mixing to minimize, for example, dilutive effects of the antisolvent.

Figure 9C:
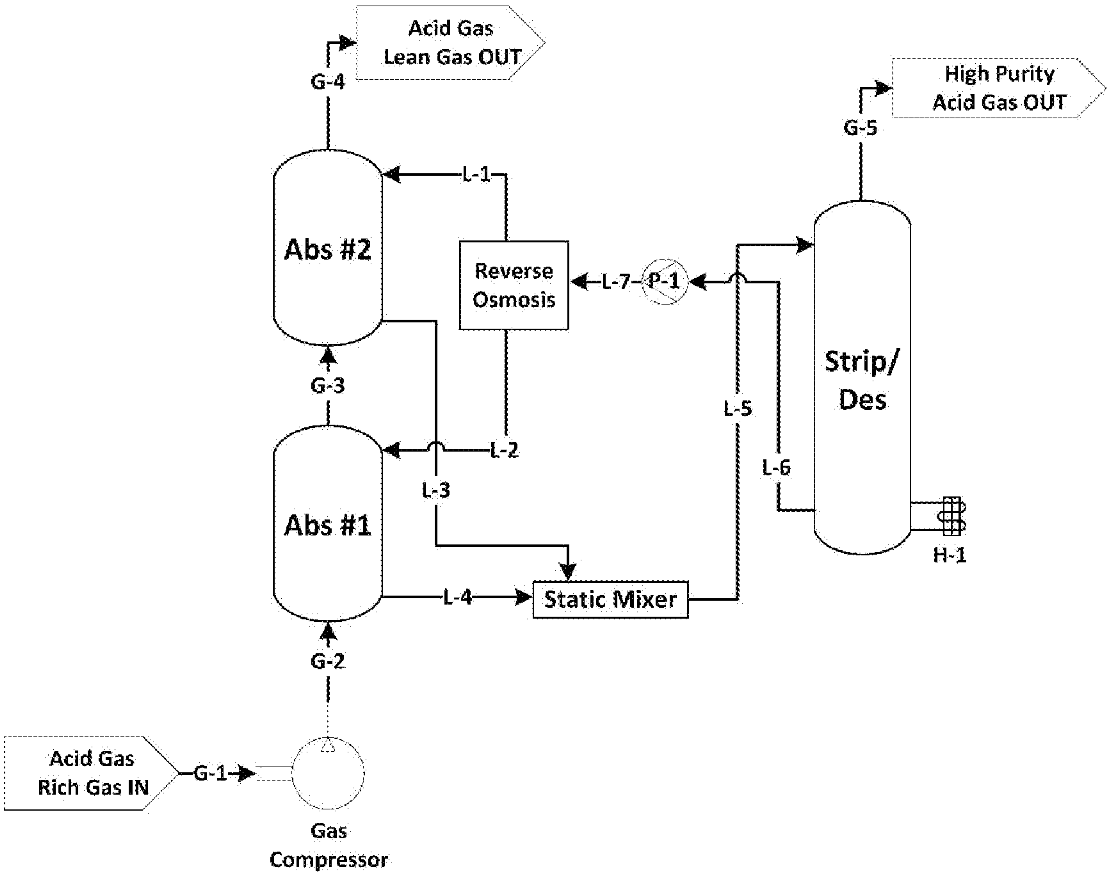

FIG. 9C: An embodiment similar to FIG. 9B, except the present embodiment may employ heat input, depressurization, or a combination thereof to desorb dissolved gas. Additionally, the present embodiment may form pure or relatively separated desorbed gas through flashing, through depressurization, or desorption with a condensable or separable stripping gas.

Figure 10A:
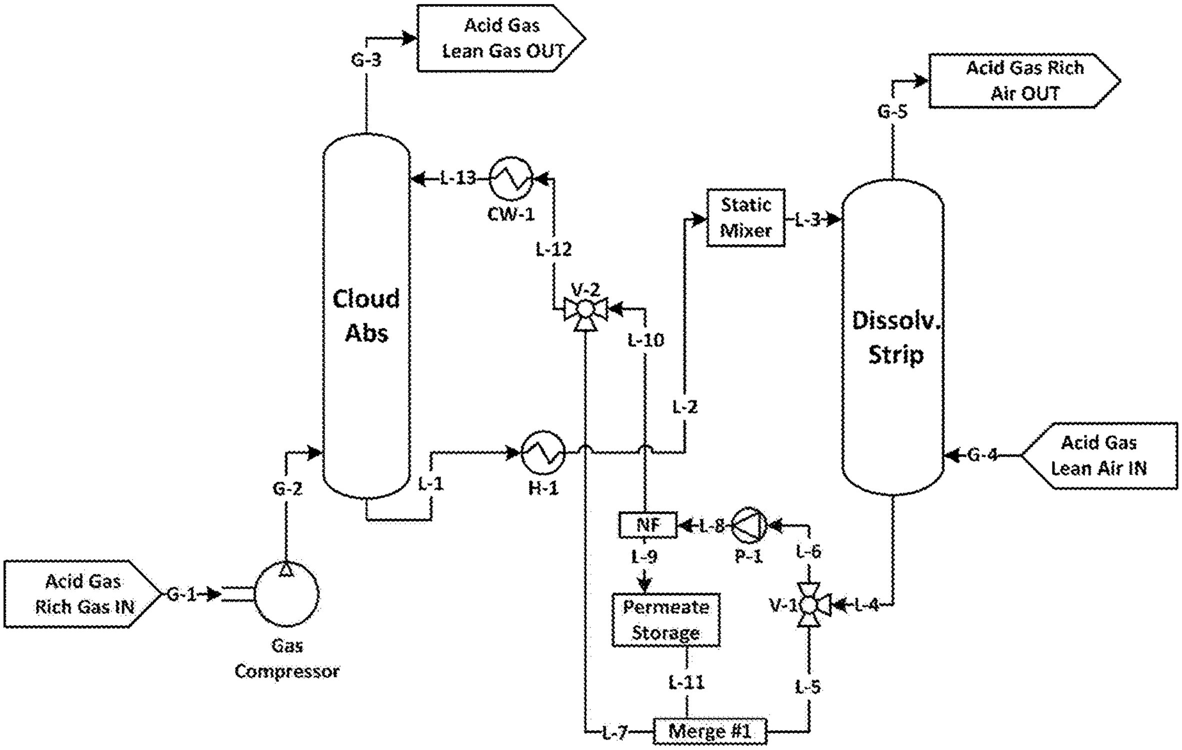
FIGS. 10A and 10B and 10C illustrate specific gas separation embodiments using systems and methods for active cloud point adjustment.

FIG. 10A: The present embodiment may comprise systems and methods for gas separation. The present embodiment may employ one or more UCST phase transitions. FIG. 10A may show the present embodiment undergoing active liquid system cloud point adjustment to, for example, decrease one or more UCSTs.

Figure 10B:
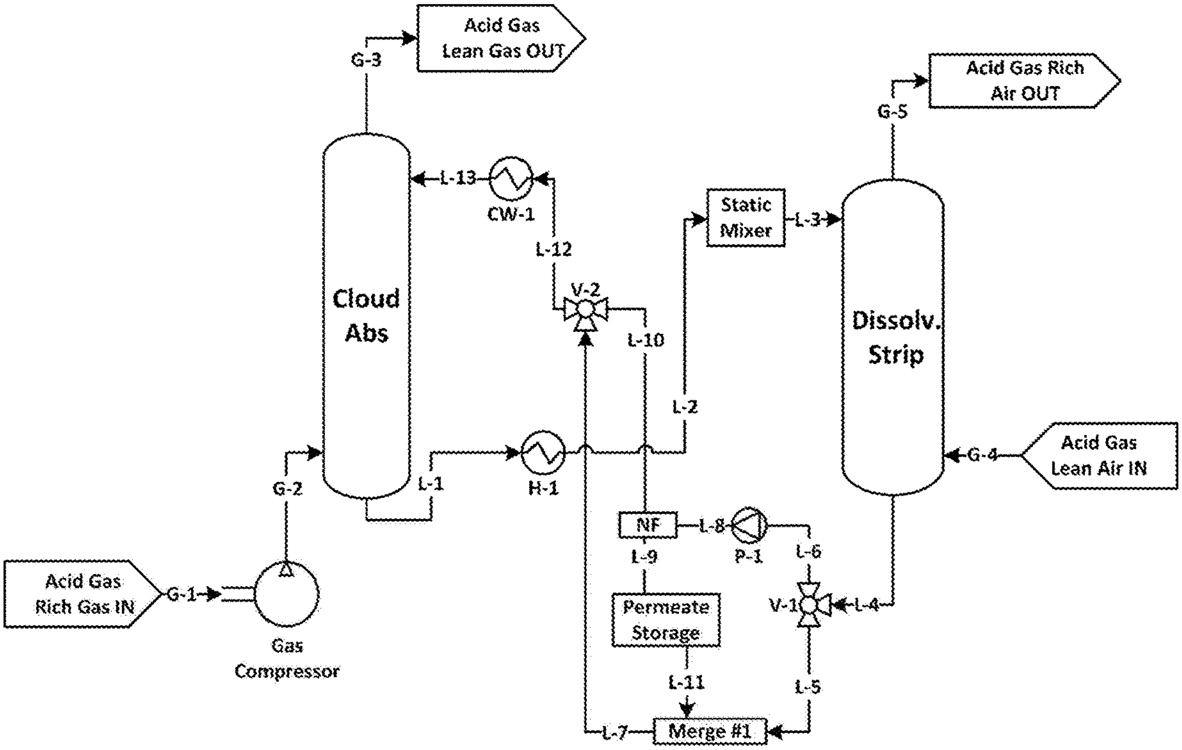

FIG. 10B: The present embodiment may comprise systems and methods for gas separation. The present embodiment may employ one or more UCST phase transitions. FIG. 10B may show the present embodiment undergoing active liquid system cloud point adjustment to, for example, increase one or more UCSTs.

Figure 10C:
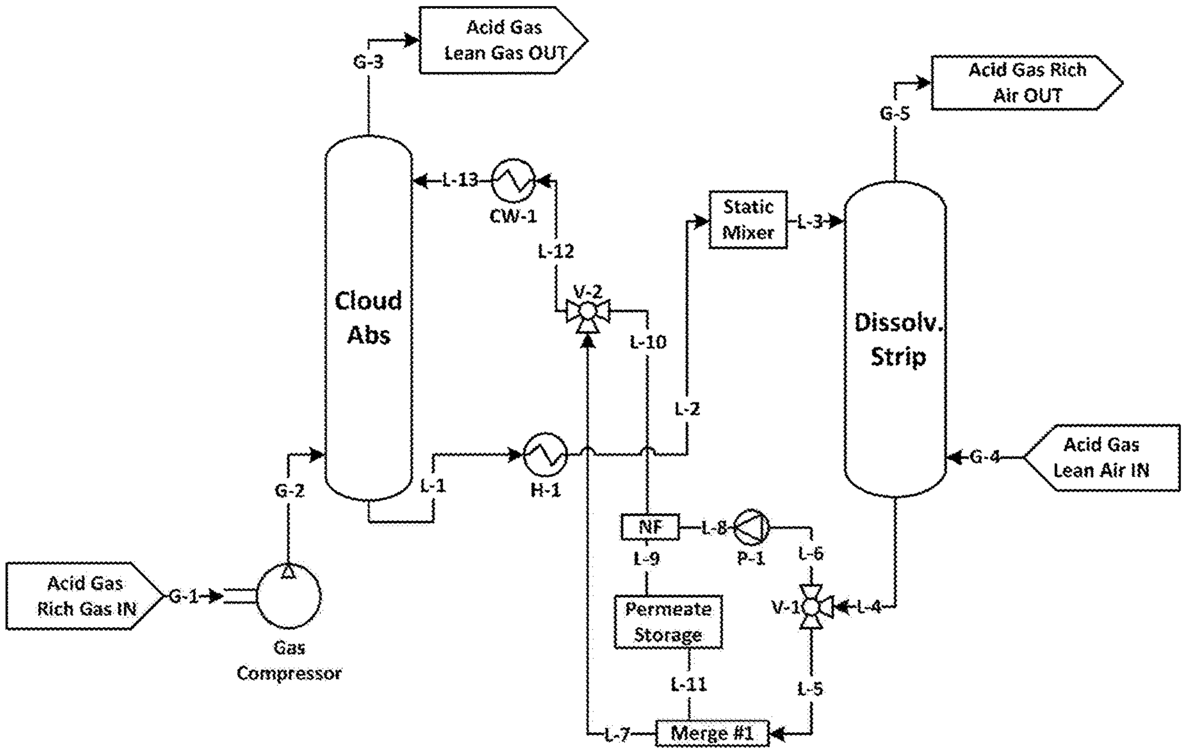

FIG. 10C: The present embodiment may comprise systems and methods for gas separation. The present embodiment may employ one or more UCST phase transitions. FIG. 10C may show the present embodiment maintain one or more UCSTs, or composition of liquid phases, or bypassing of permeate addition or membrane-based concentrating, or combination thereof.

Figure 11A:
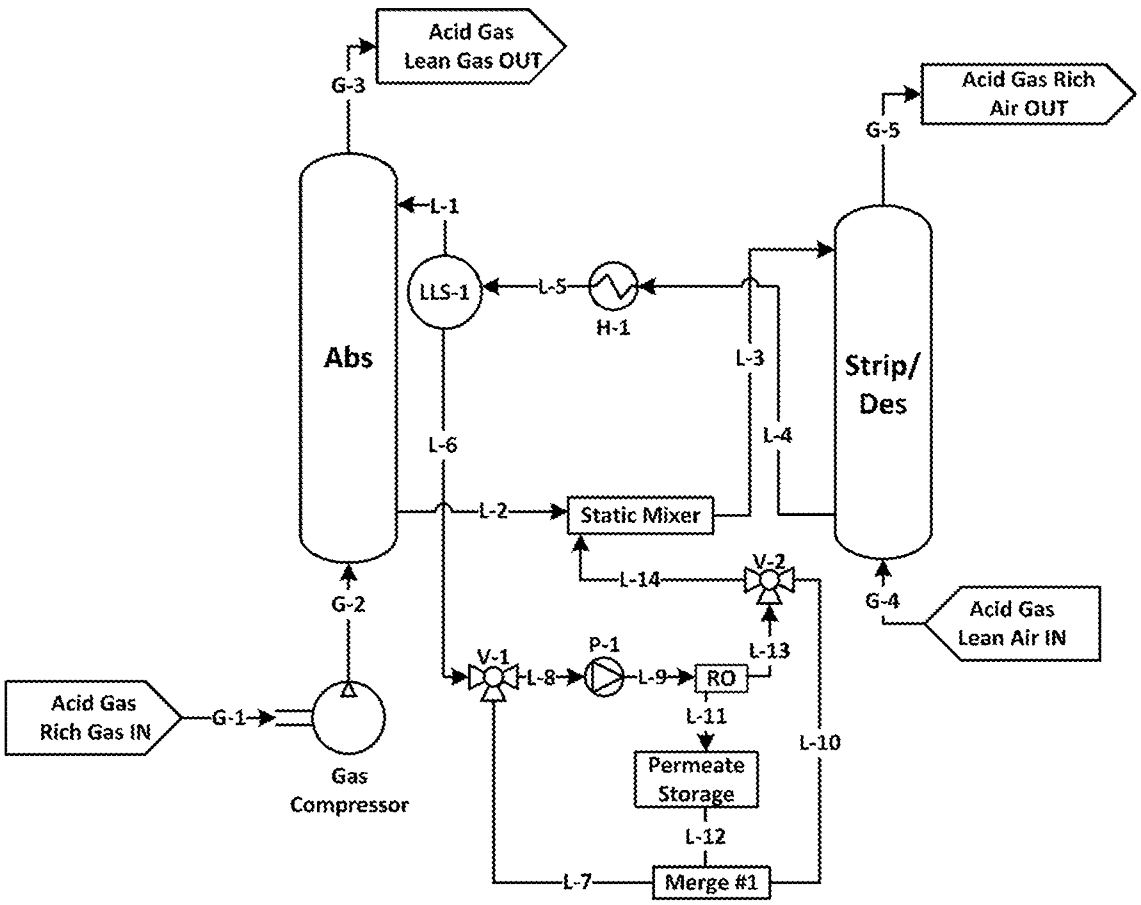
FIGS. 11A and 11B and 11C illustrate specific gas separation embodiments using systems and methods for active cloud point adjustment.

FIG. 11A: The present embodiment may comprise systems and methods for gas separation. The present embodiment may employ one or more LCST phase transitions. FIG. 11A may show the present embodiment undergoing active liquid system cloud point adjustment to, for example, decrease one or more LCSTs.

Figure 11B:
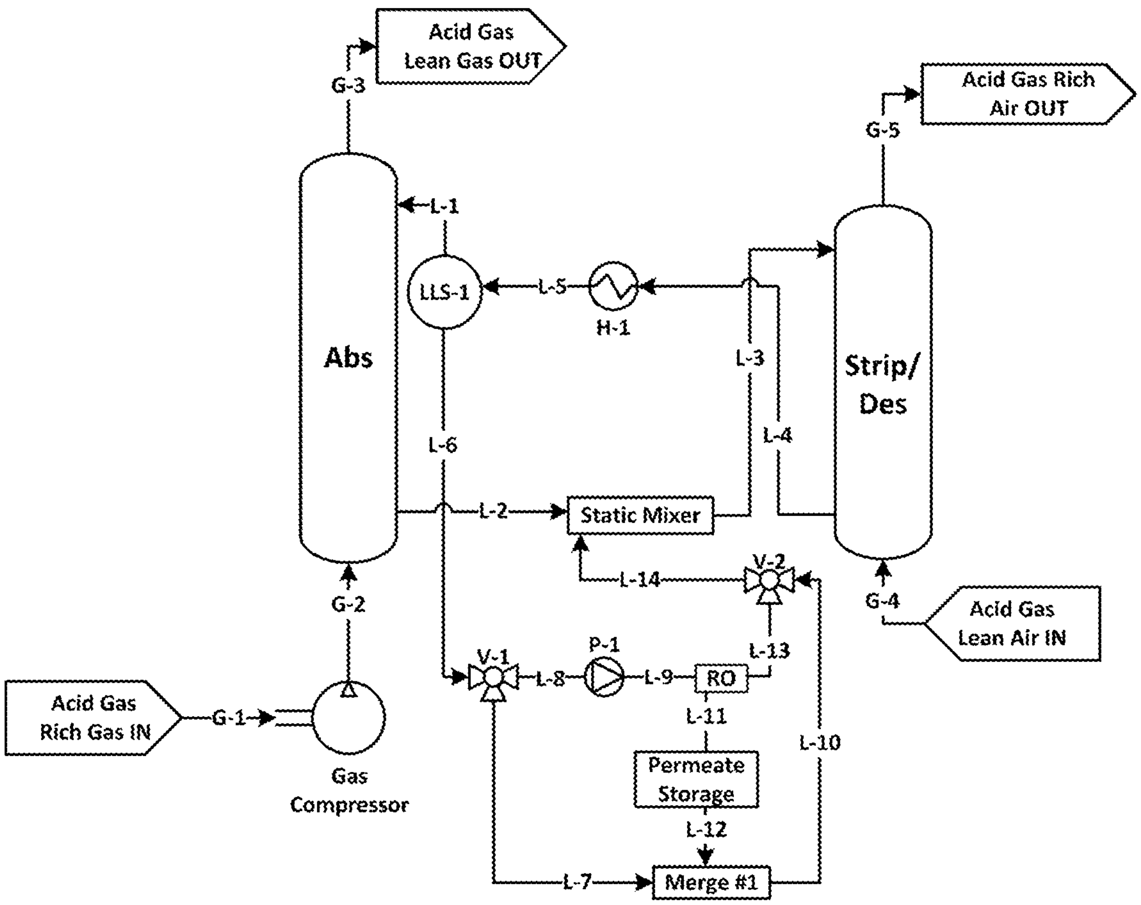

FIG. 11B: The present embodiment may comprise systems and methods for gas separation. The present embodiment may employ one or more LCST phase transitions. FIG. 11B may show the present embodiment undergoing active liquid system cloud point adjustment to, for example, increase one or more LCSTs.

Figure 11C:
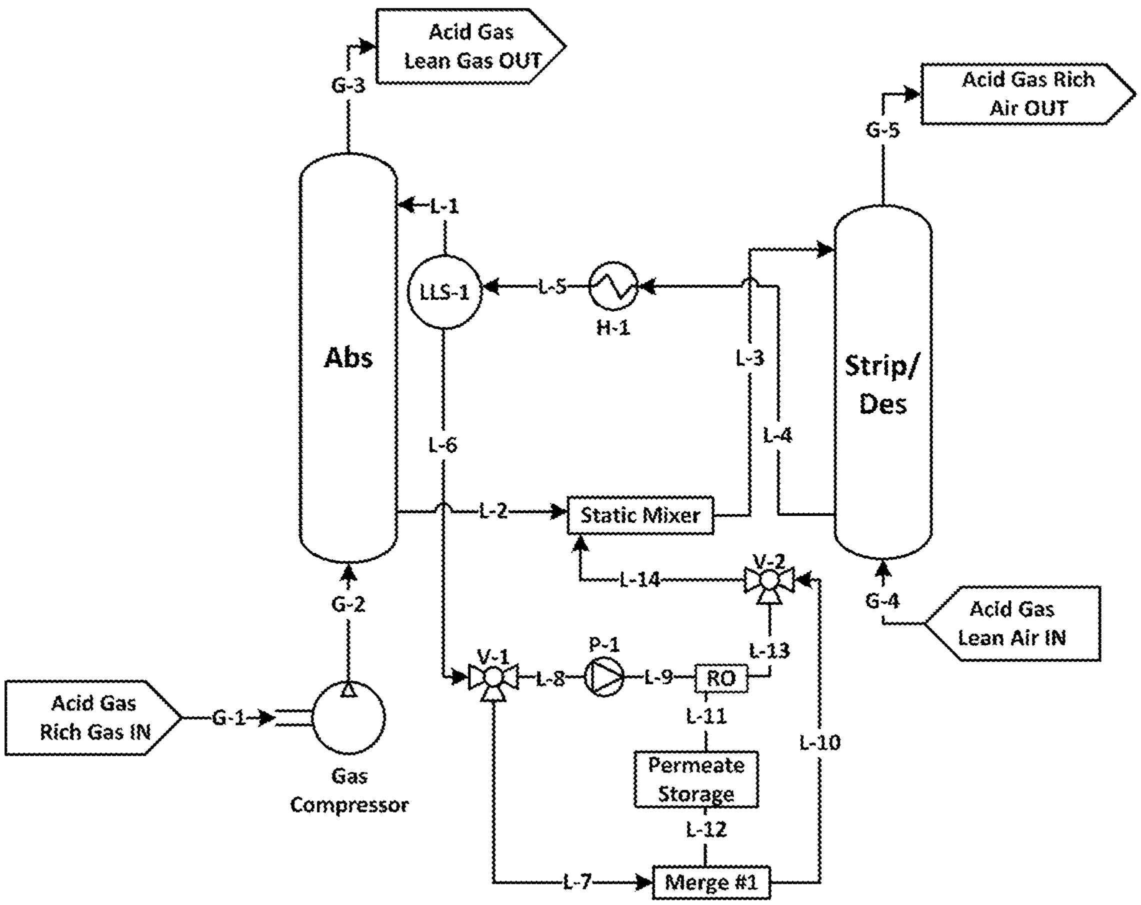

FIG. 11C: The present embodiment may comprise systems and methods for gas separation. The present embodiment may employ one or more LCST phase transitions. FIG. 11C may show the present embodiment maintain one or more LCSTs, or composition of liquid phases, or bypassing of permeate addition or membrane-based concentrating, or combination thereof.

Specific Embodiments of the Gas Separation/Membrane Separation/Cooling Cloud Point Reagents/Heating Clouding Point Reagents Physical or Physio-Chemical Solvent Processes Described below are representative specific embodiments of the above general gas separation process that often involves changing the number and composition of liquid phases in a liquid system, as well as, other processes of the invention. 1) The upper or lower critical solution temperature may also be referred to as a cloud point which is generally the point at which a liquid system undergoes a change such as a change in the composition of a phase and/or number of phases, which may also be referred to as switching, e.g., thermal switching, or a transition, e.g., liquid phase transition, or phase change, e.g., liquid phase change, or clouding-out, e.g. the solution clouding-out, or a combination thereof. A UCST phase transition into two or more liquid phases may also be referred to as a ‘cooling’ cloud point or UCST ranges or cloud point temperature range or phase transition temperature range. A LCST phase transition into two or more liquid phases may also be referred to as a ‘heating’ cloud point or cloud point temperature range or phase transition temperature range. Alternatively, phase transition solutions may be referred to as solutions exhibiting ‘condition sensitive solubility change.’ 2) A liquid mixture with more than one liquid phase may be referred to as, including, but not limited to, a multiphasic liquid solution, multiphase liquid solution, multiphase solution, multi-liquid phase solution, biphasic solution, a ‘cloudy’ solution, multiphasic liquid mixture, multiphase mixture, multiphase liquid mixture, a multi-liquid phase mixture, biphasic mixture, biphasic liquid mixture, bilayer mixture, multilayer mixture, multi-liquid phase state, multiphase liquid state, or a combination thereof. 3) The dissolution of one or more liquid phases in one or more other liquid phases to form a combined single liquid phase solution or a solution with a different number or composition or both of liquid phases may be referred to as ‘combining’ or ‘dissolution’ or ‘mutually dissolve’ or ‘dissolve’ or ‘combine’ or ‘mixing.’ 4) The mixture of two or more separate liquid phases may also occur without or with minimal dissolution of the liquid phases, which may be referred to as ‘mixing’ or ‘combining’ or ‘merging’ or forming one or more of the example descriptors in ‘2)’. 5) Physical absorbents, media which absorbs one or more gases via physical phenomena or physical interactions, may be referred to as a physical solvent, solvent, physical absorbent solvent, liquid, or a combination thereof 6) A ‘desired gas’ may comprise, for example, a gas is desired to dissolve in the physical solvent or a gas that is desired to be separated from one or more other gases. In some instances, one or more dissolved gases may comprise the desired gas or gases. 7) Separation of one or more liquid phases from one or more other liquid phases in a mixture comprising two or more liquid phases may be referred to as, including, but not limited to, liquid-liquid separation, or separation of liquid phases, or liquid phase separation, phase separation, separating said liquid phases, or a combination thereof. 8) Isolated gas or a gas which has been, at least in part, separated from other gases, may comprise for example, ‘captured gas’ or ‘relatively pure gas’ or ‘pure gas’ or a combination or derivative thereof 9) ‘Permeate’ or permeate liquid may comprise liquid which passes through one or more semi-permeable membranes or was not or was minimally rejected by one or more semipermeable membranes. ‘Permeate equivalent liquid’ or liquid equivalent to permeate may comprise a liquid with similar composition or characteristics to one or more permeate liquids, however may not have originated, in whole or in part, from a permeate solution resulting from the separation of one or more or a combination of reagents in a liquid system using a semipermeable membrane. 10) Desired gases and dissolved gases may be used interchangeably. Dissolved gases may include gases which may or may not be desired to be separated. 11) Relatively low solubility of one or more gases may mean a liquid with lower total solubility of one or more gases than the solubility of said one or more gases in one or more other liquids in a liquid system. An antisolvent may have, for example, one of the or the lowest solubility of one or more gases relative to the solubility of said gases in other liquid phases in a liquid system. 12) Relatively high solubility of one or more gases may mean a liquid with higher total solubility of one or more gases than the solubility of said one or more gases in one or more other liquids in a liquid system. A physical solvent may have, for example, one of the or the greatest solubility of one or more gases relative to the solubility of said one or more gases in other liquid phases in a liquid system. 13) A liquid or solution 'rich' in one or more gases may be a solution with a greater dissolved concentration of said one or more gases than said liquid or solution at another point in a process. A liquid or solution 'lean' in one or more gases may be a solution with a lower dissolved concentration of said one or more gases than said liquid or solution at another point in a process. Absorbing a gas or gases in a liquid solution, liquid mixture, or phase may simply mean dissolving the gas or gases. Similarly, when referring to desorbing a gas or gases it is simply meant that the absorbed or dissolved gas or gases is removed in some manner regardless of its form. That is, the absorbed or dissolved gas or gases may be desorbed in the form of a gas or gases or liquid or liquids. If desorbed, for example, as a liquid or liquid phase, said liquid phase may be separated from one or more other liquids using one or more liquid separation methods, which may include, but is not limited to, decanting, and/or may undergo treatment or purification. Before or during absorption or desorption, one or more of said gas or gases may, in part, condense as a liquid.

Summary FIG. 1A

An embodiment comprising an absorption unit which may recover a portion of the enthalpy of absorption and may 'cool' the absorption solution before or during absorption through, for example, the endothermic formation of a multi-liquid phase solution from a single liquid phase solution during absorption. The multiphasic solution may remain 'cloudy' during the transfer to the stripper. The embodiment further may comprise a desorption unit, wherein, for example, desorption is facilitated by the exothermic dissolution of the multi-liquid phase solution, forming a liquid solution of different phase composition or a single liquid phase solution. The embodiment may be a drop-in improvement technology as it may be employed as a replacement of pre-existing physical solvent absorber—stripper units.

The embodiment shown in FIG. 1A is a gas, acid gas, hydrocarbon, or combination thereof separation technology. The embodiment shown in FIG. 1A may recover a portion or substantial portion of the heat from the enthalpy of absorption during the absorption of one or more gases or from another heat source and release a portion of or substantial portion said heat during desorption. This capability may also enable the technology to maintain a cooler absorber without external cooling of the absorber and may enable a heat and entropy release during desorption, accelerating desorption kinetics and may create a swing in the equilibrium partial pressure or solubility of one or more gases. The liquid phase transition into two or more liquid phases in, for example, the absorber may enable the absorber to operate with a small or almost non-existent temperature profile between the top of the absorber and the exiting rich solution due to, for example, the latent heat of the endothermic thermal switching. This may enable greater absorption efficiency and less cooling or no parasitic cooling requirement in the solution entering the absorber. The enthalpy of absorption may be recovered by the thermal switching of a solvent during the absorption of one or more gases into the physical absorbent. The temperature increase or the heat of absorption or increase in one or more dissolved gas concentration or a combination thereof may result in the formation of two of more liquid phases, generally forming a multi-liquid phase liquid mixture. Additionally, one or more gases may be more soluble in the multi-liquid phase mixture than in the single liquid phase solution, enabling, for example, significant absorption capacity during absorption in the multi-liquid phase mixture, and equilibrium swing to lower gas solubility during desorption due to, for example, the formation of a single liquid phase solution from a multi-liquid phase mixture.

The present embodiment may be a drop-in technology. For example, the present embodiment may operate within a pressurized absorber, depressurized desorber process configuration, enabling low CAPEX and retrofit to, for example, water or organic physical solvent process. Retrofit may be as simple as replacing water or organic physical solvent with the LCST physical solvent in the present embodiment.

Summary FIG. 1B

An embodiment where the gas lean single liquid phase solution is cooled below its one or more UCSTs to form a multi-liquid phase solution, for example, before absorption. One or more gases may be absorbed into the multi-liquid phase solution, forming, for example, an acid gas-rich multi-liquid phase solution. The resulting gas rich solution may be subsequently heated and/or mixed to form a single liquid phase solution and may be stripped of the previously absorbed gases. Alternatively, said one or more gases may be absorbed into a multi-liquid phase solution, and, for example, said multi-liquid phase solution dissolves to form a different composition of liquid phases or a single liquid phase solution. Said mutually dissolving may be endothermic and may absorb, for example, a portion of the heat of absorption of one or more gases, and/or provide cooling during absorption.

The present embodiment may benefit from multiple driving forces. During absorption, relatively greater absorption capacity may be driven by, for example, including, but not limited to, the relatively cold temperature of the liquids and/or a greater equilibrium solubility of one or more gases in said multi-liquid phase mixture than said single liquid phase combined solution. Driving forces to facilitate the desorption of one or more dissolved gases may include, but are not limited to, relatively higher temperature than absorption, a relatively lower solubility of one or more gases in the combined single liquid phase solution than the multiphase liquid solution, or the entropy released during the mutual dissolution of the multiphase liquid into a single-phase liquid, or a combination thereof.

The embodiment may be a drop-in technology. If implemented as a drop-in technology or retrofit, depending on the pre-existing equipment, cooling before or during absorption and heating before or during desorption may already exist or may need to be added to a pressurized absorption, depressurized desorption process configuration.

The embodiment shown in FIG. 1B, along with other embodiments described herein, may comprise a gas, acid gas, basic gas, hydrocarbon, or combination thereof separation technology. In the present embodiment, the liquid phase transition may be complementary with the use of external cooling or heating input, as, for example, the multi-liquid phase may remain at said multi-liquid phase state with additional cooling and said single liquid phase combined solution may remain as a single liquid phase with additional heating. The present embodiment may benefit from the difference in solubility of one or more gases in the multi-liquid phase state compared to the single-liquid phase state, while also, for example, being able to benefit from a temperature swing between absorption and desorption. The present embodiment may employ a solution that forms a multi-liquid phase solution while cooling below one or more UCSTs and form a single-phase solution or a lesser multi-phase solution while heating above one or more UCSTs. Heating and cooling sources may be ambient or waste heat source, or may be parasitic sources, for example a heat pump or steam, or may comprise one or more heating or cooling sources described herein or known in the art.

| Example Inputs and Outputs FIG. 1A | |
|---|---|
| Example INPUTS | Example OUTPUTS |
| Acid Gas Laden Gas (G-1 and G-2)<br>Air or Other Acid-Gas Lean Gas (G-4) | Acid Gas-Rich Air (G-5)<br>or captured acid gas<br>Acid Gas-Lean Gas (G-3) |

| Example Inputs and Outputs FIG. 1B | |
|---|---|
| Example INPUTS | Example OUTPUTS |
| Acid Gas Laden Gas (G-1 and G-2)<br>Air or Other Acid-Gas Lean Gas (G-4)<br>Electricity (Gas Compressor, Liquid Pumps, Pretreatment Equipment)<br>Heating (H-1)<br>Cooling (CW-1) | Acid Gas-Rich Air (G-5)<br>or captured acid gas<br>Acid Gas-Lean Gas (G-3) |

Example Step by Step Description FIG. 1A

1. Gas Absorption: One or more or a combination of gas streams (G-1) is pressurized (Gas Compressor, G-2) and contacted with a desired gas-lean, single liquid phase solution (L-2), forming a gas stream lean in one or more gases (G-3) and a desired gas-rich multi-liquid phase solution (L-1).
   Note: During absorption, heat may be released, due to, for example, the enthalpy of absorption, and the concentration of one or more desired gases may increase in one or more of the liquid phases. At least a portion of the heat released due to the heat of absorption may be absorbed due to an endothermic phase transition of the liquid system from a one liquid phase solution into a multi-liquid phase mixture. Said endothermic phase transition may enable a near constant or relatively more constant temperature profile in the absorption stage. Said resulting multi-liquid phase solution may have a higher solubility of one or more desired gases than the initial single liquid phase solution.
2. Gas Air Stripping: A multi-liquid phase mixture rich in one or more desired gases (L-1) may be depressurized and/or transferred to one or more desired gas desorption or stripping units. In said one or more desorption of stripping units, L-1 may be contacted with one or more gases lean in one or more desired gases (G-4), such as air. One or more desired gases may desorb from the said multi-liquid phase solution, in which may result in the formation of air rich in one or more desired gases (G-5) and at least a portion of a single liquid phase solution lean in one or more desired gases.

Desorption/stripping may generally be considered endothermic and may result in the temperature of the column or flash unit to decrease. Said temperature decrease may be at or below or pass through one or more LCSTs of the multi-liquid phase mixture, resulting in, for example, the exothermic mutual dissolution of one or more said liquid phases and/or the formation of a single liquid phase combined solution. A portion of or at least a portion of said heat may derive from heat absorbed during the absorption of one or more gases. Said dissolution may also reduce or eliminate heating demands in the desorber/stripper. Furthermore, said combined, single phase solution may possess a lower solubility of one or more gases compared to said multi-liquid phase mixture, potentially further facilitating desorption of one or more gases.

Example Step by Step Description FIG. 1B

1. Forming a Multi-Liquid Phase Mixture: A desired gas-lean, single liquid phase solution (L-4) may be cooled to at or below one or more UCSTs of the liquid system, which may result in the formation of a cooled, multi-liquid phase mixture (L-5).
2. Gas Absorption: One or more or a combination of gas streams containing one or more desired gases (G-1) may be pressurized (Gas Compressor, G-2) and contacted with L-5, which may result in the formation of a gas stream lean in one or more desired gases (G-3) and a multi-liquid phase mixture rich in one or more desired gases (L-1) or single liquid phase solution rich in one or more desired gases (L-2) or a combination thereof.
3. Transition of Multi-Liquid Phase Mixture into a Combined Single Liquid Phase Solution: A multi-liquid phase mixture rich in one or more desired gases (L-1) may be heated to at or above one or more UCSTs, which may result in formation of a single liquid phase solution (L-3). Said heating may employ using, for example, one or more heat exchangers (H-1, L-2) and said dissolution may be further facilitated by mixing in, for example, a static mixer (Static Mixer).
4. Desorption
   a. Gas Air Stripping: A single liquid phase solution rich in one or more desired gases (L-3) may be depressurized and contacted with air lean in one or more desired gases (G-4) in, for example, a gas-liquid contactor. One or more desired gases may desorb from said single liquid phase solution rich in one or more desired gases into air lean in one or more desired gases (G-4), which may form one or more liquid phases lean in one or more desired gases (L-4) and air rich in one or more desired gases (G-5).
   b. Captured Acid Gas Desorption: A single liquid phase solution rich in one or more desired gases (L-3) may be depressurized and/or may undergo further heating before or within one or more desorption units. One or more desired gases may desorb from said solution rich in one or more desired gases, which may result in an acid gas-lean liquid solution one or more liquid phases lean in one or more desired gases and one or more captured gas phase desired gases or gas streams. Said one or more desired gases or gas streams may be further treated to remove water vapor or other contaminants or further separated before, for example, end-use.

FIG. 1B: Example Performance Driving Forces

- Equilibrium Solubility Swing: The single liquid phase combined solution state of the liquid system may possess lower equilibrium solubility of one or more desired gases relative to the solubility of said one or more desired gases in a multi-liquid phase state of the liquid system.
- Absorption may occur at cooler temperatures: A cooled absorption solution may be a multi-liquid phase mixture because, for example, the multi-liquid phase mixture may form from cooling below one or more UCSTs. Said existence of a multi-liquid phase liquid mixture in a cooled absorption unit may reduce or eliminate the need for the separation of one or more liquid phases or the use of two or more separate absorbers or a combination thereof.
- Desorption may occur at higher temperatures
- Desorption may occur at higher temperatures while receiving the benefits of the potentially reduced equilibrium solubility from the combined single liquid phase solution. This may be due to, for example, the solution forming a single liquid phase from two or more liquid phases below a certain temperature, enabling, for example, said solution to be heated while remaining a single liquid phase solution. As a result, the process may possess the benefits antisolvent gas solubility reduction (wherein, for example, on or more of said liquid phases dissolved in said liquid solution comprises an antisolvent or exhibits the properties of an antisolvent), while making use of available heat.
- The present embodiment may employ the multi-liquid phase mixture, which may form before absorption, as a means of cooling during absorption. For example, the multi-liquid phase mixture may absorb a portion of the heat resulting from the heat of absorption through, for example, endothermic phase transition of the multi-liquid phase mixture into a single liquid phase solution. may employ cooling for, for example, cooling clouding or phase change, prior to the absorber. Said benefit may enable cooling during absorption, including, but not limited to: 1) without or with less requirement of external cooling during absorption; 2) reduced delta-T of cooling input (potentially allowing for a higher input cooling temperature, which may reduce cooling energy requirements); 3) a combination thereof.

FIG. 2 (A, B) and FIG. 3 (A, B)

Summary (FIG. 2A)

An embodiment where one or more desired gases are absorbed in a desired gas lean liquid phase which may comprise at least a portion physical solvent, which may possess, for example, including, but not limited to, higher solubility or capacity or superior absorption properties for one or more desired gases. The absorption of one or more desired gases may result in a desired gas rich liquid, which may be then mixed and dissolved with one or more antisolvent liquid phases, which may result in the formation of a combined single liquid phase. Said antisolvent may comprise one or more liquid phases with lower solubility of one or more desired gases or a liquid phase which may combine with said physical solvent to form a single liquid phase solution with lower solubility of the desired gas or superior properties for desorbing said desired gas or gases, or a combination thereof. Following or during said combining to form two or more liquid phases to form a single liquid phase solution, one or more desired gases may be desorbed from said solution, which may result in a desired gas lean solution and desorbed or captured desired gas. Said resulting desired gas lean single liquid phase solution may be heated (or cooled if said solution exhibits a UCST) to form a multi-liquid phase mixture. Said multi-liquid phase mixture may be separated into two or more separated or partially separated liquid phases using one or more liquid-liquid separation devices. One or more of said separated or partially separated liquid phases may function as the desired gas lean physical absorbent. One or more of said separated liquid phases may function as the antisolvent.

Summary (FIG. 2B)

Similar embodiment to FIG. 2A. The present embodiment may employ desorption to produce captured desorbed gas. Cooling may be employed in the embodiment to facilitate dissolution if, for example, the embodiment exhibits an LCST.

Summary (FIG. 3A)

An embodiment where one or more desired gases may be absorbed in the two or more liquid phases, which may have previously formed from an LCST or UCST phase change. The embodiment employs air stripping of the desired gas or gases.

The two liquid phases shown in FIG. 3A may absorb one or more desired gases in two or more separate absorbers, wherein each absorber may be specific to each of the separated or partially separated liquid phases. This may enable multiple benefits, including, but not limited to, one or more or a combination of the following:

- The liquid phases, including liquid phases with relatively less desired gas solubility, such as an antisolvent, may be contacted with the incoming gas and may be enriched with desired gas. This may ensure the antisolvent, as the liquid phases (including the antisolvent, if, for example, one or more of the liquid phases functions as an antisolvent) may be nearly saturated with desired gas.
- The absorption units may be cooled below the LCST of the two or more liquid phases, for example, while the two or more liquid phases are separate. The liquid phases may be separate and, thus, may remain separate liquid phases during absorption rather.
- May enable selective absorption of one or more gases relative to one or more other gases in one absorber compared to another absorber. One or more of said one or more gases, may be, for example, selectively desorbed or stripped before re-combining the two or more liquid phases.

Summary (FIG. 3B)

Similar embodiment to FIG. 3A. The present embodiment may employ desorption to produce captured desorbed gas. Cooling may be employed in the embodiment to facilitate dissolution if, for example, the embodiment exhibits an LCST.

| Example Inputs and Outputs FIGS. 2A and 3A | |
|---|---|
| Example INPUTS | Example OUTPUTS |
| Acid Gas Laden Gas (G-1 and G-2)<br>Air or Other Acid-Gas Lean Gas (G-4 in 2A, G-5 in 3A)<br>Electricity (Gas Compressor, Liquid Pumps, Pretreatment Equipment)<br>Heat<br>Cooling | Acid-Gas Lean Gas Stream (G-3 in 2A, G-4 in 3A) (For example-pure or nearly pure methane)<br>Acid-Gas Rich Air (G-5 in 2A, G-6 in 3A) |

| Example Inputs and Outputs FIGS. 2B and 3B | |
|---|---|
| Example INPUTS | Example OUTPUTS |
| Acid Gas Laden Gas (G-1 and G-2)<br>Electricity (Gas Compressor, Liquid Pumps, Pretreatment Equipment)<br>Heat<br>Cooling | Acid-Gas Lean Gas Stream (G-3 in 2B, G-4 in 3B) (For example-pure or nearly pure methane)<br>Captured Acid Gas (G-4 in 2B, G-5 in 3B) |

Example Step by Step Description

1. Gas Absorption in Physical Solvent:
   - a. FIGS. 2A and 2B: One or more or a combination of gas streams containing one or more desired gases (G-1) may be pressurized (Gas Compressor, G-2) and may be contacted with a physical solvent lean in one or more desired gases (L-1). At least a portion of one or more desired gases may be absorbed, which may result in the formation of physical solvent rich in one or more desired gases (L-2) and/or a gas stream lean in one or more desired gases (G-3).
   - b. FIGS. 3A and 3B: One or more or a combination of gas streams containing one or more desired gases (G-1) may be pressurized (Gas Compressor, G-2) and may be contacted with a physical solvent lean or antisolvent rich aqueous solution (L-2, Abs #1) and a physical solvent lean in one or more desired gases (L-1, Abs #2). At least a portion of the one or more desired gases may be absorbed, which may result in the formation of physical solvent rich in one or more desired gases (L-3), antisolvent rich in one or more desired gases (L-4), and a gas stream lean in one or more desired gases (G-4).
2. Dissolution of Gas-Rich Physical Solvent into Antisolvent:
   - a. FIGS. 2A and 2B: Physical solvent rich in one or more desired gases (L-2) may be mixed with one or more antisolvent liquid phases (L-6), which may result in mutual dissolution and may form a physical solvent-antisolvent combined solution rich in one or more desired gases (L-3).
   - b. FIGS. 3A and 3B: Physical solvent rich in one or more desired gases (L-3) may be mixed with an antisolvent solution enriched with one or more desired gases (L-4), which may result in mutual dissolution and may form a physical solvent-antisolvent combined solution rich in one or more desired gases (L-5).
3. Desorption of One or More Gases:
   - a. FIG. 2A: Physical solvent-antisolvent combined solution rich in one or more desired gases (L-3) may be contacted with one or more stripping gases, such as air or gas lean in one or more desired gases (G-4) in, for example, one or more gas-liquid contacting columns ('Strip/Des'). One or more desired gases may desorb from said physical solvent-antisolvent combined solution rich in one or more desired gases into one or more stripping gases, such as air, which may result in the formation of outlet air rich in one or more desired gases (G-5) and physical solvent-antisolvent combined solution lean in one or more desired gases (L-4).
   - b. FIG. 2B: Physical solvent-antisolvent combined solution rich in one or more desired gases (L-3) may be depressurized in, for example, a gas desorption vessel ('Strip/Des'), which may result in the desorption of captured one or more desired gases (G-4) and physical solvent-antisolvent combined solution lean in one or more desired gases (L-4). The solution may be agitated or mildly heated (for example: below the cloud-point temperature) to, for example, facilitate desorption. Another option, may be, for example: a portion of captured desired gas may be recirculated and/or sparged into the solution with a pressure released valve to release a portion of the captured desired gas, which may enable a portion of the capture desired gas to function as a stripper or carrier gas and may facilitate desired gas desorption. Captured desired gas may undergo further treatment or compression, including, but not limited to, for example, the removal of a portion of the water vapor.
   - c. FIG. 3A: Physical solvent-antisolvent combined solution rich in one or more desired gases (L-5) may be contacted with one or more stripping gases, such as air or gas lean in one or more desired gases (G-5) in, for example, one or more gas-liquid contacting columns ('Strip/Des'). One or more desired gases may desorb from said physical solvent-antisolvent combined solution rich in one or more desired gases into one or more stripping gases, such as air, which may result in the formation of outlet air rich in one or more desired gases (G-6) and physical solvent-antisolvent combined solution lean in one or more desired gases (L-6).
   - d. FIG. 3B: Physical solvent-antisolvent combined solution rich in one or more desired gases (L-5) may be depressurized in, for example, a gas desorption vessel ('Strip/Des'), which may result in the desorption of captured one or more desired gases (G-5) and physical solvent-antisolvent combined solution lean in one or more desired gases (L-6). The solution may be agitated or mildly heated (for example: below the cloud-point temperature) to facilitate acid gas desorption. Another option, may be, for example: a portion of captured desired gas may be recirculated and/or sparged into the solution with a pressure released valve to release a portion of the captured desired gas, which may enable a portion of the capture desired gas to function as a stripper or carrier gas and may facilitate desired gas desorption. Captured desired gas may undergo further treatment or compression, including, but not limited to, for example, the removal of a portion of the water vapor.

4. Forming a Multiphase Liquid Mixture from Single Liquid Phase Solution:
   a. FIGS. 2A and 2B: Physical solvent-antisolvent combined solution lean in one or more desired gases (L-4) may be heated (H-1) to a temperature at or above the cloud-point temperature or LCST (cooled below a cloud-point temperature in the case a UCST liquid system is employed), which may result in the formation of a multi-liquid phase mixture (L-5) comprising one or more physical solvent liquid phases lean in one or more desired gases and one or more antisolvent liquid phases lean in one or more desired gases.
   b. FIGS. 3A and 3B: Physical solvent-antisolvent combined solution lean in one or more desired gases (L-6) may be heated (H-1) to a temperature at or above the cloud-point temperature or LCST (cooled below a cloud-point temperature in the case a UCST liquid system is employed), which may result in the formation of a multi-liquid phase mixture (L-7) comprising one or more physical solvent liquid phases lean in one or more desired gases and one or more antisolvent liquid phases lean in one or more desired gases.

5. Liquid-Liquid Separation and Cooling of Physical Solvent:
   a. FIGS. 2A and 2B: The multi-liquid phase mixture (L-5) may be separated into one or more physical solvent separated liquids (L-1) and one or more antisolvent separated liquids (L-6) using, for example, one or more or a combination of methods for separating liquid-liquid mixtures (LLS-1). Each stream (for example: L-1 and L-6) may be cooled before or during or after the absorption of one or more gases absorption. Said cooling may be conducted, if desired, after separation of each liquid stream.
   b. FIGS. 3A and 3B: The biphasic mixture (L-7) is separated into a concentrated physical solvent stream (L-1) and a physical solvent-lean, acid gas lean aqueous solution stream (L-2) using one or more or a combination of multiphase liquid—liquid separation methods (LLS-1). Each stream (for example: L-1 and L-2) may be cooled before or during or after the absorption of one or more gases absorption. Said cooling may be conducted, if desired, after separation of each liquid stream.

Example Performance Driving Forces

Partial Pressure Equilibrium Swing or Solubility Swing: One of the underlying principles of the present embodiment may include the ability of the present embodiment to absorb one or more desired gases under in a state where the solubility of the desired gas or gases may be equivalent to or near the solubility of a high solubility physical absorbent (for example: Selexol or Rectisol), while the desorption may occur in a state where the solubility of the desired gas or gases is relatively less than the state during absorption or similar, equivalent, or less than the solubility of the desired gas, in a lower gas desired gas solubility liquid (for example, for acid gases, dilute aqueous solution, water or salt water solution). Said equilibrium desired gas solubility shift may occur with the use of relatively abundant low temperature heat. During absorption, the primary absorption solution may comprise a rich or nearly pure physical solvent (which may, for example, comprise physical solvents known in the art or other physical solvents described herein), which may exhibit relatively high solubility of one or more desired gases per unit of physical solvent. To shift the equilibrium partial pressure to of one or more desired gases before or during desorption, physical solvent rich in one or more desired gases may be mixed or dissolved in a solution exhibiting low solubility of one or more desired gases (for example: an aqueous salt water solution) or a solution lean in physical solvent, a combination thereof, or another example antisolvent. Said dissolving may significantly reduce the solubility of one or more desired gases in the physical solvent, resulting in a significant increase in the solubility of one or more desired gases partial pressure and facilitating the desorption of one or more desired gases (with, for example, less required of the heat input generally required to generated equilibrium shift). After the desorption of one or more desired gases, the physical solvent may be regenerated from the combined solution by mildly heating to or above the solution's one or more LCSTs, if applicable, or cooling below the solution's one or more UCSTs, if applicable.

Higher Solution Capacity:

Lower CAPEX, smaller unit size and footprint

May possess greater absorption solubility compared to water and may possess less energy or valuable sources of energy required from acid gas stripping compared to other physical solvent processes, such as Selexol.

Superior Acidic Gas Desorption Kinetics

Partial Pressure Equilibrium Swing without or with minimal Heat Input

Reduces or Eliminates the Requirement of Heat Input during desorption of one or more desired gases Non-Volatile, Non-Toxic, Non-Corrosive Reagents Separating the two or more liquid phases may enable the phases to be cooled without re-dissolution upon cooling below said liquid phases LCST. Because the liquid phases are separate, it may not possible for the liquid phases to dissolve in each other when they are not in contact with each other.

FIGS. 4 and 5

SUMMARY

FIGS. 4 and 5 may comprise a similar process to the embodiments shown in FIGS. 2A, 2B, 3A, and 3B. The process may be different in that the phase transition into a multi-liquid phase mixture may be generated by cooling the solution below one or more UCSTs.

Summary (FIG. 4)

An embodiment where the one or more desired gases may be absorbed in one or more desired gas lean physical solvents. The embodiment may employ a liquid system possessing one or more UCSTs, where, for example, a single liquid phase combined solution may be 'cooled' below one or more UCSTs, which may result in the formation of a multi-liquid phase mixture. The liquid phases may be at least partially separated using one or more or a combination of liquid-liquid separation devices. In the present embodiment, one or more dissolved gas lean liquid phases, which may possess relatively higher solubility or capacity or superior absorption properties for one or more desired gases, may be transferred to one or more absorption units, where, for example, one or more gases may be absorbed into said one or more liquid phases. Advantageously, the liquid may be relatively 'cool' before entering the one or more absorption units as it may be relatively 'cool' due to, for example, resulting from being cooled below one or more UCSTs. Said absorption of one or more gases in one or more liquid phases may result in one or more liquid phases rich in one or more dissolved gases. Said one or more liquid phases rich in one or more gases may be mixed with the one or more other liquid phases and/or may be heated to, for example, form a single liquid phase combined solution. Said single liquid phase combined solution may form before, during, or after one or more gas desorption unit (for example: said one or more liquid phases may be heated or mixed or agitated or combination thereof in the desorption unit). Alternatively, the combined single liquid phase solution may form before the desorption unit and then may be transferred to the desorption unit. Advantageously, gas desorption may be facilitated by, including, but not limited to, the dissolution of the of the other phases to form a lower gas solubility combined solution or the heating of said one or more liquid phases or heating of said combined solution or a combination thereof. Because said combined solution may exhibit one or more UCSTs (for example: one or more additional liquid phases or multi-liquid phase solution form upon cooling below one or more UCSTs), gas desorption may be facilitated by both the potential reduced solubility of one or more gases in said combined single liquid phase solution (or, alternatively, in said multi-liquid phase solution) and/or the supply of heat during desorption. Heating and antisolvent solubility reduction may exist simultaneously and may mutually benefit each other. The present embodiment may employ air stripping to, for example, desorb the desired gas or gases. Desorption or flashing of the desired gas or gases to, for example, produce one or more captured gases may also or alternatively be employed.

Summary (FIG. 5)

An embodiment where the one or more gases may be absorbed in the two or more liquid phases, which may be at least partially separated liquid phases. Said two or more liquid phases may have previously formed from one or more phase transitions, for example, which may include, but are not limited to, one or more UCST phase changes in, for example, a liquid system. Said at least partially separated liquid phases may result from the at least partial separation of one or more liquid phases in a multi-liquid phase mixture, which may have resulted from one or more phase transitions. Said one or more liquid phases may absorb one or more gases in one or more separate absorption columns, for example, wherein one or more liquid phases may be separate from one or more other liquid phases during the absorption of one or more gases. The present embodiment may employ air stripping of the desired gas or gases. Also, or alternatively, the embodiment may employ flashing or other form of desorption to form, for example, captured or desorbed gas. The two or more liquid phases shown in FIG. 5 may absorb gas in two separate absorbers, one absorber may be for each liquid phase. This may enable multiple benefits, which may include, but are not limited to, one or more or a combination of the following:

- One or more liquid phases, which may include liquid phases with relatively lower solubility of one or more desired gases, may absorb one or more desired gases. This may prevent dilutive effects of an antisolvent because, for example, the one or more liquid phases (which may include one or more antisolvents, if, for example, one or more of the liquid phases functions as an antisolvent) may be nearly saturated with desired gas.
- The absorption units may be cooled below the one or more cloud point temperatures while the two or more liquid phases may remain two or more liquid phases. The liquid phases may separate and, thus, may not dissolve in each other when they are not in contact. Said separation of liquid phases may be important, for example, when two or more liquid phases may be desired not to dissolve in each other under one or more circumstances where, for example, the temperature of one or more liquid phases may be at or above one or more UCST and/or at or below one or more LCSTs.
- May enable selective absorption of one or more gases relative to one or more gases in one absorber compared to another absorber. One or more gases, may be, for example, selectively desorbed or stripped before recombining the two or more liquid phases.

One or more at least partially separated liquid phases may be combined and/or heated to form, for example, a combined single liquid phase solution. If, for example, one or more of the liquid phases may be rich in one or more dissolved gases before or during desorption, said combining of said liquid phases may result in greater gas equilibrium partial pressure or lower gas solubility or a solubility equilibrium shift, or combination, as said combined single liquid phase solution may have different solubility properties and/or specifications than, for example, one or more of said separate liquid phases. Advantageously, the combined single liquid phase liquid solution may be heated during desorption, as, for example, said single liquid phase combined solution may continue to be a single liquid phase at elevated temperatures. The one or more benefits of said forming of a combined single liquid phase solution from a multi-liquid phase solution and/or the ability to add heat, potentially simultaneously, or combination thereof, may include, but is not limited to, greater cyclic capacity, desorption rate, absorption rate, lower CAPEX, lower OPEX, higher selectivity, or a combination thereof.

Note: An alternative embodiment may produce pure $CO_2$ or other acid gas.

FIG. 6 (A, B)

Summary (FIG. 6A)

The present embodiment may employ a 'basic salt solution' with physical or physiochemical properties for acid gas absorption or selective absorption of acid gases relative to basic gases or selective absorption of acid gases relative to non-acid gases. Alternatively, the present embodiment may employ an 'acidic salt solution' with physical or physiochemical properties for basic gas absorption or selective absorption of basic gases relative to acidic gases or selective absorption of basic gases relative to non-basic gases. Said basic salt solutions may, for example, exhibit a higher solubility of acid gases (for example: $CO_2$) or other acidic reagents, than, for example, said gases in DI water, however may maintain one or more similar properties or characteristics to physical solvents, which may include, but not limited to, one or more or a combination of the following: not forming a chemical reaction with $CO_2$ or other acid gas or gases, forming a non-permanent salt with $CO_2$ or other acid gas or gases with significantly lower reaction energy compared to conventional $CO_2$ capture absorbents, or a combination thereof. Said acidic salt solutions may, for example, exhibit a higher solubility of basic gases or other basic reagents than, for example, said gases or reagents in DI water, however may maintain one or more similar properties or characteristics to physical solvents, which may include, but not limited to, one or more or a combination of the following: not forming a chemical reaction with basic gases, forming a non-permanent salt with basic gas or gases with significantly lower reaction energy compared to conventional acid scrubbing solutions, or a combination thereof. The present embodiment may employ air stripping to strip one or more absorbed gases. The present embodiment may employ heating to, for example, facilitate desorption of one or more gases. Alternatively, or additionally, the present embodiment may desorb gas to form, for example, one or more captured gases.

Advantages of the present embodiment may include, but are not limited to, one or more or a combination of the following:

High absorption capacity of one or more acid gases or basic gases
Ultra-low solvent cost
Lower pressure operation relative to other physical solvents
Resistance to degradation or corrosion or both
May not require pretreatment of one or more gases or input gases streams if desired Summary (FIG. 6B)

Similar embodiment to FIG. 6A. The present embodiment may employ desorption to produce captured desorbed gas.

| Example Inputs and Outputs FIG. 6A | |
|---|---|
| Example INPUTS | Example OUTPUTS |
| Acid Gas Laden Gas (G-1 and G-2)<br>Air or Other Acid-Gas Lean Gas (G-4)<br>Electricity (Gas Compressor, Liquid Pumps, Pretreatment Equipment)<br>Heat (optional)<br>Cooling (optional) | Acid-Gas Lean Gas Stream (G-3)<br>Acid-Gas Rich Air (G-5) |

| Example Inputs and Outputs FIG. 6B | |
|---|---|
| Example INPUTS | Example OUTPUTS |
| Acid Gas Laden Gas (G-1 and G-2)<br>Electricity (Gas Compressor, Heat Pump, Liquid Pumps, Pretreatment Equipment)<br>Heat (optional)<br>Cooling (optional) | Acid-Gas Lean Gas Stream (G-3) (For example-pure or nearly pure methane)<br>Captured Acid Gas (G-4) |

Example Step by Step Description

1. Gas Absorption: One or more or a combination of gas streams (G-1) may be pressurized (Gas Compressor, G-2) and may be contacted with a basic salt or acidic salt solution lean in one or more desired gases (L-1). At least a portion of one or desired gases may be absorbed, which may result in the formation of basic salt or acidic salt solution rich in one or more gases (L-2) and one or more gas streams lean in one or more desired gases (G-3).
2. Gas Desorption:
   Captured One or More Desired Gases: Basic salt or acidic salt solution rich in one or more gases (L-2) may be depressurized or heated or contacted with a condensable stripping gas or a combination thereof. One or more captured gases (G-4) (may contain some impurities, which may include, but is not limited to, water vapor) may be desorbed from said solution, which may result in the formation of a basic salt or acidic salt solution lean in one or more desired gases (L-1).
   Air or Other Carrier Gas Stripping of One or More Desired Gases: Basic salt or acidic salt solution rich in one or more gases (L-2) may be depressurized or heated or both and/or may be contacted with air and/or one or more other gases lean in or free of one or more desired gases (G-4). Said contacting or stripping may be conducted in one or more gas-liquid contacting units ('Strip/Des'). One or more desired gases may desorb from said basic salt or acidic salt solution rich in one or more gases, which may result in the formation of air containing one or more desired gases (G-5) and acidic salt or acidic salt solution lean in one or more gases (L-1).

Example Performance Driving Forces

High $CO_2$ Absorption Capacity
Ultra-Low Solvent Cost
Drop-in solvent
No or relatively minimal degradation of solvent

FIG. 7 (A, B, C)

Figure 7A:
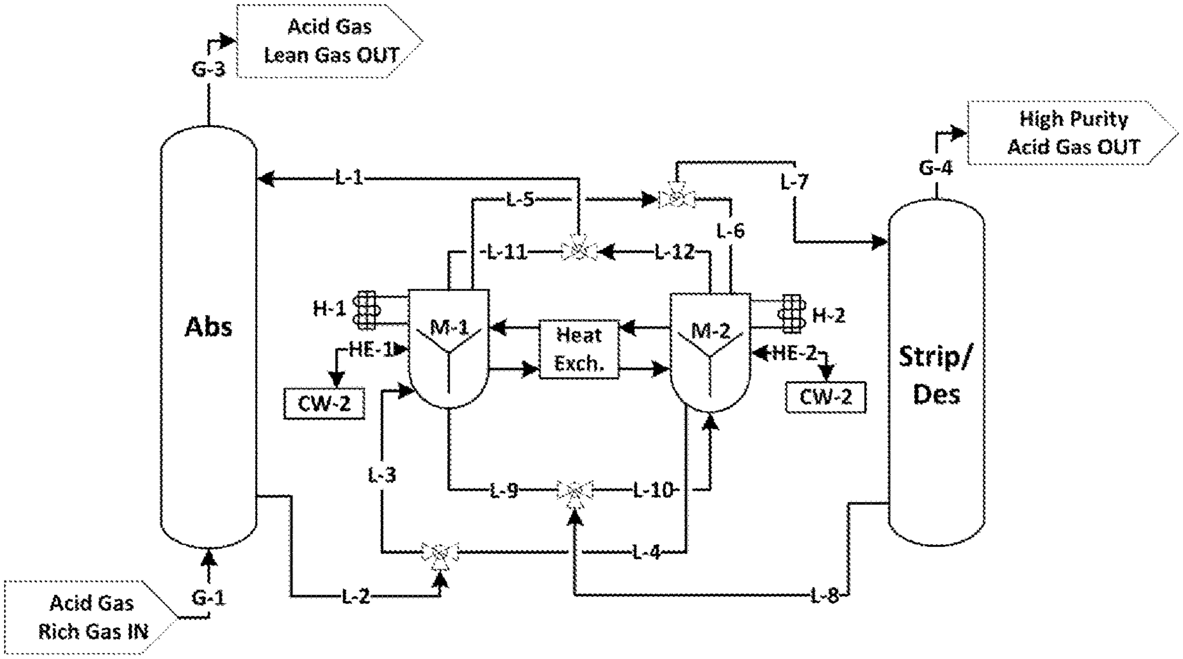
FIGS. 7A and 7B and 7C illustrate specific gas separation embodiments employing a heat exchanger or heat pump.

Summary (FIG. 7A)

The present embodiment may employ a 'basic salt solution' with physical or physiochemical properties for acid gas absorption or selective absorption of acid gases relative to basic gases or selective absorption of acid gases relative to non-acid gases. Alternatively, or also, the present embodiment may comprise a physical solvent solution.

The present embodiment further comprises one or more 'acidic reagents' with concentration dependent on temperature. The solution absorbs acid gas into a basic salt solution lean in acid gas and lean in 'acidic reagent,' resulting in a solution rich in acid gas and lean in 'acidic reagent.' The solution is then heated to dissolve additional 'acidic reagent,' increasing the concentration of the acidic reagent and decreasing the pH and solubility of the acid gas. The increase in 'acidic reagent' concentration and the increase in temperature have a noteworthy influence in facilitating an equilibrium or kinetics or combination thereof swing in favor of acid gas desorption.

The embodiment employs a heat exchanger between the solution being heated to dissolve 'acidic reagent' and the solution being cooled to precipitate 'acidic reagent.' Further heating or cooling may be required to overcome heat exchanger losses, heat exchanger delta-T, or other heat or cooling losses.

Figure 7B:
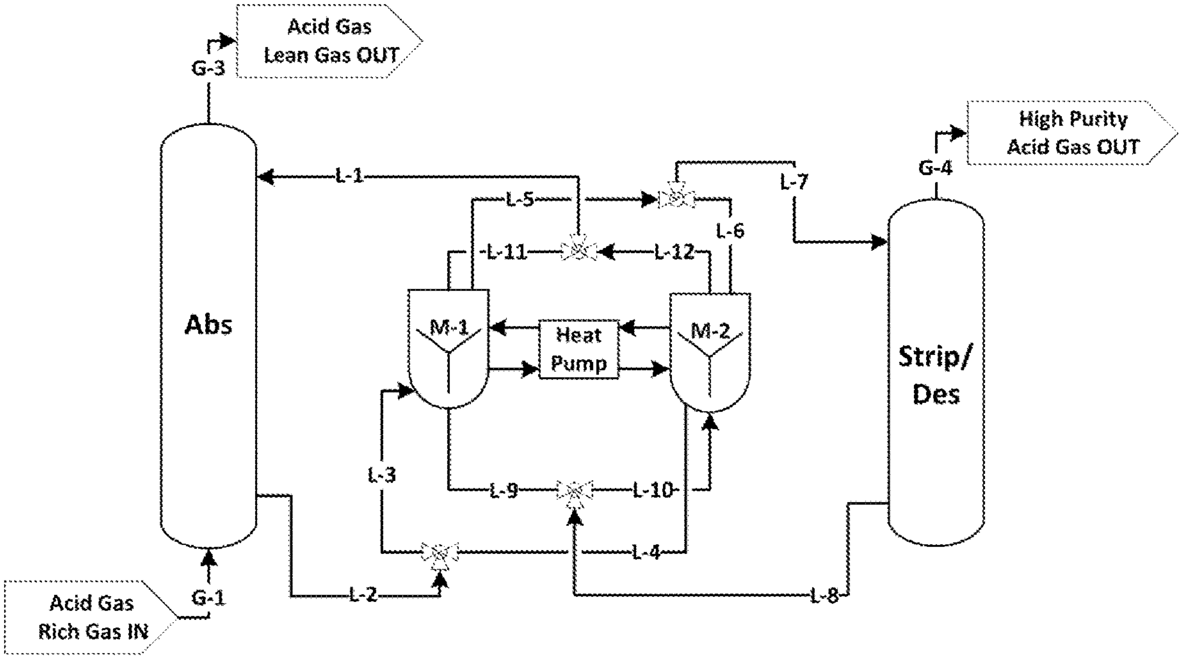

Summary (FIG. 7B)

Similar embodiment to the embodiment in FIG. 7A. The present embodiment employs a heat pump (for example: an electric or steam driven heat pump) to provide heat to the 'acidic reagent' dissolution unit and provide cooling to the 'acidic reagent' precipitation unit. The present embodiment desorbs captured acid gas.

Figure 7C:
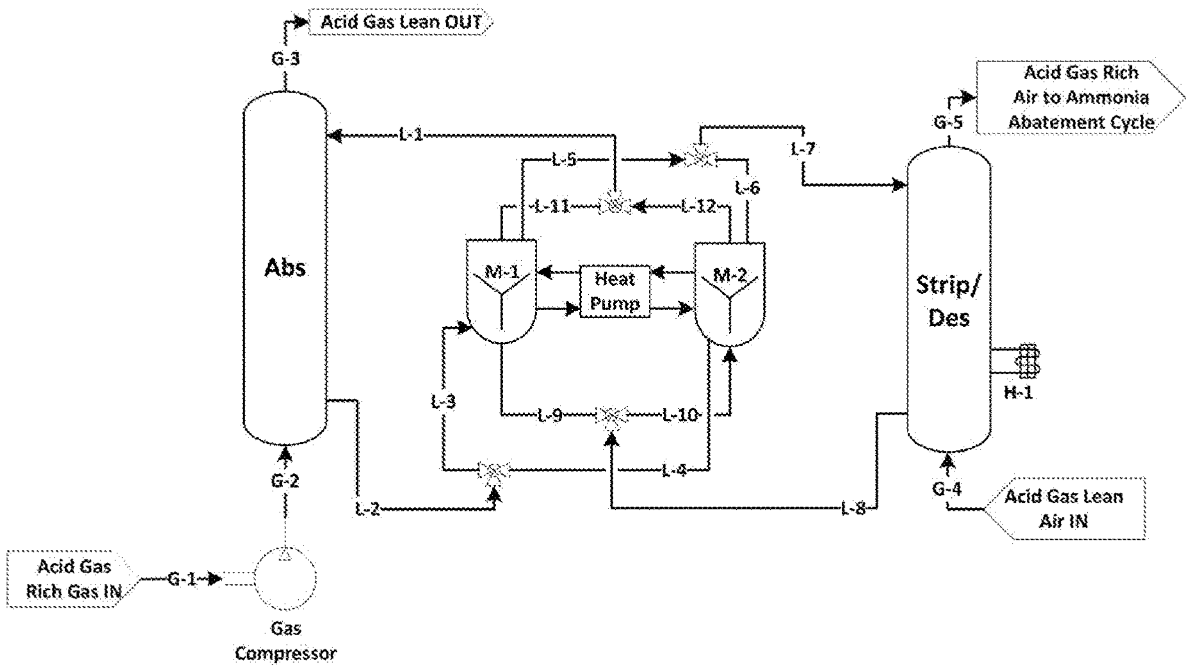

Summary (FIG. 7C)

Similar to the embodiment shown in FIG. 7B. Employs air stripping to strip acid gas or gases.

tion (L-2 and L-3) is transferred to a jacketed mixing vessel (M-1), where it is added to the pre-existing 'acidic reagent' in the vessel and may be heated to increase the solubility of the 'acidic reagent' and facilitate dissolution. 'Acidic reagent' dissolves in the 'acidic reagent—lean, $CO_2$-rich aqueous basic salt solution', forming an 'acidic reagent-rich, $CO_2$-rich aqueous basic salt solution' (L-5 and L-7), which is transferred to 'step 3'. The increased concentration of 'acidic-reagent' increases the equilibrium partial pressure of $CO_2$ or other acid gas.

3. Acid Gas Desorption or Stripping: Acidic reagent-rich, $CO_2$-rich aqueous basic salt solution (L-7) enters a stripping or desorption column.

In FIGS. 7A, 7B, and 7C without G-4 (without air stripping), captured $CO_2$ desorbs from the solution, forming a high purity $CO_2$ (G-4 in 7A and 7B) or other acid gas stream and an 'acidic reagent-rich, $CO_2$-lean aqueous basic salt solution' (L-8). It may be saturated with water vapor near desorber or condenser temperatures.

In FIG. 7C, $CO_2$ is air stripped from the solution (G-4 is input air), forming a $CO_2$-rich air stream (G-5) and an 'acidic reagent-rich, $CO_2$-lean aqueous basic salt solution' (L-8).

4. Cooling Precipitation of Acidic Reagent: The an 'acidic reagent-rich, $CO_2$-lean aqueous basic salt solution' (L-10) is cooled in a controlled precipitation vessel (M-2), precipi- Inputs and Outputs FIG. 7A and 7B

| Example INPUTS | Example OUTPUTS |
|---|---|
| Acid Gas Laden Gas (G-1)<br>Electricity (Gas Compressor, Heat Pump (7B), Liquid Pumps, Pretreatment Equipment)<br>Heat (optional) (for example: 7B)<br>Cooling (optional) (for example: 7B) | Acid-Gas Lean Gas Stream (G-3, because gas compressor and compressed gas (G-2) not shown) (For example-pure or nearly pure methane)<br>Captured Acid Gas (G-4, because gas compressor and compressed gas (G-2) not shown) |

Example Inputs and Outputs FIG. 7C

| Example INPUTS | Example OUTPUTS |
|---|---|
| Acid Gas Laden Gas (G-1 and G-2)<br>Air or Other Acid-Gas Lean Gas (G-4)<br>Electricity (Gas Compressor, Heat Pump, Liquid Pumps, Pretreatment Equipment) | Acid-Gas Lean Gas Stream (G-3) (For example-pure or nearly pure methane)<br>Acid Gas Rich Air (G-5) |

Note: The 'acidic reagent' is provided as an example '$CO_2$, or other acid gas or gases, Partial Pressure Shifting Reagent.' Other example applicable reagents or types of reagents are described herein.

Example Step by Step Description

1. Acid Gas Absorption: An acid gas stream (G-1 and G-2 in FIG. 7C) is contacted with an 'acidic reagent—lean, acid gas-lean aqueous basic salt solution' (L-1), resulting in the absorption of acid gas, forming an 'acidic reagent—lean, $CO_2$-rich aqueous basic salt solution' (L-2) and an acid-gas lean gas stream (G-2 in FIGS. 7A and 7B, G-3 in FIG. 7C).

2. pH Reduction through 'Acidic Reagent' Dissolution: The 'acidic reagent'-lean, $CO_2$-rich aqueous ammonia solutating acidic reagent and forming an 'acidic reagent—lean, acid gas-lean aqueous basic salt solution' (L-12 and L-1).

Example Performance Driving Forces

High $CO_2$ Solution Cyclic Capacity:

May not react with some independent weak acids or may react with independent weak acids with a reversible reaction:

Equilibrium swing using reversible reagent

Low Solvent Cost

No degradation

FIG. 8

Summary FIG. 8

FIG. 8 may comprise selective gas separation using one or more phase changes. One or more liquid phases may have affinity for one or more gases, which may include, but are not limited to, acid gases or hydrocarbons, while one or more other liquid phases may have affinity for one or more other or different gases, which may include, but are not limited to, acid gases or hydrocarbons. In the embodiment shown in FIG. 8, the one or more gases may be absorbed in a single liquid phase combined solution. The single liquid phase containing both gases may be transformed into a multi-liquid phase mixture, by, for example, change one or more system conditions to, for example, result in one or more phase transitions, UCSTs, or LCSTs. One or more liquid phases may be rich in specific dissolved gases or liquids and lean in other dissolved gases or liquids and one or more liquid phases may be rich in other or different dissolved gases or liquids. Said multi-liquid phase mixture may be rich or lean in opposite dissolved gases or liquids. For example, one liquid phase may be relatively rich in $CO_2$ and relatively lean in $H_2S$, while another liquid phase may be relatively rich in $H_2S$ and relatively lean in $CO_2$. For example, one liquid phase may be relatively rich in $CO_2$ and relatively lean in $H_2S$, while another liquid phase may be relatively rich in $H_2S$ and relatively lean in $CO_2$. For example, one liquid phase may be relatively rich in $CO_2$, while another liquid phase may be relatively rich in hydrocarbon gases. For example, one liquid phase may be relatively rich in light hydrocarbons or VOCs, while another liquid phase may be relatively rich in heavier hydrocarbons. For example, one liquid phase may be relatively rich in aromatic hydrocarbons, while another liquid phase may be relatively rich in straight-chain hydrocarbons. For example, one liquid phase may be relatively rich polar liquids or dissolved gases, and another liquid phase may be relatively rich in non-polar liquids or dissolved gases. For example, one liquid phase may be relatively rich in methane, while another liquid phase may be relatively rich in ethane. For example, one liquid phase may be relatively rich in natural gas liquids, while another liquid phased may be relatively rich in other gas constituents. For example, one liquid phase may be relatively rich in oxygen, while another liquid phase may be relatively rich in nitrogen.

The concentration of specific dissolved gases in the two or more liquid phases, which may result from one or more phase transitions, may differ between liquid phases. Each liquid phase may have a different concentration of one or more dissolved gases than, for example, the combined solution before phase change. During or after phase change or both, one liquid phase may have a higher affinity for one or more dissolved gases or liquids, while another liquid phase may have a higher affinity for one or more other or different dissolved gases or liquids. Said liquid phases may be separated using a liquid-liquid separation device. Said liquid phases may undergo separate desorption or regeneration processes to remove or capture one or more dissolved gases or liquids. For example, a $CO_2$—Rich liquid phase may be air stripped and an $H_2S$-Rich liquid phase may be stripped of $H_2S$ and/or $H_2S$ may be transferred to a Claus Process or may be selectively oxidized in situ to produce, for example, sulfur or a sulfide or sulfur salt, or combination thereof. For example, heavier hydrocarbon rich liquid or petroleum liquids may be stripped and condensed or may be salted out or may be thermally switched or undergo one or more or a combination of methods of remove, recovery or regeneration, or combination thereof. For example, lighter hydrocarbon rich liquid may be stripped and compressed or may be salted out or may be thermally switched or undergo one or more or a combination of methods of removal or recovery of the liquid hydrocarbon. The method of regeneration may be dependent one the one or more dissolved gases or liquids being recovered from one or more specific liquid phases. Said separation of these gases may be more selective and efficient, due to, including, but not limited to, one or more phase transitions resulting in a higher concentration of one or more constituents in one or more liquid phases compared to one or more other constituents.

The present embodiment may be, for example, a technology for separating or concentrating individual components of air. For example, air may be compressed and absorbed into the combined single-phase solution. Said single-phase liquid may be undergo additional changes in system conditions to form or facilitate the formation of a multi-liquid phase mixture. For example, one liquid phase may, for example, have a higher concentration of oxygen than, for example, another liquid phase. For example, one liquid phase may, for example, have a higher concentration of nitrogen than, for example, another liquid phase. For example, one liquid phase may, for example, have a higher concentration of oxygen relative to nitrogen, or vice versa, than, for example, another liquid phase.

One or more dissolved gases in each individual liquid phases may be desorbed in units specific to desorbing said one or more gases in the associated liquid phases. Said desorbed gases may be, for example, higher in relative concentration or partial pressure of oxygen, or for example, higher in relative concentration or partial pressure of nitrogen.

One potential benefit of the above process may be that the gases desorbed may be at similar or greater partial or total pressure than the compressed gas entering the absorber stage. As a result, energetic losses due to pressurization may be minimal, while simultaneously achieving significant partial pressure differences in one or more of the resulting gas phases.

One or more of the resulting desorbed gases may be further concentrated or purified using a membrane, PSA, cryogenic methods, or a combination thereof. One example application for a more concentrated oxygen stream may be in combustion, which may enable, for example, more efficient power generation, higher temperature combustion, and/or the resulting flue gas possessing a have higher concentration of $CO_2$ or near pure or pure $CO_2$ (which may enable lower energy consumption and capital cost $CO_2$ capture).

Example Inputs and Outputs FIG. 8

| Example INPUTS | Example OUTPUTS |
|---|---|
| Gas #1 and Gas #2 Rich Gas (G-1)<br>Gas #1 Lean Air IN (G-4)<br>Electricity (Gas Compressor, Liquid Pumps, Pretreatment Equipment)<br>Heat<br>Cooling | Captured Gas #2 (G-6)<br>Gas #1 Rich Air (G-5) |

Example Step by Step Description

1. Gas Absorption: One or more or a combination of gas streams rich in one or more desired gases (G-1) may be pressurized (Gas Compressor, G-2) and contacted with a desired gas-lean, single liquid phase solution (L-1), which may form a gas stream lean in one or more desired gases (G-3) and a single liquid phase solution rich in one or more desired gases (L-2).

a. Note: In some embodiments, all or almost all gas in G-1 may absorb, in which case a lean exiting gas may not form.

2. Phase Transition of Gas Rich Combined Solution into Two or More Phases: Single liquid phase solution rich in one or more gases (L-2) may be heated (H-1) to a temperature equal to or above a cloud-point temperature range for said solution, forming a multi-liquid phase mixture rich in one or more desired gases (L-3).
3. Liquid-Liquid Phase Separation: Said multi-liquid phase mixture rich in one or more desired gases (L-3) may be at least partially separated into its two or more constituent liquid phases (L-4 and L-5) using, for example, one or more liquid-liquid separation devices (LLS-1).
4. Gas or Liquid Desorption or Regeneration from Each Liquid Phase: Each at least partially separated liquid phase (L-4, L-5, or more liquid phases or a combination thereof) may be transferred to one or more desorption units (Des #1 and Des #2), which may be specifically designed to desorb or recover one or more dissolved gases or dissolved liquids or combination thereof. In, for example, Des #2, dissolved gas #2 rich solution (L-4) may be depressurized or heated or both, which may result in the desorption of captured desired gas #2 from solution (G-6) and gas #2 lean solution (L-6). In, for example, Des #1, dissolved gas #1 rich solution (L-5) may be, for example, air stripped using, for example, gas #1 lean air (G-4), which may form gas #1 rich air (G-5) and gas #1 lean solution (L-7).
5. Gas Lean Liquid-Liquid Phase Mixing and Dissolution: Dissolved gas #2 lean solution (L-6) and dissolved gas #1 lean solution (L-7) may be cooled (if, for example, the liquid system exhibits one or more LCSTs) (CW-1) and mixed, which may result in the dissolution and the formation of a dissolved gas-lean, single liquid phase combined solution (L-1).

Example Performance Driving Forces

Selective concentrating and separation of dissolved gases due to multiphasic phase change Higher concentration of one or more dissolved gases relative to single phase liquid solution Desorption can occur at higher temperatures if desired Desorption can occur under very different conditions using very different techniques without exposing the other liquid phase or phases to the same conditions.

Higher concentration of one or more dissolved gases relative to single phase liquid solution equilibrium concentration of dissolved Capability of stripping one or more dissolved gases under conditions best suited for stripping one or more dissolved gases, without exposing the bulk of another dissolved gas to the same conditions.

Superior properties for desorbing one or more dissolved gases in one or more separate liquid phases relative to the combined single-phase liquid solution or the concentration of the gases in the same liquid phase at equilibrium with the input gas stream Higher concentration of one or more dissolved gases relative to one or more other dissolved gases in a thermally switched liquid phase relative to the original combined single-phase liquid solution Mutual absorption of gases in a common solution, selective desorption in separate liquid phases.

Higher solubility of one or more gases in the combined, single phase liquid solution than in one or more of the liquid phases forming from liquid phase change into two or more liquid phases

FIG. 9 (A, B, C)

Summary (FIG. 9A)

The present embodiment may pertain to a technology for separating gases.

The present embodiment may absorb one or more gases in a physical solvent exhibiting relatively greater solubility of one or more gases, which may result in a dissolved gas rich physical solvent and a gas stream lean in one or more gases. Said dissolved gas rich physical solvent may be mixed with an antisolvent, which may exhibit relatively low acid gas solubility or have another form of gas solubility changing interaction with said physical solvent. Said mixing may result in the formation of a combined solution. Said combined solution may possess a reduced solubility of one or more gases relative to, for example, said physical solvent, or may exhibit other favorable properties for the desorption of one or more gases. One or more dissolved gases may be desorbed using, for example, including, but not limited to, stripping, air stripping, desorption, depressurization, or a combination thereof, which may result in the formation of a dissolved gas lean combined solution. Said resulting dissolved gas lean combined solution may be regenerated into separated dissolved gas lean physical solvent and antisolvent, using, for example, one or more membrane-based processes. Said dissolved gas lean physical solvent may be, for example, the permeate or concentrate and said antisolvent may be, for example, the permeate or concentrate. For example, said physical solvent may comprise a solution possessing relatively high solubility of one or more gases and/or may comprise one or more reagents with a molecular weight or hydration radius less than the molecular weight cutoff of one or more semi-permeable membranes. For example, said antisolvent may comprise a solution possessing relatively low solubility of one or more gases and/or may comprise one or more reagents with a molecular weight or hydration radius greater than the molecular weight cutoff of one or more semi-permeable membranes. For example, said physical solvent may comprise, including, but not limited to, water or water-organic solvent solution, and said antisolvent, may comprise, including, but not limited to, an aqueous salt, acidic, basic, or combination thereof solution. Alternatively, for example, said physical solvent may comprise a solution possessing relatively high solubility of one or more gases and/or may comprise one or more reagents with a molecular weight or hydration radius greater than the molecular weight cutoff of one or more semi-permeable membranes. Alternatively, for example, the antisolvent may comprise a solution possessing relatively low solubility of one or more gases and/or may comprise one or more reagents with a molecular weight or hydration radius less than the molecular weight cutoff of one or more semi-permeable membranes.

Summary (FIG. 9B)

The present embodiment may pertain to a technology for separating gases.

The present embodiment may absorb one or more gases in a physical solvent exhibiting relatively high solubility for said one or more gases and a separate antisolvent exhibiting relatively low solubility of one or more gases, which may result in a physical solvent rich in one or more dissolved gases, an antisolvent rich in one or more gases, and/or an exiting gas stream lean in one or more gases. Said resulting physical solvent rich in one or more dissolved gases may be mixed with said antisolvent rich in one or more gases (said antisolvent may exhibit relatively low acid gas solubility or have another form of gas solubility changing interaction with said physical solvent), which may result in the formation of a combined solution. Said combined solution may possess a lower solubility of one or more gases relative to, for example, said physical solvent, and/or may exhibit other favorable properties for desorbing one or more gases and/or may be stripped of a portion of one or more gases using, for example, air stripping. Said resulting dissolved gas lean combined solution may be regenerated into separated physical solvent lean in one or more dissolved gases and antisolvent using, for example, one or more membrane-based processes, which may include, but is not limited to, reverse osmosis or nanofiltration. Said acid gas lean physical solvent may comprise a permeate or concentrate and said antisolvent may comprise a permeate or concentrate.

Summary (FIG. 9C)

The present embodiment may pertain to a technology for separating gases.

The present embodiment may absorb one or more gases in a physical solvent exhibiting relatively high solubility for said one or more gases and a separate antisolvent exhibiting relatively low solubility of one or more gases, which may result in a physical solvent rich in one or more dissolved gases, an antisolvent rich in one or more gases, and/or an exiting gas stream lean in one or more gases. Said resulting physical solvent rich in one or more dissolved gases may be mixed with said antisolvent rich in one or more gases (said antisolvent may exhibit relatively low acid gas solubility or have another form of gas solubility changing interaction with said physical solvent), which may result in the formation of a combined solution. Said combined solution may possess a lower solubility of one or more gases relative to, for example, said physical solvent, and/or may exhibit other favorable properties for desorbing one or more gases. One or more gases may be desorbed form the combined solution as captured or separated gas using one or more or a combination of gas desorption methods described herein. Said desorption may result in a combined solution lean in one or more dissolved gases, which may be regenerated into the physical solvent lean in one or more gases and antisolvent lean in one or more gases, using, for example, reverse osmosis, where one or more physical solvents lean in one or more dissolved gases may comprise a permeate or concentrate and one or more antisolvents may comprise a permeate or concentrate.

Example Inputs and Outputs FIG. 9A and 9B

| Example INPUTS | Example OUTPUTS |
|---|---|
| Acid Gas Rich Gas (G-1)<br>Acid Gas Lean Air IN<br>Electricity (Gas Compressor, Liquid Pumps, Pretreatment Equipment)<br>Heating<br>Cooling | Acid Gas Lean Gas<br>Acid Gas Rich Air |

Example Inputs and Outputs FIG. 9C

| Example INPUTS | Example OUTPUTS |
|---|---|
| Acid Gas Rich Gas (G-1)<br>Electricity (Gas Compressor, Liquid Pumps, Pretreatment Equipment)<br>Heating<br>Cooling | Captured Acid Gas (G-5)<br>Acid Gas Lean Gas (G-4) |

Example Step by Step Description

1. Gas Absorption:
   - FIG. 9A: One or more or a combination of gas streams rich in one or more gases (G-1) may be pressurized (Gas Compressor, G-2) and contacted with one or more physical solvents lean in one or more dissolved gases (L-1), which may result in a gas stream relatively lean in one or more gases (G-3) and one or more physical solvents rich in one or more gases (L-2).
   - FIGS. 9B and 9C: One or more or a combination of gas streams rich in one or more gases (G-1) may be pressurized (Gas Compressor, G-2) and contacted with one or more physical solvents lean in one or more gases (L-1, G-3, Abs #2) and/or one or more antisolvents lean in one or more gases (L-2, Abs #1), which may result in a gas stream relatively lean in one or more gases (G-4), one or more physical solvents relatively rich in one or more dissolved gases (L-3), or one or more antisolvents relatively rich in one or more gases (L-4), or a combination thereof.
2. Combining Solutions:
   - FIG. 9A: Physical solvent rich in one or more dissolved gases (L-2) and antisolvent rich in one or more dissolved gases (L-6) may be combined, which may result in a combined solution (L-3). Said solvents and/or combined solution may be mixed or heated or a combination thereof if desired.
   - FIGS. 9B and 9C: Physical solvent rich in one or more dissolved gases (L-3) and antisolvent rich in one or more dissolved gases (L-4) may be combined, which may result in a combined solution (L-5). Said solvents and/or combined solution may be mixed or heated or a combination thereof if desired.
3. Gas Desorption:
   - FIG. 9A: Said combined solution rich in one or more dissolved gases (L-3) may be, for example, stripped, using, for example, a stripping gas such as air, in one or more desorption units. In said one or more desorption units, at least a portion of said one or more dissolved gases may desorb or may desorb into said stripping gas (G-4). If one or more stripping gases are employed, said desorbing may result in one or more gas streams (such as air) rich in one or more desorbed gases (G-5) and one or more combined solutions lean in one or more dissolved gases (L-4). Said solution may be depressurized or heated before, during or after desorption.

FIG. 9B: Said combined solution rich in one or more dissolved gases (L-5) may be, for example, stripped, using, for example, a stripping gas such as air, in, for example, one or more desorption units. In said one or more desorption units, at least a portion of said one or more dissolved gases may desorb or may desorb into said stripping gas (G-5). Said desorbing may result in one or more gas streams (such as air) rich in one or more desorbed gases (G-6) and one or more combined solutions lean in one or more dissolved gases (L-6). Said solution may be depressurized or heated before, during or after desorption.

FIG. 9C: Said combined solution rich in one or more dissolved gases (L-5) may enter one or more desorption units. In said one or more desorption units, at least a portion of one or more dissolved gases (G-5) may desorb, as, for example, one or more captured gases, and may result in the formation of a combined solution lean in one or more dissolved gases (L-6). Before or during desorption, said one or more combined solutions (L-5) may be depressurized or heated or a combination thereof. Said one or more solvents or solutions may be, including, but not limited to, mixed, depressurized or heated, before, during or after desorption. To, for example, facilitate desorption, one or more desorbed gases may be recirculated as, for example, a form of stripping gas, which may be partially released using, for example, including, but not limited to a pressure release valve. Alternatively, or additionally, one or more easily separable stripping gases, which may be separable using, including, but not limited to, condensation or gas membrane or combination thereof, may be employed.

4. Membrane Based Process or Processes for Regeneration of One or More Physical Solvents and/or One or More Antisolvents:

FIG. 9A: Said combined solution lean in one or more dissolved gases (L-4) may be pressurized (P-1, L-5) and fed into one or more membrane-based process units, including, but not limited to, Reverse Osmosis units. Said membrane-based process units may form one or more concentrate solutions (which may, for example, comprise one or more antisolvents or physical solvents) and one or more permeate solutions (which may, for example, comprise one or more antisolvents or physical solvents). In FIG. 9A, said permeate may be shown as a regenerated physical solvent lean in one or more dissolved gases (L-1) and said concentrate may be shown as a regenerated antisolvent lean in one or more dissolved gases (L-6) (for example: the concentrate solution).

FIGS. 9B and 9C: Said combined solution lean in one or more dissolved gases (L-6) may be pressurized (P-1, L-7) and fed into one or more membrane-based process units, including, but not limited to, Reverse Osmosis units. Said membrane-based process units may form one or more concentrate solutions (which may, for example, comprise one or more antisolvents or physical solvents) and one or more permeate solutions (which may, for example, comprise one or more antisolvents or physical solvents). In FIGS. 9B and 9C, said permeate may be shown as a regenerated physical solvent lean in one or more dissolved gases (L-1) and said concentrate may be shown as a regenerated antisolvent lean in one or more dissolved gases (L-2) (for example: the concentrate solution).

Example Performance Driving Forces

Minimal or practically no antisolvent reagents in the physical solvent. Reverse osmosis or other membrane-based processes may exhibit significant selectivity, which may enable a physical solvent largely without the solubility reducing effects of one or more antisolvent reagents during, for example, the absorption of one or more gases.

Antisolvent may be mixed with the physical solvent during desorption gas or acid gas or basic gas solubility swing. The solubility of one or more dissolved gases may be reduced compared to, for example, the solubility of one or more gases in said physical solvent. This, among other benefits, may enable one or more swings in the equilibrium solubility or partial pressure or desorption kinetics or combination thereof of one or more dissolved gases, which may facilitate desorption of one or more gases or the salting-out of one or more liquids or solids.

Relatively low energy consumption of reverse osmosis or Nano-filtration: Reverse osmosis or nanofiltration membrane-based processes may generally consume energy at relatively close to the thermodynamic limits of energy consumption for aqueous or liquid based separations.

High Solubility of one or more dissolved gases in physical solvent relative to antisolvent Physical solvents may be low cost reagents: Said physical solvent may comprise, including, but not limited to, water or other liquids or reagents with hydration radii less than the molecular weight rejection point or cutoff of one or more membranes employed in the process or a combination thereof. Alternatively, said physical solvents may comprise a solution with one or more reagents greater than the molecular weight cutoff of one or more membranes.

Antisolvents may be low cost reagents: The antisolvents may comprise, for example, the same solvent as employed in physical solvents, except with the solubility of one or more gases lower relative to said antisolvent reagents, including, but not limited to, acids, acidic salts, bases, basic salts, neutral salts, one or more reagents with a molecular weight or hydration radius above the molecular weight rejection point or molecular weight cutoff of one or more membranes, or a combination thereof.

If desired, selectivity for acid gases or basic gases or one or more other gases The ability to employ acidic or strongly acidic reagents or basic or strongly basic reagents in, for example, an antisolvent: In one or more embodiments, the one or more solutions may lack basic reagents that may react with acids or acidic reagents that may react with bases. As a result, the antisolvent may possess acidity or basicity, if, for example, said reagents are compatible with one or more membranes or other process equipment in said one or more embodiments. Higher acidity reagents may include, but are not limited to, one or more or a combination of the following: sodium bisulfate, relatively weak base—relatively strong acid salts, weak acids, strong acids, organic acids, combinations thereof, or other reagents described herein. Higher basicity reagents may include, but are not limited to, one or more or a combination of the following: potassium carbonate, sodium carbonate, sodium hydroxide, ammonia, amine, ammonium carbonate, strong base-weak acid, strong base, weak base, or organic bases.

Two or more different absorbers or absorption units for absorbing one or more gases in physical solvent and/or antisolvent: May enable physical solvent and/or antisolvent to be rich in in one or more dissolved gases before mixing, potentially maximizing acid gas desorption and partial pressure swing.

Resistance to degradation

Compatibility with potential gas impurities

Note: In an alternative version of the present embodiment, one or more gases may be dissolved in a combined single liquid phase solution, which may form a combined single liquid phase solution rich in one or more dissolved gases. Said combined solution may be separated into two or more liquid solutions using one or more membrane-based processes. One or more of said two or more liquid solutions may be rich in or selective for one or more gases. Alternatively, or also, said two or more liquid solutions may be rich in or selective for one or more different gases. In the present embodiment, one or more of said liquid phases may comprise one or more reagents with a molecular weight cutoff or hydration radius greater than the molecular weight cutoff of one or more membranes or sufficiently large to be at least partially rejected by said one or more membranes. Said one or more reagents may increase or decrease the solubility of one or more dissolved gases relative to, for example, one or more of the other liquid phases. The present embodiment may be similar to the example embodiments in FIG. 8, except may employ one or more membrane-based processes to form two or more liquid phases or separate liquid solutions from a single liquid phase solution, rather than, or in addition to, a liquid phase transition or UCST or LCST.

Summary Active Cloud Point Adjustment

Embodiments described herein may employ systems and methods for actively adjusting the cloud point or LCST or UCST or a combination thereof. Active cloud point adjustment may comprise changing the compositions of one or more or a combination of liquid phases to increase or decrease or maintain one or more LCSTs or UCSTs or combination thereof. Active cloud point adjustment may involve removing a portion of one or more liquid system reagents, or re-introducing additional one or more liquid system reagents, or adding one or more external reagents to a liquid system, or removing one or more external reagents from a liquid system. Active cloud point adjustment may involve changing one or more system conditions to adjust cloud point. Active adjustments of cloud point may be desirably reversible. Active cloud point adjustment may be in response to, for example, changes in one or more system conditions or compositions or economic factors. Said changes may include, but are not limited to, one or more or a combination of the following: changes in the temperature of one or more available heat sources, changes in the temperature of one or more available cooling sources, changes in outside temperature, changes in pressure, changes in composition of one or more input gas streams, the dissolved concentration of one or more gases affecting cloud point temperature, changes in the value of inputs or outputs, the presence or lack of presence of one or more reagents, degradation, impurities, or a combination thereof.

Example Embodiment for Active Cloud Point Adjustment in an LCST Liquid System An embodiment for active adjustment of cloud point may involve reversibly adjusting the concentration of one or more reagents which may have influence on the one or more LCSTs, UCSTs, phase transitions, the composition of or one or more liquid phases, the relative mass of one or more liquid phases, the relative volume of one or more liquid phases, or a combination thereof. For example, a LCST liquid system may comprise, including, but not limited to, one or more or a combination of the following: 1) one or more polymers, 2) water, 3) one or more reagents insoluble or exhibiting low solubility in said one or more polymers without the presence of water, or 4) one or more reagents soluble in said polymer and/or water. Said example LCST liquid system and/or other example liquid systems may employ one or more or a combination of the following example systems & methods for adjusting LCST.

The present embodiment may employ a membrane-based process and/or the addition of a 'permeate' liquid or 'permeate equivalent liquid' to adjust one or more or a combination cloud points.

Decreasing LCST:

The present example embodiment may involve first forming a multi-liquid phase solution, which may involve a phase transition before or during the present example embodiment. One or more of said liquid phases in said multi-liquid phase solution may comprise an aqueous solution lean in one or more polymers. The present embodiment may employ one or more multi-liquid phase liquid-liquid separation devices, which may separate said liquid phase aqueous solution lean in one or more polymers from one or more other liquid phases. Said separated liquid phase aqueous solution lean in one or more polymers may comprise, for example, water, one or more salts (or other reagents which facilitate reduction of LCST cloud point), and/or residuals of non-rich reagents (for example: polymer). Said solution may be concentrated using, for example, one or more membrane-based process, such as reverse osmosis and nanofiltration.

In one version of the present embodiment, the liquid phase aqueous solution lean in one or more polymers may comprise a feed solution to a reverse osmosis system, wherein said salt and residual polymer may be concentrated, forming, for example, a concentrate. A portion of water and other reagents not rejected or fully rejected by the one or more membranes may pass through said one or more membranes, forming, for example, a permeate liquid or permeate liquid mixture (liquid mixture may form, for example, if one more reagents are insoluble or exhibit limited solubility without or with less presence of one or more reagents rejected by said one or more membranes). A liquid system containing said concentrate solution may possess a lower LCST than the LCST of the liquid system before treatment with one or more membranes. Relatively higher concentration of, for example, salt, may decrease the LCST of liquid system. Said permeate, may, for example, be stored. Said permeate liquid may be later re-introduced into a liquid system. For example, said permeate liquid may be added to said liquid system to, for example, increase the one or more LCSTs.

In another version of the present embodiment said liquid phase aqueous solution lean in one or more polymers may first undergo separation of one or more residual polymers from a portion of the remaining solution. Said first separation may involve concentrating one or more of said residual polymers using one or more semi-permeable membranes. It may be desirable for said permeable membranes to reject one or more of said polymers, while, for example, allowing one or more other reagents to pass through the membrane. Said semi-permeable membranes may comprise, including, but not limited to, nanofiltration or ultrafiltration. Said concentrating may resulting in a polymer rich concentrate solution or mixture and a polymer-lean or polymer-free permeate. Said polymer concentrate may be re-introduced into the liquid system or stored for later use or re-introduction to the liquid system or combination thereof. Said polymer-lean or polymer-free permeate may comprise, including, but not limited to, one or more or a combination of the following: water, or salts, or other reagents which influence phase transition, or combination thereof. Said polymer-lean or polymer-free permeate may be concentrated in a second separation using one or more semi-permeable membranes, for example, reverse osmosis, which may be able to concentrate or reject one or more reagents unrejected or minimally rejected by said first separation. Said second separation may form a concentrate solution more concentrated in salts or other reagents which may influence phase transition or combination thereof and a permeate solution lean in said one or more reagents. Said concentrate may be re-introduced into the liquid system, which may decrease said liquid system's phase transition temperature (such as a LCST) or multi-liquid phase composition or multi-liquid phase distribution, other adjustments to said liquid systems cloud point or phase transition, or a combination thereof. Said permeate liquid may be later introduced into a liquid system. For example, said permeate liquid may be added or later added to said liquid system to, for example, increase the one or more LCSTs.

In another version of the present embodiment, a single liquid phase combined solution may be concentrated using one or more membranes.

A) For example, said single liquid phase may be first concentrated using one or more membrane which rejects one or more larger molecular weight reagents, such as residual polymers, while, for example, allowing smaller molecular weight reagents, such as salts or low molecular weight organics or water, to pass through said membranes. Examples of said membranes, may include, but are not limited to, nanofiltration or ultrafiltration membranes or other semi-permeable membrane systems & methods described in herein. Said concentrating may form a concentrate solution rich in said one or more larger molecular weight reagents, and a permeate stream lean or free of said larger molecular weight reagents. Said concentrate solution may be stored or introduced into the liquid system. Said permeate may be returned to the liquid system or may undergo one or more further steps, for example, step B).

B) Said permeate may be concentrated in a second concentrating step using one or more semi-permeable membranes, for example, reverse osmosis, which may be able to concentrate or reject one or more reagents unrejected or minimally rejected by said first concentrating step. Said second concentrating step may form a concentrate solution more concentrated in salts or other reagents which may influence phase transition or combination thereof and a permeate solution lean in said one or more reagents. Said concentrate may be re-introduced into the liquid system, which may decrease said liquid system's phase transition temperature (such as an LCST) or multi-liquid phase composition or multi-liquid phase distribution, other adjustments to said liquid system's cloud point or phase transition, or a combination thereof. Said permeate liquid may be later introduced into a liquid system. For example, said permeate liquid may be added or later added to said liquid system to, for example, increase the one or more LCSTs.

Alternatively, said single liquid phase combined solution may be first concentrated using reverse osmosis. Said concentrating may reject polymer or salts or one or more other reagents which may influence phase transition or a combination thereof. Said concentrating may result in concentrate solution or multi-liquid phase mixture more concentrated in polymer and salts or one or more other reagents and a permeate solution lean in one or more or nearly all or all said reagents. Said concentrate solution or multi-liquid phase mixture may exhibit a lower LCST relative to the input single liquid phase combined solution. Said concentrate solution may be introduced to the liquid system or may comprise a component of the liquid system. Said permeate liquid may be later introduced into a liquid system. For example, said permeate liquid may be added or later added to said liquid system to, for example, increase the one or more LCSTs.

Increasing LCST:

LCST of a liquid system may be increased, for example, by adding permeate liquid or permeate equivalent liquid to said liquid system. Said permeate liquid may desirably be lean or essentially free of salts or other reagents which may decrease LCST when in one or more liquid systems. Said addition of permeate liquid or permeate equivalent liquid may, for example, dilute or reduce the concentration of one or more salts or other reagents which may influence LCST, which may result in an increase in LCST temperature.

Example Embodiment for Active Cloud Point Adjustment in UCST System

An embodiment for active adjustment of cloud point may involve reversibly adjusting the concentration of one or more reagents which may have influence on the one or more LCSTs, UCSTs, phase transitions, the composition of or one or more liquid phases, the relative mass of one or more liquid phases, the relative volume of one or more liquid phases, or a combination thereof. For example, a UCST liquid system may comprise, including, but not limited to, one or more or a combination of the following: 1) one or more polymers, 2) water, 3) one or more reagents insoluble or exhibiting low solubility in said water without the presence of polymer and/or one or more other reagents, or 4) one or more reagents soluble in said polymer and/or water. Said example UCST liquid system and/or other example liquid systems may employ one or more or a combination of the following example systems & methods for adjusting UCST. The present embodiment may employ a membrane-based process and/or the addition of a 'permeate' liquid or 'permeate equivalent liquid' to adjust one or more or a combination cloud points.

Decreasing UCST: The present example embodiment may involve first forming a multi-liquid phase solution, which may involve a phase transition before or during the present example embodiment. One or more of said liquid phases in said multi-liquid phase solution may comprise a solution containing one or more polymers.

In some UCST liquid systems described herein, one or more polymers may function as a necessary reagent (for example: polypropylene glycols or polyethylene glycols) to ensure another one or more reagents (for example: propylene carbonate) are soluble in yet another reagent (for example: water) at or below one or more UCSTs. Furthermore, in one or more embodiments described herein, the concentration of said polymer relative to said one or more other reagents may influence the UCST of the liquid system. For example, in some liquid systems, an increase in concentration of, for example, PPG 425, relative to propylene carbonate and/or water, may decrease said UCST. One or more of said liquid phases comprising one or more polymers may be separated, in part or in whole, or may remain a multi-liquid phase mixture. Said one or more liquid phases comprising a solution containing one or more polymers may be concentrated using one or more semi-permeable membranes, for example, which may include, but are not limited to, reverse osmosis (RO), nanofiltration (NF), or ultrafiltration (UF). To decrease cloud point temperature, it may be desirable for said one or more semipermeable membranes to reject one or more polymers, while, for example, allowing other reagents to pass through said membrane. By concentrating one or more polymers, while allowing other reagents to pass through said semi-permeable membrane, salts and other reagents which may increase UCST, if any, may remain at similar or the same concentration in solution. Said concentrating may result in a concentrate solution, which may possess a greater concentration of one or more polymers, and/or a permeate solution, which may comprise a liquid or multi-liquid phase mixture lean or free of one or more polymers. Said concentrate may be re-introduced into the liquid system, which may decrease said liquid system's phase transition temperature (such as an UCST) or multi-liquid phase composition or multi-liquid phase distribution, other adjustments to said liquid system's cloud point or phase transition, or a combination thereof. Said permeate liquid may be later introduced into a liquid system. For example, said permeate liquid may be added or later added to said liquid system to, for example, increase the one or more UCSTs.

In another version of the present embodiment, a single liquid phase combined solution may be a feed solution concentrated using one or more semi-permeable membranes. For example, one or more polymers in said single liquid phase combined solution may be concentrated. Said concentrating may result in a concentrate solution with a greater concentration of one or more polymers relative to the said feed solution and a permeate solution lean or substantially free of said one or more polymers. In the substantial absence of one or more polymers, one or more of said reagents in said permeate may be mutually insoluble or exhibit limited solubility in each other, which may result in, for example, the resulting permeate comprising a multi-liquid phase mixture. Said concentrate solution may exhibit a lower UCST due to, for example, greater polymer concentration. Said permeate liquid may be later introduced into a liquid system. For example, said permeate liquid may be added or later added to said liquid system to, for example, increase the one or more UCSTs.

Increasing UCST:

The UCST of a liquid system may be increased, for example, by adding permeate liquid or permeate equivalent liquid to said liquid system. Said permeate liquid may dilute or reduce the concentration of one or more polymers, which may enable an increased UCST. Alternatively, or additionally, UCST may be increased using, for example, a membrane separation process. For example, if a UCST liquid system may contain salts or one or more other reagents which may increase UCST, one or more of said reagents may be concentrated. In one version of the present embodiment, said concentrating may occur in by concentrating a solution lean or free of one or more polymers (for example: the permeate from a polymer concentrating or separation step using, for example, nanofiltration or ultrafiltration). Said concentrating a solution lean or free of one or more polymers may be desirable as it may prevent the substantial simultaneous concentrating of one or more polymers.

Summary FIG. 10 (A-C)

FIG. 10A-C may show an example embodiment employing example systems and methods for active cloud point adjustment. The present embodiment may employ said active cloud point adjustment to, for example, actively adjust one or more UCSTs in the embodiment's liquid system.

The present embodiment for cloud point adjustment may actively adjust said solution's cloud point by, including, but not limited to, one or more or a combination of the following: changing UCST through one or more nanofiltration concentrating steps or changing UCST through the addition of permeate or permeate equivalent or changing UCST through one or more reverse osmosis concentrating steps or maintaining composition or cloud point by, for example, by-passing composition adjustment steps.

Step-by-Step Description

The present embodiment may start with, for example, a liquid in a liquid system with one or more cloud points. The liquid may have a UCST (or may have a LCST) and may comprise a single liquid phase combined solution or a multi-liquid phase mixture solution. FIG. 10A may show a single liquid phase combined solution (L-4) as an example. Said solution may be transferred to one of two or three pathways depending on, for example, if one or more cloud points of said solution or liquid system may need to be increased, decreased, or remained constant.

If, for example, one or more cloud points of said liquid system may need to be decreased, it may be desirable for one or more of the reagents which may decrease cloud point to be concentrated, using, for example, nanofiltration. Said concentrating with nanofiltration may involve pressurizing the solution (L-6) using one or more pumps (P-1), which may form a pressurized feed solution (L-8) to be concentrated in one or more nanofiltration units (NF). Said feed solution may be fed into one or more nanofiltration units, which may result in a concentrate stream (L-10) and a permeate stream (L-9). Said concentrate stream (L-10) may possess a greater concentration of, for example, one or more reagents which decrease cloud point, which may include, but are not limited to, one or more reagents which may be rejected by said one or more nanofiltration units. Said concentrate stream may be returned to said liquid system or comprise the liquid system or, in other words, may be returned to, for example, the gas separation process. Said concentrate stream may possess a lower UCST than said feed solution. Said permeate solution may be transferred to one or more liquid storage vessels ('Permeate Storage').

Said permeate may be re-introduced into the liquid system, for example, upon the need for active increase in UCST.

If, for example, one or more cloud points of said liquid system may need to be increased, it may be desirable for said solution to be mixed with permeate or permeate equivalent liquid (L-11,'Merge #1). Said mixing with permeate or permeate equivalent may dilute or reduced the concentration of one or more reagents which may decrease UCST, which may result in an increase in one or more UCSTs. Said solution mixed with permeate may be returned to said liquid system or comprise the liquid system or, in other words, may be returned to, for example, the gas separation process.

If, for example, one or more cloud points of said liquid system may need to be unadjusted, said solution may be transferred to the next stage of the gas separation process without, for example, adjusting its composition.

Alternatively, or additionally, one or more UCSTs may be adjusted by one or more membranes-based processes (for example: reverse osmosis), which may be conducted by concentrating one or more reagents which may increase cloud point temperature with increased concentration in the liquid system. For example, the present embodiment may involve first forming a multi-liquid phase mixture by, for example, cooling a liquid system to at or below one or more UCSTs. Then, the present embodiment may involve at least partially separating said multi-liquid phase mixture into two or more of its constituent liquid phases. One or more of said constituent liquid phases may be lean in one or more reagents which decrease UCST at greater concentrations and may possess sufficiently large molecular weight or hydration radius to be at least partially rejected by a reverse osmosis membrane. Said one or more 'lean' liquid phases may contain one or more reagents which increase UCST with increased concentration and may possess sufficiently large molecular weight or hydration radius to be at least partially rejected by a reverse osmosis membrane. Said one or more 'lean' liquid phases may be a feed solution in one or more membrane based concentrating steps. Said one or more membrane based concentrating steps may include one or more concentrating steps to increase the concentration of one or more reagents which increase UCST with increased concentration. Said one or more membrane based concentrating steps may result in the formation of a concentrate solution and a permeate solution. Said concentrate solution may possess a greater concentration of one or more reagents which increase UCST with increased or greater concentration of said one or more reagents reagent. Said concentrate solution may be introduced into the liquid system, which may involve mixing one or more liquid phases in the liquid system or re-formation of a UCST liquid system. Said concentrate may increase one or more of the UCSTs of the liquid system relative to the liquid system before said concentrating. Said permeate solution may comprise a solution lean or free of one or more reagents which appreciably influence the UCST of the liquid system. Said permeate solution may be stored. Said permeate solution may be later introduced or added to the liquid system to, for example, decrease one or more UCSTs.

FIG. 10A Cloud Point Adjustment Description: The present embodiment may comprise systems and methods for gas separation. The present embodiment may employ one or more UCST phase transitions. FIG. 10A may show the present embodiment undergoing active liquid system cloud point adjustment to, for example, decrease one or more UCSTs.

FIG. 10B Cloud Point Adjustment Description: The present embodiment may comprise systems and methods for gas separation. The present embodiment may employ one or more UCST phase transitions. FIG. 10B may show the present embodiment undergoing active liquid system cloud point adjustment to, for example, increase one or more UCSTs.

FIG. 10C Description: The present embodiment may comprise systems and methods for gas separation. The present embodiment may employ one or more UCST phase transitions. FIG. 10C may show the present embodiment maintain one or more UCSTs, or composition of liquid phases, or bypassing of permeate addition or membrane-based concentrating, or combination thereof.

Summary FIG. 11

FIG. 11A-C may show an example embodiment employing example systems and methods for active cloud point adjustment. The present embodiment may employ said active cloud point adjustment to, for example, actively adjust one or more LCSTs in the embodiment's liquid system.

The present embodiment for cloud point adjustment may actively adjust said solution's cloud point by, including, but not limited to, one or more or a combination of the following: changing LCST through one or more reverse osmosis concentrating steps or changing LCST through the addition of permeate or permeate equivalent or changing LCST through one or more nanofiltration concentrating steps or maintaining composition or cloud point by, for example, by-passing composition adjustment steps.

Step-by-Step Description

The present embodiment may start with, for example, a liquid in a liquid system with one or more cloud points. The liquid may have a LCST (or may have a UCST) and may comprise a single liquid phase combined solution or a multi-liquid phase mixture solution. Said solution may be transferred to one of two or three pathways depending on, for example, if one or more cloud points of said solution or liquid system may need to be increased, decreased, or remained constant.

If, for example, a liquid system requires a decrease in one or more LCSTs, one or more LCSTs may be adjusted by membrane-based concentrating (for example: Reverse Osmosis) of one or more reagents which may decrease cloud point temperature with increased concentration in the liquid system. For example, the present embodiment may involve first forming a multi-liquid phase mixture by, for example, heating a liquid system to at or above one or more LCSTs. Then, the present embodiment may involve at least partially separating said multi-liquid phase mixture into two or more of its constituent liquid phases. One or more of said constituent liquid phases may contain a relatively greater concentration of one or more reagents which decrease LCST with increased concentration, one or more of said reagents which may possess sufficiently large molecular weight or hydration radius to be at least partially rejected by a reverse osmosis membrane. Said one or more liquid phases rich in one or more reagents which decrease LCST with increased concentrations may be one or more feed solutions in one or more membrane based concentrating steps. Said one or more membrane based concentrating steps may include one or more concentrating steps to increase the concentration of one or more reagents which decrease LCST with increased concentration. Said one or more membrane based concentrating steps may result in the formation of a concentrate solution and a permeate solution. Said concentrate solution may possess a greater concentration of one or more reagents which decrease LCST with increased or greater concentration in an example liquid system. Said concentrate solution may be introduced into one or more liquid systems, which may involve mixing one or more liquid phases in a liquid system or re-formation of a LCST liquid system. Said concentrate may increase one or more of the LCSTs of the liquid system relative to the liquid system before said concentrating. Said permeate solution may comprise a solution lean or free of one or more reagents which appreciably influence the LCST of a liquid system. Said permeate solution may be stored. Said permeate solution may be later introduced or added to a liquid system to, for example, increase one or more LCSTs.

If, for example, a liquid system requires an increase in one or more LCSTs, one or more LCSTs may be adjusted by, for example, adding permeate or permeate equivalent solution to said liquid system. The reduced concentration of one or more reagents which decrease LCST with increasing concentration may result in an increase in the one or more LCSTs of said liquid system.

If, for example, one or more cloud points of said liquid system may need to be unadjusted, said solution may be transferred to the next stage of the gas separation process without, for example, adjusting its composition.

FIG. 11A Cloud Point Adjustment Description: The present embodiment may comprise systems and methods for gas separation. The present embodiment may employ one or more LCST phase transitions. FIG. 11A may show the present embodiment undergoing active liquid system cloud point adjustment to, for example, decrease one or more LCSTs.

FIG. 11B Cloud Point Adjustment Description: The present embodiment may comprise systems and methods for gas separation. The present embodiment may employ one or more LCST phase transitions. FIG. 11B may show the present embodiment undergoing active liquid system cloud point adjustment to, for example, increase one or more LCSTs.

FIG. 11C Description: The present embodiment may comprise systems and methods for gas separation. The present embodiment may employ one or more LCST phase transitions. FIG. 11C may show the present embodiment maintain one or more LCSTs, or composition of liquid phases, or bypassing of permeate addition or membrane-based concentrating, or combination thereof.

Exemplary Embodiments

For Example: Gas Separation—Cloud Point without Liquid-Liquid Separation

- Process for separating gases comprising: [Physical absorption gas separation with antisolvent to facilitate gas desorption]
- Process for separating acid gases comprising: [Water or an aqueous solution rich phase exhibits lower acid gas solubility and organic-rich phase exhibits greater acid gas solubility]
- Process for separating gases comprising: [Water or an aqueous solution rich phase exhibits lower acid gas solubility and organic-rich phase exhibits greater acid gas solubility]
- Process for separating acid gases comprising: [Water or an aqueous solution functions as an antisolvent to facilitate acid gas desorption while organic-rich thermally reversible phase functions as the physical absorbent]
- Process for separating acid gases comprising: [recovery of the enthalpy of absorption during absorption in physical absorbent through an endothermic phase change]
- Process for separating acid gases comprising: [Absorbing in a medium with more liquid phases than the medium for desorption]
- Process for separating acid gases comprising: [Absorbing in a two or more-phase liquid, desorbing in a single-phase liquid]
- Process for separating acid gases comprising: [Absorbing in a single-phase liquid, desorbing in a two-phase liquid]
- Process for separating acid gases comprising: [acid gases are more soluble in two phases solutions than one phase solution]
- Absorbing acid gases in a
- Process for separating gases comprising: [Absorbing in X liquid phases, desorbing with X+n liquid phases]
- Process for separating gases comprising: [Absorbing in X+n liquid phases, desorbing with X liquid phases]

Exemplary Sub-Embodiments (Cloud Point with Liquid-Liquid Separation)

- Wherein one liquid phase is selective for one or more gases and the other liquid phase is selective for one or more gases
- Wherein one liquid phase is selective for one or more gases and the other liquid phase is selective for one or more different gases
- Wherein the antisolvent reduces acid gas solubility by one or more or a combination of the following: forming a combined solution with a lower acid gas solubility than the two or more separate phases, providing heat before or during desorption due to the enthalpy of dissolution, providing entropy before or during desorption due to the entropy of dissolution
- Wherein the antisolvent and physical solvent phases are regenerable using thermally switchable solubility
- Wherein the organic rich phase is rich in organic solvent, organic polymer, or a combination thereof
- Wherein the organic rich phase is non-volatile
- Wherein the ‘high acid gas solubility phase’ is non-volatile
- Wherein the ‘high acid gas solubility phase’ is rich in organic solvent, organic polymer, or a combination thereof
- Wherein the ‘low acid gas solubility phase’ is rich in water, one or more ionic compounds, one or more relatively lower acid gas solubility reagents, or a combination thereof
- Wherein the two or more liquid phases are reversibly regenerated from a solution or mixture with less phases
- Wherein the two or more liquid phases are reversibly regenerated from a single liquid phase solution
- Wherein the two or more liquid phases are regenerated using one or more or a combination of the following: thermally switchable solubility, cloud point, membrane, changes in pressure, changes in solubility, changes in system conditions, reversible changes in system conditions Organic reagent compositions Wherein said phase change comprises forming a two or more-phase liquid solution from a single-phase liquid solution Wherein said phase change comprises forming a single-phase liquid solution from a two or more-phase liquid solution Wherein said phase change comprises forming a multi-phase liquid solution with more liquid phases than the input solution Wherein said phase change comprises forming a liquid solution with less liquid phases than the input multi-phase liquid solution Wherein the phases are separated using a liquid-liquid separation device Wherein the phases remain as a mixture throughout the integrated process Wherein the liquid-liquid cloud point occurs from heating above one or more cloud-point temperature ranges Wherein the liquid-liquid cloud point occurs from cooling below one or more cloud-point temperature ranges Water or an aqueous solution rich phase and organic-rich phase exhibit similar acid gas solubility Water or an aqueous solution rich phase and organic-rich phase exhibit different acid gas solubility Water or an aqueous solution rich phase and organic-rich phase undergo a positive entropy phase change and reversing said phase change constitutes and negative entropy phase change Acid gas separation Hydrocarbon separation For Example: Employing Membrane Concentrating, Acidic Reagent Solution, Salt Solution, Freshwater Absorption Solution, Physical Solvent Absorption Solution, Antisolvent Solution or Combination Thereof Exemplary Embodiments Process for separating gases comprising:
- An absorption solution comprising separated physical solvent
- Wherein gas rich physical solvent is mixed with an antisolvent solution
- Wherein gas is desorbed or stripped from said mixed solution Process for separating gases comprising:
- An absorption solution comprising separated physical solvent
- Wherein gas rich physical solvent is mixed with an antisolvent solution
- Wherein acid gas is desorbed or stripped from said mixed solution Exemplary Sub-Embodiments Wherein said mixed solution is regenerated into physical solvent and antisolvent using a membrane-based separation device Wherein the antisolvent is also enriched with acid gas Wherein the antisolvent is also enriched with acid gas during absorption Wherein the antisolvent is also enriched with acid gas in a separate absorption unit Wherein said antisolvent facilitates the desorption of said gases from solution Wherein said mixed solution is regenerated into physical solvent and antisolvent using reverse osmosis, forward osmosis, membrane distillation, or a combination thereof Wherein the antisolvent contains one or more reagents with a molecular weight greater than the molecular weight cutoff of the membrane or membranes employed to separate the antisolvent reagents from the physical solvent Wherein the antisolvent contains one or more reagents capable of being rejected by a membrane or membranes employed to separate the antisolvent reagents from the physical solvent Wherein the antisolvent comprises one or more or a combination of the following: acid, organic acid, inorganic acid, acid with a hydration radius greater than 80 da, organic acid with a hydration radius greater than 80 da, ionic compound, acidic ionic compound, weak base—strong acid, cation-hydrogen or dihydrogen-anion salt, alkali hydrogen sulfate salt, ammonium—strong acid salt, citric acid, water, organic solvent Wherein the antisolvent comprises an acid, an acidic salt, acidic polymer, or a salt or a combination thereof in addition to the same liquid components as the physical solvent Wherein the solubility of one or more gases in the combined solution is less than the solubility of one or more gases in the individual liquid phases Wherein the solubility of one or more gases in the physical solvent is greater than the solubility of one or more gases in the antisolvent Wherein said physical solvent comprises a liquid with a molar mass below the molecular weight cutoff of the membrane or membranes employed to separate the antisolvent reagents from the physical solvent Wherein said physical solvent comprises one or more or a combination of the following: liquid with a molecular weight below the molecular weight cutoff of one or more membranes employed herein, water, organic solvent, non-volatile organic solvent, propylene glycol, ethylene glycol, propylene carbonate, glycerol, urea Wherein said physical solvent may contain antisolvent, including, but not limited to, as an impurity Wherein said gases comprise one or more or a combination of the following: acid gases, basic gases, hydrocarbons, inert gases, air Wherein said antisolvent functions to facilitate gas desorption In the absence of the formation of a solid precipitate In the absence of the formation and removal of a solid precipitate For Example: Selective Gas Separation Using Thermally Switching Phase Change with Liquid-Liquid Separation Exemplary Embodiments Process for separating gases comprising:
- Absorption of two or more gases in a single liquid phase to form gas-rich liquid phase
- Heating or cooling said gas-rich liquid phase to form two or more liquid phases Wherein at least one of said two or more liquid phases comprises one or more or a combination of the following:

a) higher concentration of one or more gases relative to one or more gases compared to the original single liquid phase solution b) superior properties for desorption of one or more gases compared to said single liquid phase solution Process for separating gases comprising[absorption of one or more gases in a single physical solvent liquid phase to form gas-rich liquid phase, heat or cooling said gas enriched liquid phase to form two or more liquid phases, desorbing said gases from at least one of said two or more liquid phases]:

Process for separating gases comprising: [Absorbing in X liquid phases, desorbing with X+n liquid phases]

Process for separating gases comprising: [Absorbing in X+n liquid phases, desorbing with X liquid phases]

Exemplary Sub-Embodiments

Wherein said superior properties for desorption include one or more or a combination of the following: higher gas equilibrium partial pressure, faster desorption kinetics, greater desorption of a desired gas relative to a less desired gas, low viscosity, low volatility of other solvent constituents, low relative volatility of other solvent constituents, no degradation, no corrosion, minimal degradation, minimal corrosion, compatibility with gas impurities, minimal impurities in desorbed gases Cooling Cloud Point Reagents Exemplary Embodiments A method for creating reagents blends with upper critical solution temperatures with reagents which may, independently not have upper critical solution temperatures.

A method for creating a reagent mixture that has a cooling solubility swing or upper critical solution temperature or cooling 'thermally switchable solubility' or cooling cloud point while maintaining other desirable properties:

A reagent mixture which forms X+n number of liquid phases upon cooling below one or more cloud point temperatures comprising one or more or a combination of the following:

Reagent 1: One or more reagents with relatively low solubility in Reagent 2 and temperature dependent relatively higher or miscible solubility in Reagent 3.

Reagent 2: One or more reagents with relatively low solubility in Reagent 1 and relatively higher or miscible solubility in Reagent 3.

Reagent 3 one or more reagents comprising one or more or combination of the following properties:

A reagent with high solubility in both Reagent 1 and Reagent 2 under certain conditions, which may be the same conditions.

A reagent with higher solubility or higher affinity or more attraction for Reagent 1 than Reagent 2 at relatively elevated temperatures or above certain relatively elevated temperatures (if cooling cloud point is desired).

A reagent with higher solubility or higher affinity or more attraction for Reagent 2 than Reagent 1 at relatively cooler temperatures or below certain relatively cooler temperatures (if cooling cloud point is desired).

Exemplary Sub-Embodiments

Wherein Reagent 1 comprises one or more or a combination of the following: water, ethylene glycol, propylene glycol, glycerol, organic reagents, inorganic reagents, ammonia Wherein Reagent 2 comprises one or more or a combination of the following: diethyl ether, dimethyl ether, propylene carbonate, ethers, glycols, polyethylene glycol dimethyl ether, ethylene carbonate, organic reagents, inorganic reagents, ammonia Wherein Reagent 3 comprises one or more or a combination of the following: polypropylene glycol, polypropylene glycol with one or more molecular weights ranging from 400 g/mole-10,000 g/mole, polyethylene glycol, polyethylene glycol with one or more molecular weights ranging from 200 g/mole-100,000 g/mole, organic reagents, inorganic reagents, ammonia Wherein the reagent combination further comprises reagent 4, a reagent which is soluble in Reagent 1 alone, and exhibits limited solubility, in Reagent 2, Reagent 3, or both.

Wherein the reagent combination further comprises one or more salts

Wherein the biphasic solution comprises one phase composed primarily of propylene carbonate and another phase composed primarily of water and polypropylene glycol Wherein the cloud point temperature of the reagent combination is adjusted by changing the relative concentration of one or more or a combination of reagents Wherein the cloud point temperature of the reagent combination is adjusted by changing the relative concentration of one or more salts in the solution Wherein the cloud point temperature of the reagent combination is adjusted by changing the composition of the constituent reagents Wherein the solution comprises a single liquid phases above the one or more cloud point temperatures and a multiphase solution below the one or more cloud point temperatures Wherein the solution comprises two liquid phases above the one or more cloud point temperatures and a three or more-liquid phase solution below the one or more cloud point temperatures Wherein the solution comprises a X number of liquid phases above the one or more cloud point temperatures and a X number of liquid phases below the one or more cloud point temperatures Wherein the composition of one or more of the X number of liquid phases is different above or below said cloud point temperature Wherein the solution is mixed to facilitate transitioning toward the equilibrium state 'Heating Cloud' Point Reagents with, for example, Low Viscosity or Cost or Combination Thereof Exemplary Embodiments A method for creating a reagent mixture that has a heating solubility swing or heating 'thermally switchable solubility' or heating cloud point while maintaining other desirable properties:

A reagent mixture which forms X+n number of liquid phases upon heating above one or more cloud point temperatures comprising one or more or a combination of the following:
- Reagent 1: One or more reagents with relatively miscible solubility in Reagent 2 and high or miscible solubility in Reagent 3 below a certain temperature range or ranges.
- Reagent 2: One or more reagents soluble in reagent 1 and 3.
- Reagent 3: one or more reagents comprising one or more or combination of the following properties:
  - A reagent with high solubility in both Reagent 1 and Reagent 2 under certain conditions, which may be the same conditions.
  - A reagent with higher solubility or higher affinity or more attraction for Reagent 1 than Reagent 2 at relatively elevated temperatures or above certain relatively elevated temperatures
  - A reagent with higher solubility or higher affinity or more attraction for Reagent 2 than Reagent 1 at relatively cooler temperatures or below certain relatively cooler temperatures Exemplary Sub-Embodiments Wherein Reagent 1 comprises one or more or a combination of the following: water, ethylene glycol, propylene glycol, glycerol, organic reagents, inorganic reagents Wherein Reagent 2 comprises one or more or a combination of the following: polyethylene glycol dimethyl ether, polyethylene glycol, polyethylene glycol with one or more molecular weights ranging from 200 g/mole-100,000 g/mole, glycerol, propylene glycol, propylene carbonate, ethers, glycols, ethylene carbonate, organic reagents, inorganic reagents Wherein Reagent 3 comprises one or more or a combination of the following: polypropylene glycol, polypropylene glycol with one or more molecular weights ranging from 400 g/mole-10,000 g/mole, polyethylene glycol, polyethylene glycol with one or more molecular weights ranging from 200 g/mole-100,000 g/mole, organic reagents, inorganic reagents Wherein the reagent combination further comprises reagent 4, a reagent which is soluble in Reagent 1, and exhibits limited solubility, in Reagent 2, Reagent 3, or both.

Wherein the reagent combination further comprises one or more salts

Wherein the cloud point temperature of the reagent combination is adjusted by changing the relative concentration of one or more or a combination of reagents Wherein the cloud point temperature of the reagent combination is adjusted by changing the relative concentration of one or more salts in the solution Wherein the cloud point temperature of the reagent combination is adjusted by changing the composition of the constituent reagents Wherein the solution comprises multiple liquid phases above the one or more cloud point temperatures and a single liquid phase below the one or more cloud point temperatures Wherein the solution comprises two liquid phases below one or more cloud point temperatures and three or more liquid phases above one or more cloud point temperatures Wherein the solution comprises a X number of liquid phases above the one or more cloud point temperatures and a X number of liquid phases below the one or more cloud point temperatures
- Wherein the composition of one or more of the X number of liquid phases is different above or below said cloud point temperature Wherein the solution is mixed to facilitate transitioning toward the equilibrium state Wherein Reagent 2 has a lower viscosity than Reagent 3.

For Example: Physical or Physio-Chemical Solvent

Exemplary Embodiments (a) A $CO_2$ physical absorbent comprising:
- Cation comprising ammonium, alkali, alkaline earth, transition metal, metal cation, or combination thereof
- Anion comprising dihydrogen phosphate, or monohydrogen phosphate, or combination thereof
- Water, or organic solvent, or combination thereof (b) An acid gas absorbent comprising:
- Aqueous ammonia or ammonium
- An 'Acidic' Ammonium salt
- Wherein the pH of the solution is equal to or below 8.8

Exemplary Sub-Embodiments (for Example: Separating Acid Gases)

(for example, embodiment above) Wherein the pH of the solution without acid gases is greater than 7

For Example: With Thermally Switchable Stripping Reagent

Exemplary Embodiments (for Example: Separating Acid Gases, with Thermally Switchable Stripping Reagent)

(a) A process for separating acid gases comprising:
- A physical solvent
- An acidic or ionic reagent
- Wherein the concentration of the acidic or ionic reagent is significantly greater in the desorption solution than the absorption solution (b) A process for separating acid gases comprising:
- A physical solvent
- A basic salt
- An acidic or ionic reagent Exemplary Sub-Embodiments (for Example: Separating Acid Gases with Thermally Switchable Stripping Reagent)

Wherein the basic salt solution with a pH of less than 8.8 in the absence of an acid gas Wherein the basic salt solution with a pH of less than 8.5 in the absence of an acid gas Wherein the acidic reagent does not undergo a metathesis or displacement or combination thereof reaction in the presence of the basic salt Wherein the concentration of the acidic reagent is adjusted using temperature driven solubility change Wherein the concentration of reagents is adjusted using temperature driven solubility change, precipitation, acid gas driven precipitation, membrane-based process, crystallization, or a combination thereof Wherein the acidic reagent maintains relatively the same concentration in the absorption solution as the desorption solution Wherein the basic reagent maintains relatively the same concentration in the absorption solution as the desorption solution Wherein the concentration of the acidic or ionic reagent is greater in the desorption solution than the absorption solution Wherein the concentration of the basic or ionic reagent is greater in the absorption solution than the desorption solution Wherein the acidic reagent comprises boric acid or one or more of its derivatives Wherein the basic salt comprises a salt with one or more anions with a competing reaction to the acid gas Wherein the basic salt comprises a salt with one or more anions with a competing reaction to the acid gas Wherein one or more anions have stronger affinity for the one or more cations than the acid gas Wherein the basic salt facilitates acid gas absorption due to the basicity of the solution Wherein the basic salt maintains its integrity in the presence of the acid gas Wherein the basic salt facilitates acid gas absorption due to the basicity of the solution Wherein the basic salt does not undergo a metathesis or displacement or carbonation or combination thereof reaction in the presence of the acid gas Wherein the concentration of basic salt may be adjusted using temperature driven solubility change Exemplary Embodiment (a) Systems & methods for separating gases comprising:

Absorbing one or more gases in one or more physical solvent liquid phases

Wherein said one or more solvent liquid phases is at least one of two or more liquid phases resulting from an Upper Critical Solution Temperature (UCST) or a Lower Critical Solution Temperature (LCST) phase change Exemplary Sub-Embodiments (b) Wherein the phase change occurs during the absorption of one or more gases (c) Wherein the phase change occurs during absorption Further comprising a LCST phase change which absorbs at least a portion of the heat of absorption (d) Wherein the phase change occurs during absorption Further comprising a LCST phase change which absorbs at least a portion of the heat of absorption Further comprising the dissolution of the two or more liquid phases during desorption, recovering at least a portion the heat of absorption through the endothermic phase change (e) Wherein the phase change occurs before absorption (f) Wherein the liquid phases are separated using a liquid-liquid separation device prior to absorption (g) Wherein the two or more liquid phases are separated using one or more liquid-liquid separation devices (h) Wherein the liquid phases are in single mixture of two or more liquid phases during gas absorption (i) Wherein the liquid phases are in two or more separate absorption columns with each absorption column specific to each liquid phase (j) Wherein the combined liquid solution absorbs gases under conditions to form two or more liquid phases and desorbs gases under conditions to form a combined liquid phase (k) Wherein the dissolved gas rich phase, liquid phase 1, absorbs gas in one or more gas-liquid contactors (1) Wherein another liquid phase, liquid phase 2, is mixed with dissolved gas rich liquid phase 1 to:

a) Reduce dissolved gas solubility b) Increase dissolved gas partial pressure c) Provide heat or entropy to facilitate the desorption of one or more dissolved gases d) Increase the solubility of one dissolved gas relative to another dissolved gas before desorption of said one dissolved gas e) Decrease the solubility of one dissolved gas relative to another dissolved gas before desorption of said another dissolved gas f) A combination thereof (m) Wherein one liquid phase functions as an 'antisolvent' while another liquid phase functions as the primary physical absorbent Wherein, upon dissolution of the antisolvent, the combined solution has a relatively lower solubility of one or more dissolved gases (n) Wherein one liquid phase is selective for one or more gases and another liquid phase is selective one or more gases (o) Wherein one liquid phase is selective for one or more gases and another liquid phase is selective one or more different gases (p) Wherein one liquid phase is selective for one or more gases and another liquid phase is selective one or more different gases Further comprising desorbing one or more gases from one or more liquid phases before combining the liquid phases (q) Wherein the liquid-liquid separation device comprises one or more or a combination of the following: decanter, cyclone, centrifuge, coalescer, filter (r) Wherein the dissolution of one or more liquid phases reduces the solubility of one or more gases one or more or a combination of the following: forming a combined solution with a lower acid gas solubility than the two or more separate phases, increasing pH, decreasing pH, providing heat before or during desorption due to the enthalpy of dissolution, providing entropy before or during desorption due to the entropy of dissolution (s) Wherein one or more of the liquid phases is a physical solvent, and said physical solvent phase is rich in organic, organic solvent, organic polymer, or combination thereof (t) Wherein one or more of the liquid phases functions as an 'antisolvent,' and said antisolvent phase is rich in water, one or more ionic compounds, one or more relatively lower acid gas solubility reagents, or a combination thereof (u) Wherein the liquid phases exhibit similar solubility of one or more gases (v) Where said two or more liquid phases exhibit different solubility of one or more gases Exemplary Embodiment (w) Absorbing two or more gases in a combined or single liquid phase Further comprising forming two or more liquid phases from the single liquid phase resulting from a UCST or LCST phase change Wherein at least one liquid phase possesses desirable properties for one or more dissolved gases Exemplary Sub-Embodiments (x) Wherein one or more other liquid phases possess desirable properties for one or more different dissolved gases than said dissolved gases for which liquid phase 1 possesses desirable properties (y) Wherein one or more of said liquid phases comprise physical solvents (z) Wherein said desirable properties include one or more or a combination of the following: selectivity for one more gases relative to one or more gases compared to the other liquid phase, higher concentration of one more gases relative to one or more gases compared to the other liquid phase, greater desorption kinetics for one or more gases compared to the other liquid phase, greater equilibrium partial pressure of one or more gases in one liquid phase compared to the other liquid phase, lower energy of regeneration of one or more gases compared to the other liquid phase, desirable properties for reacting one or more gases in one liquid phase relative to another liquid phase, desirable properties for liquifying one or more gases relative to another liquid phase, higher gas equilibrium partial pressure, faster desorption kinetics, greater desorption of a desired gas relative to a less desired gas, low viscosity, low volatility of other solvent constituents, low relative volatility of other solvent constituents, no degradation, no corrosion, minimal degradation, minimal corrosion, compatibility with gas impurities, minimal impurities in desorbed gases (aa) Wherein the one or more gases are desorbed from their specific liquid using means specific for the one or more gases targeted for desorption (bb) Wherein the solubility of one or more dissolved gases in the combined liquid phase is greater than the solubility of one or more of said dissolved gases in one or more of the separate liquid phases Exemplary Embodiment (cc) Absorbing one or more gases in a physical solvent, forming a dissolved gas rich physical solvent comprising one or more dissolved gases and physical solvent Combining said dissolved gas rich physical solvent with an antisolvent, forming a gas rich combined solution Desorbing said one or more dissolved gases from said gas rich combined solution, forming a dissolved gas lean combined solution Regenerating the antisolvent and physical solvent solutions from said gas lean combined solution using one or more or a combination of membrane-based processes Exemplary Sub-Embodiments (dd) Wherein said physical solvent comprises a liquid with a molar mass below the molecular weight cutoff of the membrane or membranes employed to separate the antisolvent reagents from the physical solvent (ee) Wherein said physical solvent comprises one or more or a combination of the following: liquid with a molecular weight below the molecular weight cutoff of one or more membranes employed herein, water, organic solvent, non-volatile organic solvent, propylene glycol, ethylene glycol, propylene carbonate, ethylene carbonate, glycerol, urea (ff) Wherein said antisolvent increases the pH to facilitate the desorption of one or more basic gases (gg) Wherein said antisolvent decreases the pH to facilitate the desorption of one or more acid gases (hh) Wherein interactions of said antisolvent with said dissolved gases are reversible using membrane separation (ii) Wherein said antisolvent reagent solvent comprises one or more reagents in the physical solvent (jj) Wherein said antisolvent further comprises one or more other reagents dissolved in said solvent (kk) Wherein said mixed solution is regenerated into physical solvent and antisolvent using reverse osmosis, nanofiltration, ultrafiltration, forward osmosis, membrane distillation, or a combination thereof (ll) Wherein said mixed solution is regenerated into physical solvent and antisolvent using reverse osmosis, nanofiltration, ultrafiltration, forward osmosis, membrane distillation, or a combination thereof (mm) Wherein said antisolvent comprises a ‘concentrate’ and said physical solvent comprises a ‘permeate’

(nn) Wherein said antisolvent reagent increases the solubility of one or more dissolved gases relative to one or more different dissolved gases (oo) Wherein said antisolvent reagent decreases the solubility of one or more dissolved gases relative to one or more different dissolved gases (pp) Wherein the antisolvent is enriched with one or more dissolved gases relative to the total solubility of said gases in said antisolvent (qq) Wherein the antisolvent contains one or more reagents with a molecular weight greater than the molecular weight cutoff of the membrane or membranes employed to separate the antisolvent reagents from the physical solvent (rr) Wherein the antisolvent contains one or more reagents capable of being rejected by a membrane or membranes employed to separate the antisolvent reagents from the physical solvent (ss) Wherein the antisolvent comprises one or more or a combination of the following: acid, organic acid, inorganic acid, acid with a hydration radius greater than 80 da, organic acid with a hydration radius greater than 80 da, polymer, acidic polymer, ionic compound, acidic ionic compound, weak base—strong acid, cation-hydrogen or dihydrogen-anion or trihydrogen-anion salt, alkali hydrogen sulfate salt, ammonium—strong acid salt, common-ion salt, citric acid, water, organic solvent (tt) Wherein the antisolvent comprises one or more or a combination of the following: base, amine, imine, azine, organic base, inorganic base, strong base, base with a hydration radius greater than 80 da, organic base with a hydration radius greater than 80 da, polymer, basic polymer, ionic compound, basic ionic compound, strong base—weak acid, common-ion salt water, organic solvent (uu) Wherein the solubility of one or more gases in the combined solution is less than the solubility of one or more gases in one or more of the individual liquid phases (vv) Wherein the solubility of one or more gases in the physical solvent is greater than the solubility of one or more gases in the antisolvent (ww) Wherein said physical solvent may contain antisolvent, including, but not limited to, as an impurity (xx) Wherein said gases comprise one or more or a combination of the following: acid gases, basic gases, hydrocarbons, inert gases, air Further Descriptions of Above Embodiments Note: The one or more temperatures of the cloud point or cooling cloud-point and the relative volumes or masses of the one or more cloud-point phases may be adjusted by changing the relative concentrations and types of one or more reagents.

Note: The one or more cloud-point temperatures of one or more liquid systems may be tuned to any temperature by, for example, including, but not limited to, one or more or a combination of the following: increasing or decreasing the concentration of one or more reagents, or additives that decrease cloud point temperature (for example: salts, certain organic reagents) or additives that increase cloud point temperature (for example: certain organic reagents) or combination thereof.

Mild temperatures required to reach one or more cloud point temperatures may be supplied from, including, but not limited to, one or more or a combination of the following: heat pump, waste heat source, condenser water, cooling water waste heat, cooling air waste heat, solar heat, or other heat source.

Note: One or more absorption solutions may be a multi-liquid phase mixture before absorption.

Note: Alternatively, if, for example, there may be no or minimal dissolved gas partial pressure swing, phase change solution may provide significant benefits which may include, but are not limited to, one or more or a combination of the following: cooling the absorber, providing a smaller temperature profile in the absorber, preventing the need for external cooling in the absorber or recovering the enthalpy of absorption, or providing entropy or heat release during desorption.

Note: One or more dissolved gases in a dissolved gas rich combined solution may possess different concentrations in one or more liquid phases, than, for example, one or more other liquid phases. Said liquid phases may be in said combined solution and/or may form from one or more phase transitions. For example, one gas may have a significantly higher concentration in one liquid phase than another liquid phase. For example, if two liquid phases may be liquid phase A and B, respectively, one gas may have a significantly higher concentration in liquid phase A than liquid phase B and another gas may have a significantly higher concentration in liquid phase B than liquid phase A. Alternatively, for example, one gas may have a significantly different concentration in liquid phase A relative to liquid phase B and another gas may have a similar concentration in both liquid phases. Alternatively, for example, liquid phase A may have more desirable properties for desorbing or recovering said one or more gases or liquids from solution than liquid phase B. Alternatively, for example, the one or more gases may have similar concentration in liquid phase A as liquid phase B, although liquid phase B may have superior or more desirable properties for desorbing or recovering said one or more gases or liquids from solution.

Note: In some embodiments, the physical solvent or adsorbent may be separated from the liquid using a solid-liquid separation device. This may be the case, for example, if a solid absorbent that is thermally switchable is employed. For example, diammonium phosphate, as a basic salt, may function as a solid adsorbent. Another example may be, for example, a solid polymer which may be water or liquid soluble under some conditions and water or liquid insoluble under other conditions (Note: Said water may alternatively constitute an organic solvent or non-aqueous phase or a combination thereof).

Note: Figures may show 'acid gases' as being separated. In said figures, Acid Gases may be provided as an example desired gas or dissolved gas or example gas to be separated or removed. Other gases, including, but not limited to, other gases described herein, may be separated in said Figures or embodiments.

Note: When physical solvent may be highly concentrated or water-lean or water-free, it may exhibit relatively high solubility of one or more gases (for example: >2 g $CO_2$ per liter of solvent at 20° C. and atmospheric pressure), which may be comparable to, for example, other physical solvents. When the physical solvent may be mixed with an antisolvent (such as an aqueous solution or aqueous salt water solution), the solubility of one or more gases may significantly decrease and the equilibrium partial pressure of said one or more gases may significantly increase. For example, the solubility of acid gas in the resulting aqueous solution may be greater than water. Lower solubility than in organic physical solvent alone or equal to or less than the solubility of acid gas in water at the same temperature. Said physical solvent, after acid gas desorption, may be regenerated through one or more methods described herein.

Note: The ratio of physical solvent to antisolvent may be determined based on the solubility of one or more desired gases in one or more physical solvent phase, the solubility of one or more gases in one or more antisolvent phases, and the solubility of one or more gases in solutions comprising a combination thereof. The amount of antisolvent may be sufficiently significant relative to physical solvent to decrease the solubility of one or more gases in the resulting solution, however not significant enough that it dilutes the concentration of one or more dissolved gases in the combined solution to the point where the net solubility of one or more dissolved gases may be, for example, equal to or less than the total solubility of gas in said physical solvent. It is important to note that said anti-solvent may or may not be saturated with one or more desired gases before being mixed with said physical solvent.

Note: One or more absorption units may operate at an equal or different pressure than one or more desorption units. For example, one or more absorption units may operate at a higher pressure to, for example, increase the solubility of one or more gases.

Note: The mere presence of an acidic reagent in solution may significantly reduce the solubility of an acid gas relative to a physical solvent without an acidic reagent. Similarly, the mere presence of a basic reagent in solution may significantly reduce the solubility of a basic gas relative to a physical solvent without a basic reagent.

Note: Reverse osmosis, nanofiltration, forward osmosis, and/or other membrane-based processes may enable the an absorption solution with minimal or practically no reagents which are meant to suppress the solubility of one or more desired gases and may enable the introduction of one or more reagents which are meant to suppress the solubility of one or more desired gases for desorption. Said membrane-based processes may exhibit high selectivity and/or relatively low energy consumption relative to some other liquid separation processes.

Note: For example, an easily separable stripping gas may be, for example, a gas that may possess, including, but not limited to, one or more or a combination of the following: minimally dissolves or practically does not dissolve in one or more solutions being 'stripped,' separable from the other gases using one or more gas membranes, separable from the other gases using condensation, separable from the other gases using compression, separable from the other gases using a reversible reaction, or separable from the other gases.

Note: The concentration of other air components, including, but not limited to, argon, carbon dioxide, water vapor, methane, may be selectively absorbed, desorbed, or concentrated during the one or more liquid-liquid phase changes.

Note: To, for example, optimize cloud-point temperature and/or other separation properties (for example, including, but not limited to, liquid-liquid phase separation, layer separation, liquid phase composition, liquid phase distribution, or combination thereof), one or more liquid phases may include one or more additives, such as, for example, salts and organic reagents. Said additives may decrease or increase cloud-point temperature or improve phase separation properties or adjust organic reagent osmotic pressure (may be, for example, applicable in versions of one or more embodiments employing reverse osmosis, nanofiltration, or ultrafiltration to concentrate, for example, one or more salts or selectively concentrate one or more organic reagent, selectively concentrate one or more inorganic reagents, or to selectively not concentrate one or more salts or organic reagents or inorganic reagents, or a combination thereof).

Note: LLS-1 may comprise one or more liquid—liquid separators or separation devices (which may include, but not limited to, one or more or a combination of the following: cyclone, centrifuge, coalescer, decanter, or filter).

Note: Acid gases may include, but are not limited to, one or more or a combination of the following: $CO_2$, $H_2S$, HF, $SO_2$, $NO_2$, HCN, HCl, HI, HBr.

Note: One or more desired gases may be in gas streams with one or more or a combination of other gases.

Note: Systems, methods, embodiments, or combinations thereof described herein may be employed for separating gases or liquids. Embodiments described herein may, for example, separate two or more gases with different solubilities in one or more of the solvents employed in the technology. For example, one or more embodiments may be employed for separating basic gases, such as ammonia. Alternatively, for example, one or more embodiments may be employed to separate hydrocarbons from inert gases (for example: $N_2$, $O_2$, Argon) or from other hydrocarbons or from a combination thereof. One or more hydrocarbons may, for example, have a higher solubility than one or more other gases, such as inert gases, in, for example, one or more the physical solvents. Then, for example, said one or more physical solvents may be mixed with one or more antisolvents, for example, which may include, but are not limited to, a salt water solution, resulting in the desorption or phase separation of said one or more hydrocarbons as gases or as liquids.

Note: A reduction in pH may facilitate acid gas desorption. An increase in pH may facilitate basic gas desorption.

Note: A method for creating a liquid system exhibiting one or more phase transitions, while maintaining other desirable properties, which may include, but are not limited to, low viscosity or higher purity of physical solvent, may comprise reagents with, for example, including, but not limited to, one or more or a combination of the following properties:

- Reagent 1: A reagent with relatively low solubility in Reagent 2 and relatively higher or miscible solubility in Reagent 3.
- Reagent 2: A reagent with relatively low solubility in Reagent 1 and relatively higher or miscible solubility in Reagent 3.
- Reagent 3 comprises one or more or combination of the following properties:
  - A reagent with high solubility in both Reagent 1 and Reagent 2 under certain conditions, which may be the same conditions.
  - A reagent with higher solubility or higher affinity or more attraction for Reagent 1 than Reagent 2 at relatively elevated temperatures or above certain relatively elevated temperatures (if cooling cloud point is desired).
  - A reagent with higher solubility or higher affinity or more attraction for Reagent 2 than Reagent 1 at relatively cooler temperatures or below certain relatively cooler temperatures (if cooling cloud point is desired).
- Reagent 4: A reagent which is soluble in Reagent 1 alone, and not soluble, or exhibits limited solubility, in Reagent 2, Reagent 3, or both.

Note: Alternative basic salt solutions for physical absorption or quasi-physical absorption may include, but are not limited to, one or more or a combination of the following: $CO_2$—Rich aqueous ammonia, sodium carbonate solutions, sodium sesquicarbonate solutions, sodium carbonate-bicarbonate solutions, alkali carbonate-bicarbonate solutions, acidic salt—ammonia solutions (for example, including, but not limited to, ammonium sulfate—ammonia, ammonium nitrate—ammonia, ammonium chloride—ammonia).

Note: One or more solutions may contain aqueous ammonia. If one or more solutions contain aqueous ammonia, it may be desired for the concentration of ammonia in the solution or other reagents in said one or more solutions enable the solution to be at a pH below the pH of free ammonia (below ~8.5 or below ~9), although at a basic pH (for example: >pH of 7).

Note: A gas blower or compressor ('Gas Compressor') may be employed.

Note: A portion of water vapor may be removed from the one or more desorbed gas streams or one or more gases stream exiting one or more absorption units or a combination thereof. Said water vapor removal may be employed, for example, before or after entering one or more gas compressors, using, for example, one or more water removal methods, including, but not limited to, one or more or a combination of the following: cooling condensers or desiccants. Water vapor may be removed, to, for example, including, but not limited to, one or more or a combination of the following: reduce corrosion, prevent accumulation of water in absorption solution (or otherwise ensure proper water balance), or reduce the energy required to compress or otherwise transfer one or more gases. For example, a cooling condenser may be employed, wherein, for example, one or more gas streams may be cooled to 0-5° C., reducing the water vapor concentration to below 1 vol % through condensation. G-2 may represent a pressurized, water-lean gas stream.

Note: One or more gases remaining after, for example, absorption may undergo further scrubbing or treatment (for example, in embodiments employed for acid gas removal: employing a deep scrubbing method, such as employing a strong base—for example sodium hydroxide, or high absorption efficiency absorbent or adsorbent, such as an amine or quaternary ammonium compound). Said further treatment may be beneficial, for example, in one or more embodiments where one or more gases are removed from one or more valuable gas streams (for example: removal of $CO_2$ from biogas or natural gas to increase the concentration of potentially more valuable methane) or one or more gases are valuable gas streams, which may require for said one or more valuable gases to reach certain purity levels.

Note: Cooling may be conducted during, for example, before or during or after the absorption of one or more gases. Said cooling may be employed, for example, to ensure the solution remains at an appropriate temperature and/or remove heat due to the enthalpy of absorption. Said cooling input may involve the use of, including, but not limited to, cooling water, heat sink, chiller or other cooling source or sources or combination thereof.

Note: Heat sources may include one or more or a combination of heat sources known in the art, which may include, but are not limited to, one or more or a combination of the following: waste heat, condenser water, cooling water waste heat, steam, heat pump, solar heat, or other heat source.

Note: A heat pump may be employed to provide, for example, simultaneous heating and cooling required for, for example, temperature driven thermal switching or precipitation. Thermal switching or precipitation generally may involve an endothermic or exothermic phase change, wherein, for example, the enthalpy of precipitation or thermal switching may be largely similar to the enthalpy of dissolution or mixing. As a result, one or more heat pumps may extract heat from one or more exothermic steps and provide said heat for one or more endothermic steps.

Note: An increase acidic salt concentration may reduce pH and may, for example, increase the partial pressure of one or more acid gases (for example: $CO_2$, $H_2S$, HCN, HF, $SO_2$, $NO_2$).

Note: The aqueous solution may function as a physical solvent. In, for example, the embodiment shown in FIG. 2A, one or more liquid phases possessing higher solubility of one or more gases may be considered a physical solvent, even though, for example, one or more lower $CO_2$ or acid gas solubility liquid phase may possess $CO_2$ solubility.

Note: FIG. 7A-7C may show an example embodiment where M-1 and M-2 (acidic or basic reagent ‘precipitation or thermal switching’ or ‘dissolution’ vessels) may be run in opposing sequence. For example, when M-1 may be precipitating or thermal switching acidic reagent from an acidic reagent—Rich, acid gas-Lean solution, M-2 may be dissolving acidic reagent into an acidic reagent—lean, acid gas-Rich solution.

Note: One or more embodiments described herein may employ a flash desorber which may desorb one or more dissolved gases due to depressurization. In some embodiments, in may be desirable to recycle at least a portion of said desorbed gas to one or more absorption units. For example, said recycle may be employed in an embodiment employed for acid gas removal, for example, if there may be residual methane or other contaminants in said recycled gas stream requiring further treatment or separation.

Note: An example solvent may comprise, for example, an aqueous solution of diammonium phosphate, aqueous ammonia, a combination thereof, or another relatively basic pH fertilizer. Some embodiments, for example, may be employed to remove $CO_2$ from biogas produced, for example, on a farm. $CO_2$ in biogas may be absorbed into, for example, a diammonium phosphate solution employed on the farm as a fertilizer. The remaining ‘non-$CO_2$’ gases (for example: Biomethane) may be, for example, injected into a natural gas grid, undergo further treatment before injection into a natural gas grid, undergo further treatment, or may be used for one or more biomethane applications. The resulting $CO_2$—Rich fertilizer solution may simply be employed as a fertilizer as, for example, it may have otherwise, eliminating the need for, for example, a desorption column or desorption step within the biogas upgrading process.

Note: Upgraded biogas or natural gas or other gas stream may undergo additional treatment, for example, may include, but is not limited to, removal of a portion of water vapor.

Note: In the case of precipitation: After precipitation and draining or separation of the solution from the precipitate, M-1 (now containing precipitate) may now become the precipitate dissolution vessel, while M-2 becomes the cooling precipitation vessel. The precipitate may not require transfer from the vessel, minimizing precipitate handling challenges. During the precipitation and dissolution, M-1 and M-2 may be heat exchanged through, for example, exchanging jacketed vessel liquids (for example: water, or silicone oil), and may be further accelerated or enhanced using, for example, a heat pump. The heat of precipitation is similar to the heat of dissolution, thus heat exchanging these two stages may reduce energy requirements.

Note: In the case of thermal switching: The thermally switched (either through heating or cooling) phases may be separated. In the case of liquids, said separated liquids may be transferred to their respective next steps. Due to the ability to transport liquids using one or more pumps, one or more liquids may be stored or transferred to in excess capacity vessels to ensure there is sufficient amounts available to ensure the plant can keep running, at least temporarily, if a problem occurs.

Note: In the case of an endothermic phase separation or clouding or LCST, the phases may be clouded out before or during the absorption of one or more gases and may be mixed or dissolved before or during desorption of one or more gases. In the case of an exothermic phase transition or clouding or UCST, one or more phases may be phase transitioned before or during the desorption of one or more gases and may be mixed or dissolved before or during the absorption of one or more gases.

Note: Embodiments herein may employ pumps or other fluid or mass transfer devices. Figures may not include all necessary pumps and other devices. For example, there are numerous configurations and types of pumps that may be employed in the embodiments described herein.

Note: A reagent blend comprising Basic Salt (for example: one or more or a combination of dihydrogen phosphate salts)+ Water+ Organic Reagent (for example: one or more or a combination of non-volatile organic solvents or polymers) may possess a relatively high $CO_2$ solubility (For example: >0.7 g $CO_2$ per 100 g solution at 30PSI $CO_2$ partial pressure at 25° C.) as a combined solution, as two or more separated phases (for example: ‘clouded-out’ or ‘thermally switched’), or a combination thereof. The reagent combination described thereof may be applicable to, for example, one or more or a combination of embodiments herein, including, but not limited to, FIG. 1. In the case of employing said reagent blend in FIG. 1, the process may benefit from the recovery of the enthalpy of absorption of acid gas (removing heat during absorption as one or more phases ‘cloud-out’ from solution from, for example, the temperature rise) and the subsequent release of heat and entropy during the dissolution of the ‘clouded-out phases’ during the desorption of acid gas.

Note: The basic salt solution, which may be employed in the embodiments shown in FIGS. 6 and 7, may absorb one or more gases, such as acid gases or $CO_2$, by including, but not limited to, one or more or a combination of the following: physical or physio-chemical manner. The basic solution reagent may include, but is not limited to, salts that form basic solutions with water, however may maintain composition in the presence of $CO_2$ or one or more other acid gases. The cation or cations of one or more salts may have a higher affinity for the pre-existing anion or anions it/they is/are bonded to than $CO_2$(aq) or other dissolved acid gases or combination thereof. An example salt may be diammonium phosphate, which forms a basic solution with water. Aqueous solutions of diammonium phosphate (DAM) may exhibit an appreciably higher solubility of $CO_2$ in than deionized water. DAM(aq) may exhibit a 3-6.5× greater $CO_2$ solubility or greater $CO_2$ solubility per kilogram of solution than deionized water.

Note: If one or more liquid phases re-dissolve or recombine or form more liquid phases or conduct another form of phase transition during absorption, which may form, for example, a solution with less phases or different phases, due to, for example, the heat released during absorption or heat form the surrounding environment or combination thereof, said phase-change reagents may have caused enabled the column to maintain a more stable temperature profile. To achieve a similar average temperature profile using a conventional physical solvent, the physical solvent may have to be cooled significantly below the desired average column or solvent temperature (for example: 5-10° C.), which may require a parasitic form of cooling or may involve less efficient absorption due to average column or solvent temperature in the absorber.

Note: If desired, a portion of said two or more liquid phases may, for example, in part or in whole, dissolve during absorption, an endothermic phase change which may absorb heat from the absorption column and cool the absorber. Said endothermic dissolution may enable reduced chilling requirements of, for example, the gas stream entering one, or more absorbers or one or more absorbers themselves, or a combination thereof.

Note: Desired gases may be gases desired to be removed from the gas stream or stream entering the absorber. For example, the desired gases may be acid gases in biogas or natural gas.

Note: Phase change may occur to one or more other properties in addition to or separate from or without LCST or UCST phase change. For example, including, but not limited to, one or more or a combination of the following: changes in temperature driven solubility without LCST or UCST, changes in light, changes in pressure, changes in the presence of one or more reagents, changes in the concentration of one or more reagents, membrane based separation process, presence of an equilibrium shifting reagent, change in concentration in an equilibrium shifting reagent, changes in sound, or changes in system conditions.

Note: A liquid solution may have both a UCST and an LCST. For example, a solution may form a multiphase solution or solution of different phase compositions below a certain temperature range and/or above a certain temperature range. Said solution may form a single liquid phase or a less liquid phases between these upper and lower temperature ranges.

Note: One or more solubility changes may occur due to cooling. For example, below a temperature range or certain temperature points or a certain temperature, the solubility one or more components of the solution may become less soluble and form one or more separate liquid phases.

Note: Phosphoric acid (2) salts may react with acid gases to form ammonium—phosphates with a lower ratio of ammonia to phosphoric acid (for example: monoammonium phosphate) and a carbon dioxide species salt (for example: ammonium carbamate or ammonium carbonate). Upon one or more changes in conditions (for example: reducing pressure, increasing temperature, or increasing the presence of a reversible equilibrium-shifting reagent[for example: a solubility swing acidic reagent]), $CO_2$ or another acid gas may desorb, while said phosphoric acid (2) salt may be re-created or regenerated.

Note: One or more embodiments may employ one or more solid-liquid separation device. For example, FIG. 7A-C may employ one or more solid-liquid separated devices (which may be located internally within M-1 and M-2, as, for example, the precipitate remains in M-2 while the remaining solution exits as L-12). For example, acidic reagent(s) or (1) or (solid-liquid) may remain in M-2 until it is switched to ‘step 2.’

Note: One or more of the embodiments described herein may be employed to separate organic solvent vapors or other VOCs from gas mixtures.

For example: The vapor of one or more organic solvents or other liquids or gases may be soluble in ‘Reagent 1’, which may have condition sensitive solubility change (for example: UCST or LCST phase change) in another reagent, Reagent 2. The one or more organic solvent vapors may be dissolved in, for example, the combined solution comprising Reagent 1 and Reagent 2. Said combined solution may comprise a relatively low vapor pressure of one or more organic solvents due to, for example, including but not limited to, Reagent 1 functioning as a surfactant. Upon condition sensitive solubility change of Reagent 1, the reagents may form two or more separate liquid phases. Reagent 1 rich phase may become ‘rich’ in one or more organic solvents, enabling, for example, lower energy or otherwise facilitating the desorption or distillation or other separation of the recovered organic solvent. Alternatively, or additionally, one or more organic solvents in said Reagent 2 rich phase may have lower solubility or may be saturated or supersaturated, enabling, for example, lower energy separation of one or more organic solvent vapors from Reagent 2.

Alternatively, or additionally, Reagent 1 may possess greater solubility of one or more organic solvent vapors relative to Reagent 2 and Reagent 2 may possess greater solubility of one or more organic solvent vapors than Reagent 1. Upon liquid phase change into separate liquid phases, the Reagent 1-rich liquid phase may be rich in one or more organic solvents or other reagents and the Reagent 2-rich liquid phase may be rich in one or more different organic solvents or other reagents. As a result, the one or more organic solvents may be selectively separated.

For example: The one or more organic solvent vapors or other liquids or gases may be soluble in ‘Reagent 1’, which may possess condition sensitive solubility change (for example: UCST or LCST phase change) or may be separated using a membrane or a combination thereof from in another reagent or reagents, for example, Reagent 2. One or more organic solvent vapors or other liquids or gases may be insoluble or exhibit limited solubility in Reagent 2. One or more organic solvent vapors may be absorbed or dissolved in the 'Reagent 1' rich phase, which may form a 'Reagent 1' rich phase rich in one or more organic solvents. Said organic solvent-rich, 'Reagent 1'-rich phase may be combined with a 'Reagent 2' rich phase. The solubility may decrease or vapor pressure may increase of the one or more organic solvents with, for example, the dissolution of the 'Reagent 2' rich phase. One or more organic solvents may be more easily separated or regenerated from the combined solution relative to 'Reagent 1' rich phase alone. For example, the one or more organic solvents may be separated using, for example, including but not limited to, one or more or a combination of the following: decanting or other liquid-liquid separation of one or more organic solvent liquid phases that may form upon or following the dissolution of 'Reagent 2' rich phase, distillation, mechanical vapor compression distillation, stripping, or a combination thereof.

Note: M-1 and M-2 may be cooled or heating using one or more cooling or heating methods or using a heat pump interconnected to or heat exchanging between M-1 and M-2. In FIGS. 7A-C, M-1 and M-2 may be switched from being dissolution vessels to precipitation vessels and vice versa. To ensure effective heat exchanging and continuous operation, M-1 and M-2 may be operated in opposition (if M-1 is dissolving acidic reagent(s), M-2 may be precipitating acidic reagent(s) and if M-2 is dissolving acidic reagent solid(s), M-1 is precipitating acidic reagent solid(s)).

Note: One or more embodiments may employ one or more reagents at a concentration where, for example, the osmotic pressure of one or more reagents in one or more solutions or one or more solutions may be sufficiently low such that, for example, one or more solutions may be concentrated using a reverse osmosis or forward osmosis (for example, including, but not limited to, less than 120 bar osmotic pressure for high pressure reverse osmosis, less than 80 bar osmotic pressure for practical high pressure reverse osmosis, or less than 50 bar osmotic pressure for standard reverse osmosis). Said concentrating may be beneficial, as it may reduce or eliminate the need to remove water vapor from the incoming acid gas before it enters the process, reducing OPEX and CAPEX. It may also enable said process to be a net water producing process. Said process may involve a reverse osmosis or other membrane-based process concentrating step or dewatering step, or combination thereof.

Note: Embodiment may alternatively employ a heat exchanger instead of a heat pump or may not require additional heat input during $CO_2$ (or other acid gas) stripping.

Note: An ammonia abatement cycle may be unnecessary or superfluous in one or more embodiments Note: One of the functions of two or more absorption units may be to ensure both phases, the low gas solubility phase (for example: salt water aqueous solution) and the high gas solubility phase (for example: the organic physical solvent—rich phase), are nearly saturated with gas. If a low gas solubility phase (for example: salt water aqueous solution) may not be saturated or appreciably enriched with one or more desired gases, when said low gas solubility phase may be mixed with a high gas solubility phase, said low gas solubility phase may more dilute said high gas solubility phase, which may result in a reduced effect of said mixing in shifting equilibrium gas partial pressure. The two or more separate absorption columns may ensure both liquid phases are appreciably enriched in gas before gas desorption, addressing the previously described potential performance inhibitor.

Note: Alternative basic salt solutions for physical absorption or quasi-physical-chemical absorption include, but are not limited to, one or more or a combination of the following: acidic salt—ammonia solutions, ammonium sulfate—ammonia, ammonium nitrate—ammonia, ammonium chloride—ammonia, diammonium phosphate, mixtures of diammonium phosphate and monoammonium phosphate, sodium phosphate dibasic, potassium phosphate dibasic, calcium phosphates, alkali phosphates, strong base—weaker acid salts, stronger base—weaker acid salts.

Note: The benefits of an aqueous ammonia—acid ammonium salt solution for acid gas separation, may include, but are not limited to, one or more or a combination of the following:

- Higher absorption capacity at lower acid gas partial pressures than in physical solvents
- Lower enthalpy of desorption than regular aqueous ammonia
- 'Ammonia' may be at least partially neutralized by the acidic ammonium salt, enabling it to be ionic in solution. The 'ammonia' has the benefits of being ionic (for example: minimal ammonia slip or volatility, competing reaction facilitating acid gas desorption), however can absorb acid gas despite being ionic (because, for example, the pKa of the acidic gases in solution may be stronger than the acidic ammonium salt).
- No ammonia slip
- May facilitate precipitation of ammonium bicarbonate
- Fully reversible
- Low cost
- Compatible with many impurities Note: $CO_2$—Rich aqueous ammonia, sodium carbonate solutions, sodium sesquicarbonate solutions, sodium carbonate-bicarbonate solutions, alkali carbonate-bicarbonate solutions Note: $CO_2$ may be recirculated as a 'stripping gas' to facilitate, for example, $CO_2$ desorption in one or more desorption units. For example, a portion of desorbed $CO_2$ gas stream exiting the desorber may be compressed and fed into the bottom or a low section of the desorber. The solution may be agitated or heated if desired to facilitate desorption.

Note: changing one or more or a combination of process conditions, including, but not limited to, concentration, temperature, solubility, pressure, light, radiation, ultrasound, or vibration.

Note: To, for example, facilitate dissolution, a multi-liquid phase mixture exhibiting, for example, one or more LCSTs, may be cooled during dissolution.

Note: Phase change physical absorbent or Phase change physical absorbents or Phase change physical solvents.

Note: Liquid with one phase predominately larger or of greater volume or of greater mass than another phase Note: The liquid system may comprise the working fluids employed in one or more components of, for example, one or more embodiments described herein, or one or more systems and methods combined herein. Furthermore, a liquid system may comprise the combined reagents which may result in a solution or multi-liquid phase mixture which may possess a phase transition or cloud point or UCST or LCST.

Note: Further heating or cooling may be required to overcome any losses.

Note: One or more embodiment may alternatively employ one or more heat exchanger instead or in addition to one or more heat pumps. One or more embodiment may require additional heat input before or during the desorption of one or more gases.

Note: One or more embodiments described herein may be employed to separate basic gases. For example, Embodiment 9A-C may employ a basic antisolvent, such as, for example, a solution containing an amine or potassium carbonate. Said reagents may reduce the solubility of aqueous ammonia relative to, for example, a solution with just water, such as a solution comprising solely water and dissolved ammonia. Alternatively, said solution may comprise a solution with an acidic salt, such as ammonium nitrate, which may increase the solubility of one or more basic gases in a solution. Said solution without another basic compound or with minimal amounts of basic compound may comprise the physical solvent employed to absorb ammonia from an ammonia laden gas stream. The solution concentrated in one or more other basic compounds may comprise the antisolvent. Combining said antisolvent with said physical solvent may result in a single solution with lower aqueous ammonia solubility or faster aqueous ammonia desorption kinetics or a combination thereof. The aqueous ammonia may be desorbed from said combined solution using, for example, carrier gas stripping, steam stripping or other desorption or recovery method. After ammonia desorption, the ammonia-lean combined solution may be regenerated into the physical solvent and the antisolvent using a membrane-based process, such as reverse osmosis, which rejects the one or more antisolvent reagents, while allowing water and residual ammonia to pass through as permeate. This may result in an antisolvent concentrate solution and a physical solvent permeate solution. The one or more antisolvent reagents may require a hydration radius sufficiently large to be rejected by the one or more membranes. The one or more physical solvent reagents may require a hydration radius or molecular weight sufficiently small to pass through the one or more membranes. The antisolvent-ammonia or antisolvent—dissolved gas or antisolvent—physical solvent, or combination thereof interaction or interactions may desirably be reversible using a membrane-based process.

The concentration of one or more gases in one or more liquid phases or one or more liquid systems may influence one or more UCSTs or LCSTs or combination thereof.

Note: Other membrane-based processes include Electrodialysis, Reverse Electrodialysis, gas permeable membranes Note: An ammonia abatement cycle may be unnecessary Note: Example composition:

LCST: propylene carbonate, water, PPG 425, and salt

UCST: propylene carbonate, water, PPG 425

The concentration ratios in the LCST case are ~25 wt % propylene carbonate, ~25 wt % PPG 425, and ~50 wt % aqueous salt solution The concentration ratios in the UCST case are ~60 wt % propylene carbonate, ~15 wt % PPG 425, and ~25 wt % water Note: Strongly acidic solutions employed as, for example, an antisolvent, may be, for example, buffered to a slightly higher pH to ensure the acidic solution is compatible with, for example, the membranes and membrane-based processes that may be employed. For example, an aqueous solution of $NaHSO_4$ alone may have a pH as low as 1. A 'buffered' version of is solution may, for example, contain more sodium cations, using, for example, sodium hydroxide. A 'buffered' version of this solution, may possess a pH of, for example 2-3.5.

Note: wherein said antisolvent may be regenerated from solution using a LCST or UCST or other liquid phase transition, wherein, for example, at least one of the resulting liquid phases comprises, at least in part, an antisolvent Note: the desorption stage may desorb gases with from a different number or composition of physical liquid phases than the absorption stage.

Note: Polypropylene carbonate, polyethylene carbonate

Note: metals, transition metals, metals with low melting point, molten salts, salts with low melting point, salts with melting point, metals with melting point Note: Strongly basic solutions employed as, for example, an antisolvent, may be, for example, buffered to a slightly lower pH to ensure the basic solution is compatible with, for example, the membranes and membrane-based processes that may be employed. For example, an aqueous solution of NaOH alone may have a pH as low as 1. A 'buffered' version of is solution may contain, for example, a less basic or an acidic compound, for example, sodium carbonate. A 'buffered' version of this solution may comprise, for example, a combination of sodium carbonate and sodium hydroxide or sodium carbonate alone, and may possess a pH of, for example 11-13.

Example and Experimental Data

Example reagent composition demonstrating precise UCST cloud point temperature and Cloud Point Temperature Adjustment or Tuning with Significant to Complete Reversibility At large Scale and Relatively Low Viscosity:

The below example compositions provide the exact cloud point temperature of a novel UCST system composition. The below compositions also demonstrate the relatively small adjustments in composition that may be employed to adjust the cloud point temperature or UCST of the liquid system. The below compositions also demonstrate the ability to adjust the size and composition of the bottom and top liquid layers formed from the UCST phase change. Some of the below compositions also demonstrate fully tunable UCST compositions comprising only non-toxic, non-volatile or nearly non-volatile chemicals (for example: water vapor). Some of the below compositions also demonstrate fully tunable UCST compositions comprising only non-corrosive or low corrosivity reagents. Some of the below compositions also demonstrate fully tunable UCST compositions comprising no or limited presence of an ionic compound.

It is important to note the one or more phases forming below the UCST temperature in a UCST system, one or more of the phases may have different density compared to one or more other phases. As a result, the one or more phases may form liquid 'layers,' where each layer is concentrated or comprises each liquid phase. The appearance of the liquid phases, may include, but is not limited to, the appearance of the liquid layers that form in a combination of mineral oil and DI water.

Note: The presence of most ionic compounds comprising, for example, including, but not limited to, sodium chloride, potassium bicarbonate, potassium carbonate, ammonium bicarbonate, ammonium carbonate, ammonium phosphates, ammonium sulfate, increase the UCST cloud point temperature in aqueous systems with, for example, Polypropylene Glycol or Polyethylene Glycol. In aqueous systems with, for example, Polypropylene Glycol, the cloud point temperature increases with increased concentration of glycerol. In aqueous systems with, for example, Polypropylene Glycol, the cloud point temperature decreases with increased concentration of propylene glycol.

Example Composition #1

| | |
|---|---|
| Composition | 19.4 wt % PPG 425<br>53.6 wt % Propylene Carbonate<br>27 wt % Deionized Water |
| Cloud Point Temperature | ~18° C. |
| Volume % of Top Layer Below Cloud Point Temperature | ~45.5% |
| Composition of Top Layer | Water + PPG 425 Rich Phase |
| Volume % of Bottom Layer Below Cloud Point Temperature | ~54.5% |
| Composition of Bottom Layer | Propylene Carbonate Rich Phase |

Example Composition #2

| | |
|---|---|
| Composition | 23.0 wt % PPG 425<br>51.2 wt % Propylene Carbonate<br>25.8 wt % Deionized Water |
| Cloud Point Temperature | ~4.1° C. |
| Volume % of Top Layer Below Cloud Point Temperature | ~51% |
| Composition of Top Layer | Water + PPG 425 Rich Phase |
| Volume % of Bottom Layer Below Cloud Point Temperature | ~49% |
| Composition of Bottom Layer | Propylene Carbonate Rich Phase |

Example Composition #3

| | |
|---|---|
| Composition | 19.3 wt % PPG 425<br>48.4 wt % Propylene Carbonate<br>32.3 wt % Deionized Water |
| Cloud Point Temperature | ~18° C. |
| Volume % of Top Layer Below Cloud Point Temperature | ~57% |
| Composition of Top Layer | Water + PPG 425 Rich Phase |
| Volume % of Bottom Layer Below Cloud Point Temperature | ~43% |
| Composition of Bottom Layer | Propylene Carbonate Rich Phase |

Example Composition #4

| | |
|---|---|
| Composition | 21.5 wt % PPG 425<br>39.2 wt % Propylene Carbonate<br>39.3 wt % Deionized Water |
| Cloud Point Temperature | ~13.6° C. |
| Volume % of Top Layer Below Cloud Point Temperature | ~77% |
| Composition of Top Layer | Water + PPG 425 Rich Phase |
| Volume % of Bottom Layer Below Cloud Point Temperature | ~23% |
| Composition of Bottom Layer | Propylene Carbonate Rich Phase |

Example Composition #5

| | |
|---|---|
| Composition | 21.5 wt % PPG 425<br>39.0 wt % Propylene Carbonate<br>39.25 wt % Deionized Water<br>0.25 wt % Ammonium Sulfate |
| Cloud Point Temperature | −15.6° C. |
| Volume of Top Layer Below Cloud Point Temperature | ~73.3% |
| Composition of Top Layer | Water + PPG 425 + Ammonium Sulfate Rich Solution |
| Volume of Bottom Layer Below Cloud Point Temperature | ~26.7% |
| Composition of Bottom Layer | Propylene Carbonate-Rich Solution |

Composition #5 shows the presence of a relatively small concentration of ammonium sulfate (for example: 0.25 wt %) increase the UCST cloud point temperature of the liquid system relative to Composition #4.

Example Composition #6

| | |
|---|---|
| Composition | 21.2 wt % PPG 425<br>38.3 wt % Propylene Carbonate<br>38.6 wt % Deionized Water<br>1.9 wt % Glycerol |
| Cloud Point Temperature | ~17.3° C. |
| Volume of Top Layer Below Cloud Point Temperature | ~73.3% |
| Composition of Top Layer | Water + PPG 425 + Glycerol-Rich Solution |
| Volume of Bottom Layer Below Cloud Point Temperature | ~26.7% |
| Composition of Bottom Layer | Propylene Carbonate-Rich Solution |

Composition #6 shows the presence of a relatively small concentration of glycerol (for example: 1.9 wt %) increases the UCST cloud point temperature of the liquid system relative to Composition #4.

Example Composition #7

| | |
|---|---|
| Composition | 21.1 wt % PPG 425<br>38.3 wt % Propylene Carbonate<br>38.5 wt % Deionized Water<br>2.2 wt % Propylene Glycol |
| Cloud Point Temperature | ~11.9° C. |
| Volume of Top Layer Below Cloud Point Temperature | ~84.5% |
| Composition of Top Layer | Water + PPG 425 + Propylene Glycol-Rich Solution |
| Volume of Bottom Layer Below Cloud Point Temperature | ~15.5% |
| Composition of Bottom Layer | Propylene Carbonate-Rich Solution |

Composition #7 shows the presence of a relatively small concentration of propylene glycol (for example: 2.2 wt %) decreases the UCST cloud point temperature of the liquid system relative to Composition #4.

Example reagent composition demonstrating precise LCST cloud point temperature and Cloud Point Temperature Adjustment or Tuning with Significant to Complete Reversibility At Large Scale and Relatively Low Viscosity:

The below example compositions provide the exact cloud point temperature of a novel LCST system composition. The below compositions also demonstrate the relatively small adjustments in composition that may be employed to adjust the cloud point temperature or LCST of the liquid system.

The below compositions also demonstrate the ability to adjust the size and composition of the bottom and top liquid layers formed from the LCST phase change. Some of the below compositions also demonstrate fully tunable LCST compositions comprising only non-toxic, non-volatile or nearly non-volatile chemicals (for example: water vapor). Some of the below compositions also demonstrate fully tunable LCST compositions comprising only non-corrosive or low corrosivity reagents. Some of the below compositions also demonstrate fully tunable LCST compositions comprising no or limited presence of an ionic compound.

It is important to note the one or more phases forming above the LCST temperature in a LCST system, one or more of the phases may have different density compared to one or more other phases. As a result, the one or more phases may form liquid 'layers,' where each layer is concentrated or comprises each liquid phase. The appearance of the liquid phases, may include, but is not limited to, the appearance of the liquid layers that form in a combination of mineral oil and DI water.

Note: The presence of most ionic compounds comprising, for example, including, but not limited to, sodium chloride, potassium bicarbonate, potassium carbonate, ammonium bicarbonate, ammonium carbonate, ammonium phosphates, ammonium sulfate, decrease the LCST cloud point temperature in aqueous systems with, for example, Polypropylene Glycol or Polyethylene Glycol. In aqueous systems with, for example, Polypropylene Glycol, the cloud point temperature decreases with increased concentration of glycerol. In aqueous systems with, for example, Polypropylene Glycol, the cloud point temperature increases with increased concentration of propylene glycol.

| Example Composition #8 | |
|---|---|
| Composition | 32.8 wt % PPG 425<br>65.3 wt % Deionized Water<br>1.9 wt % Sodium Chloride |
| Cloud Point Temperature | ~35.9° C. |

| Example Composition #9 | |
|---|---|
| Composition | 32.3 wt % PPG 425<br>64.4 wt % Deionized Water<br>3.3 wt % Sodium Chloride |
| Cloud Point Temperature | ~28.2° C. |
| Volume % of Top Layer Above Cloud Point Temperature | ~23.2% |
| Composition of Top Layer | PPG 425 Rich Phase |
| Volume % of Bottom Layer Above Cloud Point Temperature | ~76.8% |
| Composition of Bottom Layer | Water + Sodium Chloride Rich Phase |

Composition #9 shows increasing the concentration of sodium chloride decreases the cloud point temperature of the liquid system relative to Composition #8.

| Example Composition #10 | |
|---|---|
| Composition | 30.4 wt % PPG 425<br>60.5 wt % Deionized Water<br>6.0 wt % Polyethylene Glycol Dimethyl Ether (PEGDME) 250<br>3.1wt % Sodium Chloride |
| Cloud Point Temperature | ~28.9° C. |
| Volume % of Top Layer Above Cloud Point Temperature | ~24.2% |
| Composition of Top Layer | PPG 425 + PEGDME 250 Rich Phase |
| Volume % of Bottom Layer Above Cloud Point Temperature | ~75.8% |
| Composition of Bottom Layer | Water + Sodium Chloride Rich Phase |

| Example Composition #11 | |
|---|---|
| Composition | 28.4 wt % PPG 425<br>56.7 wt % Deionized Water<br>12.0 wt % Polyethylene Glycol Dimethyl Ether (PEGDME) 250<br>2.9 wt % Sodium Chloride |
| Cloud Point Temperature #1 | ~29° C. |
| Volume % of Top Layer Above Cloud Point Temperature (Cloud Point #1) | ~17.0% |
| Composition of Top Layer | PPG 425 + PEGDME 250 Rich Phase |
| Volume % of Bottom Layer Above Cloud Point Temperature (Cloud Point #1) | ~83.0% |
| Composition of Bottom Layer | Water + Sodium Chloride Rich Phase |
| Cloud Point Temperature #2 | ~35o C. |
| Volume % of Top Layer Above Cloud Point Temperature (Cloud Point #2) | ~22.7% |
| Composition of Top Layer | PPG 425 + PEGDME 250 Rich Phase |
| Volume % of Bottom Layer Above Cloud Point Temperature (Cloud Point #2) | ~77.3% |
| Composition of Bottom Layer | Water + Sodium Chloride Rich Phase |

| Example Composition #12 | |
|---|---|
| Composition | 49.3 wt % PPG 425<br>49.3 wt % Deionized Water<br>1.4 wt % Sodium Chloride |
| Cloud Point Temperature | ~34.1° C. |
| Volume % of Top Layer Above Cloud Point Temperature | ~60% |
| Composition of Top Layer | PPG 425 Rich Phase |
| Volume % of Bottom Layer Above Cloud Point Temperature | ~40% |
| Composition of Bottom Layer | Water + Sodium Chloride Rich Phase |

| Example Composition #13 | |
|---|---|
| Composition | 20.0 wt % PPG 425<br>57.9 wt % Deionized Water<br>20.2 wt % Propylene Carbonate<br>1.8 wt % Ammonium Sulfate |
| Cloud Point Temperature | ~31.5° C. |
| Volume % of Top Layer Above Cloud Point Temperature | ~65% |
| Composition of Top Layer | Water + Ammonium Sulfate Rich Phase |
| Volume % of Bottom Layer Above Cloud Point Temperature | ~35% |
| Composition of Bottom Layer | Propylene Carbonate + PPG-425 Rich Phase |

Example Composition #13 shows PPG 425+ Propylene Carbonate+ Water+ Salt solutions may form a LCST system with or without a UCST with different relative concentrations of reagents than, for example, Composition #5.

| Example UCST Phase Change Solution $CO_2$ Solubility Swing | |
|---|---|
| UCST Cloud Point Temperature | ~28° C. |
| Viscosity Top Layer | ~2.1 cP |
| Volume % of Top Layer Above Cloud Point Temperature | ~59% |
| Composition of Top Layer | Organic-Lean |
| CO2 Solubility at 30 PSI Gauge Pressure (46.696 PSI CO2 Partial Pressure) at 25° C. in Top Layer | 5.21 g/kg solvent |
| Viscosity of Bottom Layer | ~3.7 cP |
| Volume % of Bottom Layer Above Cloud Point Temperature | ~41% |
| Composition of Bottom Layer | Organic-Rich |
| CO2 Solubility at 30 PSI Gauge Pressure (46.696 PSI CO2 Partial Pressure) at 25° C. in Bottom Layer | 16.88 g/kg solvent |
| CO2 Solubility at 30 PSI Gauge Pressure (46.696 PSI CO2 Partial Pressure) at 30o C. in Combined Solution | 3.62 g/kg solvent |

| Example LCST Phase Change Solution $CO_2$ Solubility Swing | |
|---|---|
| UCST Cloud Point Temperature | ~26° C. |
| Viscosity of Top Layer | ~4.7 cP |
| Volume % of Top Layer Above Cloud Point Temperature | ~52% |
| Composition of Top Layer | Organic-Rich |
| CO2 Solubility at 30 PSI Gauge Pressure (46.696 PSI CO2 Partial Pressure) at 25° C. in Top Layer | 17.14 g/kg solvent |
| Viscosity of Bottom Layer | ~1.6 cP |
| Volume % of Bottom Layer Above Cloud Point Temperature | ~48% |
| Composition of Bottom Layer | Organic-Lean |
| CO2 Solubility at 30 PSI Gauge Pressure (46.696 PSI CO2 Partial Pressure) at 25° C. in Bottom Layer | 4.51 g/kg solvent |
| CO2 Solubility at 30 PSI Gauge Pressure (46.696 PSI CO2 Partial Pressure) at 20° C. in Combined Solution | 6.33 g/kg solvent |

Example Physical/Physio-Chemical Solvent

The present solvent may be a physical solvent for acid gas removal with significant cost and performance improvements over competing physical solvents, such as Selexol. Composition #1 may comprise, for example, 20-99% (weight percent, wt %) solvent, including, but not limited to, water and 0.1-80 wt % of one or more or a combination of the following—phosphates of alkalis, alkaline earths, or ammonia, ammonium, which may further comprise dibasics or dihydrogens or di-cations of alkalis, alkaline earths, or ammonia, ammonium.

Highlights of Example

Similar $CO_2$ solubility to Selexol

Solvent cost 20× less than Selexol.

Lower foaming than Selexol

Lower viscosity than Selexol

Non-volatile solvent

Lower methane loss than Selexol

Physical Solvent Technology Comparison Table

| Parameter | Composition #1 (may comprise a concentrated solution of Diammonium Phosphate) | Selexol (PEGDME 250) | Water Scrubbing |
|---|---|---|---|
| CO2 Solubility at 30 PSI Gauge Pressure (46.696 PSI CO2 Partial Pressure) at 25° C. | 18.71 g/kg solvent | 19.36 g/kg solvent1 | 4.82 g/kg solvent |
| Market Price of Solvent (USD per metric ton) | $141-$194 | $29102 | $0.3-2.00 |
| Methane Loss | Likely <2% | 1-4%** | 0.5-2%** |
| Viscosity at 25° C. (cP) | <2 | 5.83 | 1 |
| Process Pressure | 4-7 bar (est.)* | 4-7 bar* | 5-10 bar** |
| Proper Desulfurization | No | No** | No** |
| Chemicals Needed | Yes | Yes** | No** |
| Volatility | Non-Volatile | Non-Volatile | Non-Volatile (exc. water vapor) |

*Composition #1 may be viable with total biogas absorption pressures below 4 bar (~2 bar $CO_2$ partial pressure). Larger solvent volumes or recirculation rates are generally required at lower $CO_2$ absorption pressures. Composition #1 may be viable under these lower pressure conditions because it has lower viscosity and significantly lower solvent cost than Selexol, while possessing similar $CO_2$ solubility.

Example Compositions, Temperatures, and Pressures

The UCST working fluids described herein may include compositions that possess a UCST temperature that is adjustable or tunable to any temperature from −20-1000° C.

The LCST working fluids introduced herein may include compositions that possess a LCST temperature that is adjustable or tunable to any temperature from −20-1000° C.

UCST reagent compositions include, but are not limited to, one or more or a combination of the following: water, organic solvent, polymer, glycol, carbonate, carbonate ester, ester, ether, diol, lactam, protic solvents, aprotic solvents, amide, alcohol, fluorinated compound, halogenated compound, hydrocarbon, organic polymer, alkylene glycol, alkylene carbonate, polyol, urea, ionic liquid, imine, amine, amide, imide, azide, azine, acrylamide, acrylic, carboxylic acid, ketone, aldehydes, alkaloids, halides, carbonyl, nitrile, acetyl, peroxide, ionic compounds, epoxide, thioester, acetal, alkane, alkene, alkyne, haloalkane, hydroperoxide, methoxy, Carboxylate, cyanate, nirate, nitrite, nitroso, oximine, carbamate, pyridine, organic sulfur compound, organic phosphorous compound, boron, boron containing compound, inorganic chemical, inorganic compound, enol LCST reagent compositions include, but are not limited to, one or more or a combination of the following: water, organic solvent, polymer, glycol, carbonate, carbonate ester, ester, ether, diol, lactam, protic solvents, aprotic solvents, amide, alcohol, fluorinated compound, halogenated compound, hydrocarbon, organic polymer, alkylene glycol, alkylene carbonate, polyol, urea, ionic liquid, imine, amine, amide, imide, azide, azine, acrylamide, acrylic, carboxylic acid, ketone, aldehydes, alkaloids, halides, carbonyl, nitrile, acetyl, peroxide, ionic compounds, epoxide, thioester, acetal, alkane, alkene, alkyne, haloalkane, hydroperoxide, methoxy, Carboxylate, cyanate, nirate, nitrite, nitroso, oximine, carbamate, pyridine, organic sulfur compound, organic phosphorous compound, boron, boron containing compound, inorganic chemical, inorganic compound, enol The solubility of one or more gases may be less than, equal to, or greater than including, but not limited to, one or more of the following: 0.00001 g per kg solvent, 0.01 g per kg solvent, 0.1 g per kg solvent, 0.5 g per kg solvent, 1 g per kg solvent, 1.5 g per kg of solvent, 2 g per kg of solvent, 3 g per kg of solvent, 4 g per kg of solvent, 5 g per kg of solvent, 6 g per kg of solvent, 7 g per kg of solvent, 8 g per kg of solvent, 9 g per kg of solvent, 10 g per kg of solvent, 11 g per kg of solvent, 12 g per kg of solvent, 13 g per kg of solvent, 14 g per kg of solvent, 15 g per kg of solvent, 16 g per kg of solvent, 17 g per kg of solvent, 18 g per kg of solvent, 19 g per kg of solvent, 20 g per kg of solvent, 21 g per kg of solvent, 22 g per kg of solvent, 23 g per kg of solvent, 24 g per kg of solvent, 25 g per kg of solvent, 26 g per kg of solvent, 27 g per kg of solvent, 28 g per kg of solvent, 29 g per kg of solvent, 30 g per kg of solvent, 40 g per kg of solvent, 50 g per kg of solvent, 60 g per kg of solvent, 70 g per kg of solvent, 80 g per kg of solvent, 90 g per kg of solvent, 100 g per kg of solvent, 110 g per kg of solvent, 150 g per kg of solvent, 200 g per kg of solvent, 300 g per kg of solvent, 400 g per kg of solvent, 500 g per kg of solvent, 750 g per kg of solvent, 1000 g per kg of solvent, 1500 g per kg of solvent, 2000 g per kg of solvent Methane losses may be equal to, greater than, or less than one or more or a combination of the following: 0.00001%, 0.0001%, 0.001%, 0.01%, 0.1%, 0.2%, 0.3%, 0.4%, 0.5%, 0.6%, 0.7%, 0.8%, 0.9%, 1.0%, 1.1%, 1.2%, 1.3%, 1.4%, 1.5%, 1.6%, 1.7%, 1.8%, 1.9%, 2.0%, 2.1%, 2.2%, 2.3%, 2.4%, 2.5%, 2.6%, 2.7%, 2.8%, 2.9%, 3.0%, 3.5%, 4.0%, 4.5%, 5%, 10%

Applications for the embodiments described herein, may include, but are not limited to, one or more or a combination of the following: acid gas removal, hydrocarbon-hydrocarbon separation, hydrocarbon-inert gas separation, acid gas processing, natural gas processing, gas processing, syngas purification, syngas acid gas removal, $CO_2$ removal from steam methane reforming gases, $CO_2$ removal from steam biomass reforming gases biogas upgrading, $CO_2$ removal from hydrocarbon reforming gases, biogas upgrading, gas treatment, $CO_2$ capture, post-combustion capture, pre-combustion capture, landfill gas, flue gas, air separation, gas concentrating, gas removal, aerosol removal, aerosol separation, enhanced oil recovery with or without supercritical fluids, enhanced oil recovery gas processing, enhanced oil recovery gas processing for $CO_2$ reinjection, separation of Fischer-Tropsch gases or liquids.

Reagents, compounds, ionic compounds, solvents, or substances may include, but are not limited to, one or more or a combination of the following: H−, H+, D−, D+, H2−, H2+, H3+, He−, He+, He, H+, He2+, Li−, Li+, Na−, Na+, K−, K+, Cu−, Cu+, LiH−, LiH+, NaH−, NaH+, KH+, Be−, Be+, Mg−, Mg+, Ca−, Ca+, Zn−, Zn+, BeH−, BeH+, MgH−, MgH+, CaH+, ZnH+, BeH2+, B−, B+, Al−, Al+, Sc+, Ga−, Ga+, BH−, BH+, AlH−, AlH+, ScH+, GaH+, BH2−, BH2+, AlH2−, o2AlH2+, BH3−, BH3+, AlH3−, AlH3+, BH4−, AlH4−, C−, C+, Si−, Si+, Ti−Ti+, Ge−, Ge+, CH−, CH+, SiH−, SiH+, GeH+, CH2−, CH2+, SiH2−, SiH2+, GeH2−, CH3−CH3+, SiH3−, SiH3+, GeH3+, CH4−, CH4+, SiH4+, N−, N+, P−, P+, V+, As−, As+, NH−, NH+, PH−, PH+, AsH+, NH2−, NH2+, PH2−, PH2+, AsH2+, NH3−, NH3+, PH3+, AsH3+, NH4+, PH4+, O−, O+, S−, S+, Se−, Se+, OH−, OH+, HS−, HS+, CrH+, HSe−, HSe+, H2O−, H2O+, H2S−, H2S+, H2Se+, H30+, H3S+, H3Se+, F−, F+, Cl−, Cl+, Br−, Br+, I−, I+, HF−, HF+, HCl−, HCl+, HBr−, HBr+, H2F+, H2Cl+, H2Br+, Ne−, Ne+, Ar−, Ar+, Kr+, NeH+, ArH+, KrH+, XeH+, Li2−, Li2+, NaLi−, NaLi+, Na2−, Na2+, NaK+, Be2−, Be2+, Mg2−, Mg2+, B2−, B2+, A12−, A12+, BC−, BC+, C2−, C2+, SiC−, SiC+, Si2−, Si2+, C2H−, C2H+, C2H2+, H2CC−, HCCH−, C2H3−, C2H3+, C2H4−, C2H4+, C2H5−, C2H5+, C2H6+, C2H7+, LiN+, BeN−, BeN+, BN−, AlN−, AlN+, BN+, CN−, CN+, CP−, CP+, SiN−, SiN+, SiP−, SiP+, N2−, N2+, PN−, PN+, P2−, P2+, HCN−, HCN+, NNH+, HPO+, CNH2+, H2CN+, HCNH+, N2H2+, CH2NH2+, N2H4+, CH3NH2+, N2H5+, CH3NH3+, CH3PH3+, LiO−, LiO+, LiS+, NaO−, NaO+, KO+, BeO−, BeO+, MgO−, MgO+, MgS−, MgS+, BeS−, BeS+, BO−, AlO−, AlO+, BS−, BS+, AlS−, AlS+, BO+, CO−, CO+, CS−, CS+, SiO−, SiO+, SiS−, SiS+, CSe−, CSe+, GeO+, NO−, NO+, NS−, NS+, PO−, PO+, PS−, PS+, O2−, O2+, SO−, SO+, S2−, S2+, SeO−, SeO+, SeS−, SeS+, Se2−, Se2+, COH+, HCO−, HCO+, HCS−, HCS+, HNO−, HNO+, NOH+, HNS−, HO2−, HO2+, KOH2+, H2CO−, H2CO+, H2CS−, H2CS+, H2O2+, H2S2+, CH2OH+, CH30−, CH30+, H2CSH+, H3O2+, CH3OH−, CH3OH+, CH3SH+, CH3OH2+, CH3SH2+, H5O2+, LiCl−, LiCl+, NaF−, NaF+, NaCl−, NaCl+, LiBr−, LiBr+, NaBr−, NaBr+, LiF−, LiF+, BeF−, BeF+, MgF−, MgF+, MgCl−, MgCl+, ZnF−, ZnF+, BeCl−, BeCl+, BF−, BF+, AlF−, AlF+, BCl−, BCl+, AlCl−, AlCl+, GaF+, GaCl+, CF−, CF+, CCl−, CCl+, SiF−, SiF+, SiCl−, SiCl+, GeF+, NF−, NF+, NCl−, NCl+, PF−, PF+, PCl−, PCl+, FO−, FO+, ClO−, ClO+, SF−, SF+, SCl−, SCl+, BrO−, F2−, F2+, ClF, ClF+, Cl2−, Cl2+, BrF−, BrF+, BrCl−, BrCl+, Br2−, Br2+, I2+, HOBr+, F2H+, FHF−, Cl2H+, CH3Cl H+, LiNe+, Ne2+, Ar2+, Li3+, C3+, C3H3−, C3H3+, C3H3+, C3H5+, C3H7+, C3H7+, C3H7+, N3−, N3+, CH3CN−, CH3CN+, HNCNH2+, NCNH3+, C2H5NH+, C2H6N+, (CH3)2NH2+, CH3CH2NH3+, Li2O+, CNO−, NCO−, SCN−, BO2− BO2+, N2O−, N2O+, $CO_2$−, CO2+, OCS+, CS2−, CS2+, NO2−, NO2+, PO2−, PO2+, O3−O3+, SO2−, SO2+, S3−, S3+, SeO2+, HCO2−, HNNO+, NNOH+, HOCO+, HNO2+, O3H+, SO2H+, CH2CO+, H2COO+, CH3CO−, CH3CO+, CH30O−, CH30O+, H2CONH2+, C2H4OH+, C2H4OH+, CH3CHOH+, FCO+, CF2−, CF2+, SiF2+, CCl2−, CCl2+, ClOO+, OClO−, OClO+, NF2+, SF2−, SF2+, F3−, Cl3−, HCCF+, HFCO+, CH2CHF+, C4+, C4H2+, C2N2+, HCCCN+, C3H3N+, CH3NHN2+, CH6N3+, (CH3) 3NH+, C3H7NH3+, $CO_3$−−, NO3−, NO3+, SO3−, SO3+, HCO3−, C2H2O2+, H2NO3+, CH3COO−, $H_3CO_3$+, NH2CONH2+, NH2COOH2+, NH3COOH+, CH5N2O+, H2NCOHNH2+, CH3COCH3−, CH3COHCH3+, C2Cl2+, BF3−, BF3+, ClO3−, CF3−, CF3+, SiF3+, CCl3−, CCl3+, SiCl3+, NF3−, NF3+, NF3H+, AsF3H+, CH2ClCH2OH2+, C5H5−, C3H3N2−, C4H4N−, C4H6N+, C4H6N+, C4H6N+, NC4H12+, C3O2+, PO4−−−, SO4−−, HSO4−, C4H4O+, C4H10O+, ClO4−, BF4−, CCl4+, C2HF3+, C6H5−, C6H6+, C6H7+, C5H6N+, C2O4−−, CF3CN+, C2F4+, SiF5−, SF5+, C7H7+, CF3COO−, PF6−, C6N4−, H, H, D, D, H2, H2, H3, He, He, He, H, He2, Li, Li, Na, Na, K, K, Cu, Cu, LiH, Li, NaH, NaH, KH, Be, Be, Mg, Mg, Ca, Ca, Zn, Zn, BeH, BeH, MgH, MgH, CaH, ZnH, BeH2, B, B, Al, Al, Sc, Ga, Ga, BH, BH, AlH, AlH, ScH, GaH, BH2, BH2, AlH2, o2AlH2, BH3, BH3, AlH3, AlH3, BH4, AlH4, C, C, Si, Si, Ti, Ti, Ge, Ge, CH, CH, SiH, SiH, GeH, CH2, CH2, SiH2, SiH2, GeH2, CH3, CH3, SiH3, SiH3, GeH3, CH4, CH4, SiH4, N, N, P, P, V, As, As, NH, NH, PH, PH, AsH, NH2, NH2, PH2, PH2, AsH2+, NH3, NH3, PH3, AsH3, NH4, PH4, O, O, S, S, Se, Se, OH, OH, HS, HS, CrH, HSe, HSe, H2O, H2O, H2S, H2S, H2Se, H3O, H3S, H3Se, F, F, Cl, Cl, Br, Br, I, I, HF, HF, HCl, HCl, HBr, HBr, H2F, H2Cl, H2Br, Ne, Ne, Ar, Ar, Kr, NeH, ArH, KrH, XeH, Li2, Li2, NaLi, NaLi, Na2, Na2, NaK, Be2, Be2, Mg2, Mg2, B2, B2, A12, A12, BC, BC, C2, C2, SiC, SiC, Si2, Si2, C2H, C2H, C2H2, H2CC, HCCH, C2H3, C2H3, C2H4, C2H4, C2H5, C2H5, C2H6, C2H7, LiN, BeN, BeN, BN, AlN, AlN, BN, CN, CN, CP, CP, SiN, SiN, SiP, SiP, N2, N2, PN, PN, P2, P2, HC, HCN, NNH, HPO, CNH2, H2CN, HCNH, N2H2, CH2NH2, N2H4, CH3NH2, N2H5, CH3NH3, CH3PH3, LiO, LiO, LiS, NaO, NaO, KO, BeO, BeO, MgO, MgO, MgS, MgS, BeS, BeS, BO, AlO, AlO, BS, BS, AlS, AlS, BO, CO, CO, CS, CS, SiO, SiO, SiS, SiS, CSe, CSe, GeO, NO, NO, NS, NS, PO, PO, PS, PS, O2, O2, SO, SO, S2, S2, SeO, SeO, SeS, SeS, Se2, Se2, COH, HCO, HCO, HCS, HCS, HNO, HNO, NOH, HNS, HO2, HO2, KOH2, H2CO, H2CO, H2CS, H2CS, H2O2, H2S2, CH2OH, CH3O, CH3O, H2CSH, H3O2, CH3OH, CH3OH, CH3SH, CH3OH2, CH3SH2, H5O2, LiCl, LiCl, NaF, NaF, NaCl, NaCl, LiBr, LiBr, NaBr, NaBr, LiF, LiF, BeF, BeF, MgF, MgF, MgCl, MgCl, ZnF, ZnF, BeCl, BeCl, BF, BF, AlF, AlF, BCl, BCl, AiCl, AiCl, GaF, GaCl, CF, CF, CCl, CCl, SiF, SiF, SiCl, SiCl, GeF, NF, NF, NCl, NCl, PF, P, PCl, PC, FO, FO, ClO, ClO, SF, SF, SCl, SCl, BrO, F2, F2, CiF, CiF, Cl2, Cl2, BrF, BrF, BrCl, BrCl, Br2, Br2, I2, HOBr, F2H, FHF−, Cl2H, CH3ClH, LiNe, Ne2, Ar2, Li3, C3, C3H3, C3H3, C3H3, C3H5, C3H7, C3H7, C3H7, N3, N3, CH3CN, CH3CN, HNCNH2, NCNH3, C2H5NH, C2H6N, (CH3)2NH2, CH3CH2NH3, Li2O, CNO, NCO, SCN, BO2, BO2, N2O, N2O, CO2, CO2, OCS, CS2, CS2, NO2, NO2, PO2, PO2, O3, O3, SO2, SO2, S3, S3, SeO2, HCO2, HNNO, NNOH, HOCO, HNO2, O3H, SO2H, CH2CO, H2COO, CH3CO, CH3CO, CH3OO, CH3OO, H2CONH2, C2H4OH, C2H4OH, CH3CHOH, FCO, CF2, CF2, SiF2, CCl2, CCl2, ClOO, OClO, OClO, NF2, SF2, SF2, F3, Cl3, HCCF, HFCO, CH2CHF, C4, C4H2, C2N2, HCCCN, C3H3N, CH3NHN2, CH6N3, (CH3)3NH, C3H7NH3, CO3, NO3, NO3, SO3, SO3, HCO3, C2H2O2, H2NO3, CH3COO, H3CO$_3$, NH2CONH2, NH2COOH2, NH3COOH, CH5N2O, H2NCOHNH2, CH3COCH3, CH3COHCH3, C2Cl2, BF3, BF3, ClO3, CF3, CF3, SiF3, CCl3, CCl3, SiCl3, NF3, NF3, NF3H, AsF3H, CH2ClCH2OH2, C5H5, C3H3N2, C4H4N, C4H6N, C4H6N, C4H6N, NC4H12, C3O2, PO4, SO4, HSO4, C4H4O, C4H10O, ClO4, BF4, CCl4, C2HF3, C6H5, C6H6, C6H7, C5H6N, C204, CF3CN, C2F4, SiF5, SF5, C7H7, CF3COO, PF6, C6N4, ionic liquids Physical solvents, including thermally switchable solubility solvents, include, but are not limited to, one or more or a combination of the following: PEGDMEs, PPGs, PEGs, polymers, organic solvents, Ethylene carbonate, propylene carbonate, glycol ethers, water, ionic liquids, Reagents include, but are not limited to, PEGDMEs, PPGs, PEGs, polymers, organic solvents, Ethylene carbonate, propylene carbonate, glycol ethers, water, ionic liquids, Dimethoxymethane, Diethoxymethane, Diethoxyethane, Diethyl Ether, Dimethyl Ether Cloud Point Temperatures heating or LCST temperature or combination thereof may include, but are not limited to, equal to, greater than, or less than one or more or a combination of the following: −100° C., or −90° C., or −80° C., or −70° C., or −60° C., or −50° C., or −40° C., or −30° C., or −20° C., or −10° C., 0° C., 1° C., 2° C., 3° C., 4° C., 5° C., 6° C., 7° C., 8° C., 9° C., 10° C., 11° C., 12° C., 13° C., 14° C., 15° C., 16° C., 17° C., 18° C., 19° C., 20° C., 21° C., 30° C., 40° C., 50° C., 60° C., 70° C., 80° C., 90° C., 100° C., 110° C., 120° C., 130° C., 140° C., 150° C., 140° C., 150° C., 200° C., 500° C., 1000° C., 2000° C., 3000° C., 10000° C., 100000° C.

Cloud Point Temperatures cooling or UCST temperature or combination thereof may include, but are not limited to, equal to, greater than, or less than one or more or a combination of the following: −100° C., or −90° C., or −80° C., or −70° C., or −60° C., or −50° C., or −40° C., or −30° C., or −20° C., or −10° C., 0° C., 1° C., 2° C., 3° C., 4° C., 5° C., 6° C., 7° C., 8° C., 9° C., 10° C., 11° C., 12° C., 13° C., 14° C., 15° C., 16° C., 17° C., 18° C., 19° C., 20° C., 21° C., 30° C., 40° C., 50° C., 60° C., 70° C., 80° C., 90° C., 100° C., 110° C., 120° C., 130° C., 140° C., 150° C., 140° C., 150° C., 200° C., 500° C., 1000° C., 2000° C., 3000° C., 10000° C., 100000° C.

Absorption unit operations may include, but are not limited to, one or more or a combination of the following: absorption column, column, contactor, gas-liquid contactor, liquid-liquid contactor, liquid solid contactor, membrane contactor, gas membrane contactor, packed column, membrane column, plated column, multistage column, solid handling column, liquid handling column, multiphase column, rotating absorption unit, kinetic motion absorption unit, stripping column, mixing vessel, continuously stirred reactor, pressurization vessel, depressurization vessel, multistage vessel, batch setup, mixing of two or more phases, formation of more phases from less phases, formation of less phases from relatively more phases, heating vessel, cooling vessel, membrane absorption, membrane selective absorption Desorption unit operations may include, but are not limited to, one or more or a combination of the following: column, contactor, gas-liquid contactor, membrane column, membrane contactor, gas membrane contactor, packed column, plated column, multistage column, multistage vessel, batch setup, liquid-liquid contactor, liquid solid contactor, solid handling column, liquid handling column, multiphase column, rotating desorption unit, kinetic motion desorption unit, stripping column, mixing vessel, continuously stirred reactor, reboiler, depressurization vessel, pressurization vessel, flash vessel, flash unit, multistage flash unit, mixing of two or more phases, formation of more phases from less phases, formation of less phases from relatively more phases, heating vessel, cooling vessel, carrier gas stripping, steam stripping, air stripping, recirculating gas stripping, stripping using one or more gases being desorbed, ammonia stripping, membrane stripping, membrane distillation, membrane selective absorption Acid Gases, include, but are not limited to, one or more or a combination of the following applications: acid gas removal, hydrocarbon-hydrocarbon separation, hydrocarbon-inert gas separation, acid gas processing, natural gas processing, gas processing, gas plants for purification and/or re-injection of $CO_2$, $H_2S$, or other acid gases into oil field, syngas purification, syngas acid gas removal, $CO_2$ removal from steam methane reforming gases, $CO_2$ removal from steam biomass reforming gases biogas upgrading, $CO_2$ removal from hydrocarbon reforming gases, biogas upgrading, gas treatment, $CO_2$ capture, post-combustion capture, pre-combustion capture, landfill gas, flue gas, $CO_2$, or other acid gas or gases, Partial Pressure Shifting Reagents may include, but are not limited to, one or more or a combination of the following:

Acidic Reagents, or solubility or concentration or pH changing acidic reagents including, but are not limited to, one or more or a combination of the following: boric acid, an acidic reagent with pKa less acidic than the anion bonded to the reagent cation, an acidic reagent comprising an acidic salt, ammonium nitrate, ammonium sulfate, ammonium chloride, monoammonium phosphate, monosodium phosphate, one or more phosphate salts, $CO_2$ solubility reducing compounds, including, but not limited to, one or more or a combination of the following: aqueous solutions, water, salts with salting out properties, salts with significant solubility swing, compounds with significant solubility swing, salts with significant solubility swing with temperature, urea, thermally switchable reagents, Hydrocarbons, may include, but are not limited to, one or more or a combination of the following: compound containing carbon, compound containing hydrogen, compound containing oxygen, compound containing nitrogen, compound containing sulfur, saturated hydrocarbon, unsaturated hydrocarbon, cyclic hydrocarbon, cyclo hydrocarbon, aromatic hydrocarbon, alkane, alkene, alkyne, cycloalkane, alkadiene, polymers, halogenated hydrocarbons, hydrocarbons with one or more functional groups, one or more hydrocarbons in crude oil, one or more different hydrocarbons in crude oil, one or more hydrocarbons in naphtha, one or more hydrocarbons in gasoline, one or more hydrocarbons in diesel, one or more hydrocarbons in heavy oil, one or more hydrocarbons in natural gas, natural gas liquids, one or more hydrocarbons in kerosene, organic solvents, light hydrocarbons, heavy hydrocarbons, water insoluble hydrocarbons, partially water soluble hydrocarbons, water soluble hydrocarbons, low toxicity hydrocarbons, medium toxicity hydrocarbons, high toxicity hydrocarbons, methane, Ethane, Ethene (ethylene), Ethyne (acetylene), Propane, Propene (propylene), Propyne (methylacetylene), Cyclopropane, Propadiene, Butane, Butene (butylene), Butyne, Cyclobutane, Butadiene, Pentane, Pentene, Pentyne, Cyclopentane, Pentadiene, (piperylene), Hexane, Hexene, Hexyne, Cyclohexane, Hexadiene, Heptane, Heptene, Heptyne, Cycloheptane, Heptadiene, Octane, Octene, Octyne, Cyclooctane, Octadiene, hydrocarbon solution, hydrocarbon containing mixture Superior properties for desorption may include, but are not limited to, one or more or a combination of the following: higher equilibrium partial pressure of one or more gases or different gases, lower equilibrium partial pressure of one or more gases or different gases, faster desorption kinetics, greater desorption of a desired gas relative to a less desired gas, low viscosity, low volatility of other solvent constituents, low relative volatility of other solvent constituents, no degradation, no corrosion, minimal degradation, minimal corrosion, compatibility with gas impurities, minimal impurities in desorbed gases Salts may include, but are not limited to, one or more or a combination of the following: ionic compounds, ionic liquids, anions, cations, complex salts, complex ions, compounds with properties similar to salts, salts with properties dissimilar to salts, alkali, alkaline-earth, transition metal, metal, semiconductor, metalloids, ammonia, ammonium, amine, basic compound, halogenated compound, sulfate, nitrate, carbonate, hydrogen carbonate, carbamate, nitrite, sulfite, carbon compound, sulfur compound, electrolyte, nitrogen compound, phosphorous compound, phosphorous containing anion, halogen containing anion Gas, Liquid, aqueous, solid, dissolved, one or more ionic species or forms, one or more liquid phase species, biphasic mixture, multiphasic mixture, multiphasic mixture comprising liquids, solid mixture, supercritical, hydrate, triple-point, or combination thereof.

Carbon Dioxide (gas), Carbon Dioxide (liquid), Carbon Dioxide (aqueous), Carbon Dioxide (solid), Carbon Dioxide (dissolved), Carbon Dioxide (one or more ionic species), Carbon Dioxide (one or more liquid phase species), Carbon Dioxide (solid mixture), Carbon Dioxide (supercritical), Carbon Dioxide (Hydrate), Carbon Dioxide (triple point), Acidic Substance (gas), Acidic Substance (liquid), Acid Substance (aqueous), Acidic Substance Gas (Hydrate) Acidic Substance (solid), Acidic Substance (dissolved), Acidic Substance (one or more ionic species), Acidic Substance (one or more liquid phase species), Acidic Substance (solid mixture), Acid Substance (supercritical), Acidic Substance (triple point), Basic Compound (gas), Basic Compound (liquid), Basic Compound (solid), Basic Compound (dissolved), Basic Compound (one or more ionic species), Basic Compound (one or more liquid phase specific), Basic Compound (solid mixture), Basic Compound (supercritical), Basic Compound (hydrate), Basic Compound (triple point), Hydrocarbon (gas), Hydrocarbon (liquid), Hydrocarbon (aqueous), Hydrocarbon (dissolved), Hydrocarbon (non-aqueous), Hydrocarbon (one or more ionic species), Hydrocarbon (one or more liquid phase species), Hydrocarbon (solid), Hydrocarbon (solid mixture), Hydrocarbon (supercritical), Hydrocarbon (Hydrate), Hydrocarbon (triple point).

Viscosity is greater than, equal to, or less than 100,000 cP, or 10,000 cP, or 1,000 cP, or 500 cP, or 100 cP, or 50 cP, or 40 cP, or 30 cP, or 20 cP, or 10 cP, or 9 cP, or 8 cP, or 7 cP, or 6 cP, or 5 cP, or 4 cP, or 3 cP, or 2 cP, or 1 cP or 0.5 cP, or combination thereof Cooling Inputs or Sources include, but are not limited to, one or more or a combination of the following: thermocline water body, thermocline liquid body, water body, cold liquid body, evaporative cooling, heat pump cooling, air cooling, heat exchange with enthalpy source, cyrogenic cooling, LNG gasification, pressure reduction, cold surface, radiative cooling, endothothermic phase change Heating Inputs or Sources include, but are not limited to, one or more or a combination of the following: Waste Heat, Ambient Temperature Changes, Diurnal Temperature Variation, Thermocline liquid body, thermocline solid body, thermocline gaseous body, Thermocline of a water body, halocline, heat pump, solar thermal, solar thermal pond, light, electricity, steam, combustion, compression, pressure increase, geothermal, radiative heat, condensation, exothermic dissolution, exothermic precipitation, exothermic formation of more liquid phases, exothermic formation of less liquid phases, exothermic phase change, or other heat sources described herein.

Temperatures: temperatures of operation are greater than, less than, or equal to or a combination thereof include, but are not limited to, one or more or a combination of the following: −100° C., or −90° C., or −80° C., or −70° C., or −60° C., or −50° C., or −40° C., or −30° C., or −20° C., or −10° C., 0° C., 1° C., 2° C., 3° C., 4° C., 5° C., 6° C., 7° C., 8° C., 9° C., 10° C., 11° C., 12° C., 13° C., 14° C., 15° C., 16° C., 17° C., 18° C., 19° C., 20° C., 21° C., 30° C., 40° C., 50° C., 60° C., 70° C., 80° C., 90° C., 100° C., 110° C., 120° C., 130° C., 140° C., 150° C., 140° C., 150° C., 200° C., 500° C., 1000° C., 2000° C., 3000° C., 10000° C., 100000° C.

Mass percentages of one or more components comprise greater than or less than or equal to one or more or a combination of the following: 0.0000001%, 0.001%, 0.01%, 0.1%, 1%, or 5%, or 10%, or 11%, or 12%, or 13%, or 14%, 15%, or 16%, or 17%, or 18%, or 19%, or 20%, or 21%, or 22%, or 23%, or 24%, or 25%, or 26%, or 27%, or 28%, or 29%, or 30%, or 31%, or 32%, or 33%, or 34%, or 35%, or 36%, or 37%, or 38%, or 39%, or 40%, or 41%, or 42%, or 43%, or 44%, or 45%, or 46%, or 47%, or 48%, or 49%, or 50%, or 51%, or 52%, or 53%, or 54%, or 55%, or 56%, or 57%, or 58%, or 59%, or 60%, or 65%, or 70%, or 75%, or 80%, or 85%, or 90%, or 95%, or less than or equal to 100%.

Relative mass distribution of one or more liquid phases may include, but is not limited to, greater than or less than or equal to one or more or a combination of the following: 0.0000001%, 0.001%, 0.01%, 0.1%, 1%, or 5%, or 10%, or 11%, or 12%, or 13%, or 14%, 15%, or 16%, or 17%, or 18%, or 19%, or 20%, or 21%, or 22%, or 23%, or 24%, or 25%, or 26%, or 27%, or 28%, or 29%, or 30%, or 31%, or 32%, or 33%, or 34%, or 35%, or 36%, or 37%, or 38%, or 39%, or 40%, or 41%, or 42%, or 43%, or 44%, or 45%, or 46%, or 47%, or 48%, or 49%, or 50%, or 51%, or 52%, or 53%, or 54%, or 55%, or 56%, or 57%, or 58%, or 59%, or 60%, or 65%, or 70%, or 75%, or 80%, or 85%, or 90%, or 95%, or less than or equal to 100%.

'substantial' concentration of one or more components (For Example: substances or reagents or solvents or antisolvents) may include, but is not limited to, mass percentages of one or more components comprising greater than or equal to one or more or a combination of the following: 1%, or 5%, or 10%, or 11%, or 12%, or 13%, or 14%, 15%, or 16%, or 17%, or 18%, or 19%, or 20%, or 21%, or 22%, or 23%, or 24%, or 25%, or 26%, or 27%, or 28%, or 29%, or 30%, or 31%, or 32%, or 33%, or 34%, or 35%, or 36%, or 37%, or 38%, or 39%, or 40%, or 41%, or 42%, or 43%, or 44%, or 45%, or 46%, or 47%, or 48%, or 49%, or 50%, or 51%, or 52%, or 53%, or 54%, or 55%, or 56%, or 57%, or 58%, or 59%, or 60%, or 65%, or 70%, or 75%, or 80%, or 85%, or 90%, or 95%, or less than or equal to 100%.

pH may be greater than or equal to or less than one or more or a combination of the following: 1, or 2, or 3, or 4, or 5, or 6, or 7, or 8, or 9, or 10, or 11, or 12, or 13, or 14

Separation Devices may include, but are not limited to, one or more or a combination of the following: decanter, separatory funnel, coalescer, centrifuge, filter, switchable solvent, cyclone, semi-permeable membrane, nanofiltration, organic solvent nanofiltration, reverse osmosis, ultrafiltration, microfiltration, hot nanofiltration, hot ultrafiltration, distillation, membrane distillation, flash distillation, multi-effect distillation, mechanical vapor compression distillation, or hybrid systems (a) Membrane-Based Separation comprising one or a combination of the following:
  a. Nanofiltration
  b. Organic Solvent Nanofiltration
  c. Reverse Osmosis
  d. Forward Osmosis
  e. Ultrafiltration
  f. Microfiltration (b) Distillation comprising one or a combination of the following:
  a. Batch distillation
  b. Continuous distillation
  c. Simple distillation
  d. Fractional distillation
  e. Steam distillation
  f. Azeotropic distillation
  g. Multi-effect distillation
  h. Multi-stage flash distillation
  i. Flash distillation
  j. Mechanical vapor compression distillation
  k. Membrane distillation
  l. Vacuum distillation
  m. Short path distillation
  n. Zone distillation
  o. Air sensitive distillation (c) Switchable solvent—one or a combination of the following:
  a. Thermally switchable
  b. $CO_2$-switchable
  c. Switchable solvents responsive to other changes to system conditions.

comprise water, organic solvent, siloxanes, ionic liquids, water soluble polymer, soluble polymer, glycol, polyethylene glycol, polypropylene glycol, ethers, glycol ethers, glycol ether esters, triglyme, polyethylene glycols of multiple geometries, including, branched polyethylene glycols, star polyethylene glycols, comb polyethylene glycols, methoxypolyethylene glycol, polyvinyl alcohol, polyvinylpyrrolidone, polyacrylic Acid, diol polymers, 1,2 propanediol, 1,2 ethanediol, 1,3 propanediol, cellulose ethers, methylcellulose, cellosize, carboxymethylcellulose, hydroxyethylcellulose, sugar alcohol, sugars, alcohols, ketones, aldehydes, esters, organosilicon compounds, halogenated solvents, non-volatile solvents, a substance with a vapor pressure less than 0.01 atm at 20° C., soluble substances with a molecular weight greater than 80 daltons, volatile organic solvents, soluble substances with a molecular weight less than 600 daltons, soluble substances with a molecular weight less than 200 daltons, dimethoxymethane, acetone, acetaldehyde, methanol, dimethyl ether, THF, ethanol, isopropanol, propanal, methyl formate, azeotropes, alcohols, ketones, aldehydes, esters, organosilicon compounds, halogenated solvents, a substance with a vapor pressure greater than 0.01 atm at 20° C., or a mixture thereof.

water, ammonia, ammonium, amine, azine, amino ethyl ethanol amine, 2-amino-2-methylpropan-1-ol (AMP), MDEA, MEA, primary amine, secondary amine, tertiary amine, low molecular weight primary or secondary amine, metal-ammine complex, metal-ammonia complex, metal-ammonium complex, sterically hindered amine, imines, azines, piperazine, alkali metal, lithium, sodium, potassium, rubidium, caesium, alkaline earth metal, calcium, magnesium, ionic liquid, thermally switchable compounds, $CO_2$ switchable compounds, enzymes, metal—organic frameworks, quaternary ammonium, quaternary ammonium cations, quaternary ammonium cations embedded in polymer, or mixtures thereof.

ion exchange, ion exchange membrane, electrodialysis, or removal or replacement of the absorbent and/or $CO_2$ containing solution.

Convenient sources from which to capture $CO_2$ for the $CO_2$ containing solution include sources selected from the group consisting of flue gas; combustion emissions; manufacturing emissions; refining emissions or a combination thereof. Such sources may include, for example, from combustion of one or more hydrocarbons; emissions from the combustion of natural gas, coal, oil, petcoke, gasoline, diesel, biofuel, or municipal waste; emissions from waste water treatment gases, or landfill gases, from air, from metal production/refining, from the production of Iron, Steel, Aluminum or Zinc, from cement production, from quicklime production, from Glass production, oil and gas refineries, steam reforming, hydrogen production, HVAC, refrigeration, transportation vehicles (ships, boats, cars, buses, trains, trucks, airplanes), natural gas, biogas, alcohol fermentation, volcanic activity, decomposing leaves/biomass, septic tank, respiration, manufacturing facilities, fertilizer production, geothermal wells, and combinations thereof.

The amounts of gas to be captured or concentrated or removed from one or more sources will vary. Typically, it is desired to capture at least about any of the following percentages (%) from the total $CO_2$ in the source: 40, or 50, or 60, or 70, or 80, or 90, or substantially 100.

The one or more gases may be captured from any convenient source using any convenient manner. If desired, the input gas stream or streams may be treated, e.g., scrubbed, before being subjected to the one or more absorption solutions and/or forming a gas-rich, such as $CO_2$— rich, solution. Such treating methods may be particularly advantageous if the source has impurities that may deleteriously affect subsequent processing steps. Such impurities include, but are not limited to, NOx, SOx, oils, particulate matter, heavy metals, and heavy compounds, etc. Conventional treating methods may be employed for this purpose.

The amounts of $CO_2$ to be desorbed will vary. Typically, it is desired to desorb at least about any of the following percentages (%) from the total $CO_2$ in the source: 40, or 50, or 60, or 70, or 80, or 90, or substantially 100%.

The soluble substance employed may vary depending upon, for example, whether it is to be at least partially recovered, and, if so, in what manner. By "at least partially recovered" it is meant from at least about 50%, or at least about 60%, or at least about 70%, or at least about 80%, or at least about 90%, or at least about 95%, or at least about 99% up to 100% of the soluble solvent is recovered for re-use in the process or something else.

For example, the separation mechanism used for at least partially recovering the soluble substance may include one or more or a combination of the following: membrane, reverse osmosis, hot reverse osmosis, nanofiltration, organic solvent nanofiltration, hot nanofiltration, ultrafiltration, hot ultrafiltration, microfiltration, filtration, distillation, membrane distillation, multi-effect distillation, mechanical vapor compression distillation, binary distillation, azeotrope distillation, hybrid separation devices, flash distillation, multi-stage flash distillation, extractive distillation, switchable solvent, LCST phase change, UCST phase change, 'salting-out,' or centrifuge, or combinations thereof.

The soluble substance may be at least partially recovered by employing a membrane that is, for example, capable of at least partially rejecting said soluble substance while allowing substantial passage of $CO_2$ or containing aqueous solution or vice versa. "$CO_2$ containing solution" or "$CO_2$ containing aqueous solution" simply refers to the subsequently obtained solution after desorbing of $CO_2$. Thus, $CO_2$ containing aqueous solution or $CO_2$ containing solution may have various amounts of $CO_2$ or even no $CO_2$ depending upon the amount of $CO_2$ desorbed in the desorbing step. This subsequently obtained solution typically comprises the solution components less any $CO_2$ desorbed while any soluble substance is at least partially recovered by virtue of being rejected by the membrane.

Soluble substance may comprise, for example, water, organic solvent, water soluble polymer, soluble polymer, glycol, polyethylene glycol, polypropylene glycol, ethers, glycol ethers, glycol ether esters, triglyme, polyethylene glycols of multiple geometries, including, branched polyethylene glycols, star polyethylene glycols, comb polyethylene glycols, methoxypolyethylene glycol, polyvinyl alcohol, polyvinylpyrrolidone, polyacrylic Acid, diol polymers, 1,2 propanediol, 1,2 ethanediol, 1,3 propanediol, cellulose ethers, methylcellulose, cellosize, carboxymethylcellulose, hydroxyethylcellulose, sugar alcohol, sugars, alcohols, ketones, aldehydes, esters, organosilicon compounds, halogenated solvents, non-volatile solvents, a substance with a vapor pressure less than 0.01 atm at 20° C., soluble substances with a molecular weight greater than 80 daltons, or mixtures thereof.

Useful membranes for at least partial recovery may include, for example, any membrane capable of at least partially rejecting said soluble substance while allowing substantial passage of $CO_2$ containing solution or gas containing solution or vice versa. Such membranes may comprise a membrane selected from the group consisting of Reverse Osmosis, Nanofiltration, Organic Solvent Nanofiltration, Ultrafiltration, Microfiltration, and Filtration membranes. In some embodiments the membrane may have a molecular weight cutoff of greater than about 80 daltons. That is, the membrane allows passage of a substantial or majority amount of components with a molecular weight of less than about 80 daltons while rejecting a substantial or majority amount of components with a molecular weight of greater than about 80 daltons up to about 600 daltons. In the art, another definition of molecular weight cut-off may refer to the lowest molecular weight solute (in daltons) in which 90% of the solute is retained by the membrane, or the molecular weight of the molecule that is 90% retained by the membrane. Membranes with a molecular weight cutoff of less than 1,000 daltons, or less than 10,000 daltons, or less than 50,000 daltons, or less than 100,000 daltons, or less than 200,000 daltons, or less than 500,000 daltons, or less than 1,000,000 daltons may also be useful depending upon the circumstances and components employed.

The membrane may be comprised of any useful material and such useful material may vary depending upon the components to be separated, their molecular weight, viscosity, and/or other properties. Useful membranes may include, for example, membranes comprised of a material selected from a thin film composite; a polyamide; a cellulose acetate; a ceramic membrane; other materials and combinations thereof.

Generally, it may be preferred to select membranes, substances, and conditions such that any at least partial recovery step(s) involving one or more membranes may be conducted at a temperature of less than or equal to about 50, or less than or equal to 40, or less than or equal to about 35, or less than or equal to about 30° C. In other specific embodiments the at least partial recovery step(s) temperature may be at a temperature of from about 18° C. to about 32° C. Similarly, the pressure employed during any at least partial recovery may be any convenient pressure, e.g., elevated, reduced, or substantially atmospheric.

One or more substances may comprise, for example, one or more or a combination of the following: volatile organic solvents, soluble substances with a molecular weight less than 600 daltons, soluble substances with a molecular weight less than 200 daltons, dimethoxymethane, acetone, acetaldehyde, methanol, dimethyl ether, THF, ethanol, isopropanol, propanal, methyl formate, azeotropes, alcohols, ketones, aldehydes, esters, organosilicon compounds, halogenated solvents, a substance with a vapor pressure greater than 0.01 atm at 20° C., or a mixture thereof.

The integrated process wherein $CO_2$ volatilizes may occur in the presence of a low $CO_2$ partial pressure gas, in the presence of air, with the application of heat, or a combination thereof.

In some embodiments the soluble substance may comprise a thermally switchable substance, a $CO_2$ switchable substance, or a non-ionic carbon containing compound. A switchable substance is one which substantially separates from other materials depending upon, for example, a property or other ingredients of a combined composition. That is, a thermally switchable substance may form one or more separate liquid phases or precipitate from a given solution or a combination thereof when subjected to temperatures above or below a certain threshold, e.g., cloud point.

The concentration of the soluble substance(s) and any $CO_2$ absorbent employed in the integrated process may vary depending upon the substance, other substances, and desired results. Typically, each may have a concentration of from about 1 M to about 18 M. That is, the concentration of each may be independent or dependent of the other and be, for example, greater The concentration of the soluble substance(s) and any $CO_2$ absorbent employed in the integrated process may vary depending upon the substance, other substances, and desired results. Typically, each may have a concentration of from about 1 M to about 18 M. That is, the concentration of each may be independent or dependent of the other and be, for example, greater or less than 1M, or less than 2M, or less than 3M, or less than 4M, or less than 5M, or less than 6M or less than 10M up to as high as 18M.

The absorption column may absorb less than or equal to any of the following: 5%, or 10% or 20%, or 30%, or 40%, or 50%, or 60%, or 70%, or 80% or 90%, or 99%, or 99.9%, or 100% of one or more gases from the one or more gas streams.

The absorption stage may include any absorption setup known in the art and may be composed of one or more absorption columns or vessels or other devices. The absorption column may include, but is not limited to, continuous absorption, continuous stirred absorption, batch column, packed column, plate column, hybrid absorption processes and other absorption processes known in the art. The absorption column or absorption solution may be chilled, wherein cooling may be conducted via any means including, but not limited to, ambient source, water bodies, cooling tower, industrial evaporative chiller and other chilling or cooling processes known in the art. It may be desirable for the $CO_2$ concentration in the $CO_2$ lean solution to be less than the $CO_2$ concentration in the $CO_2$ rich solution. A $CO_2$(g) containing gas stream, including but not limited to flue gas, synthesis gas, steam-reforming gas, methane reforming gas, hydrogen production gases, air, concentrated, membrane concentrated gas stream, membrane concentrated flue gas, upstaged air (as would be created from the moisture swing $CO_2$ upstaging processes described by Klaus Lackner http://pubs.acs.org/doi/abs/10.1021/es201180v, incorporated herein by reference), biogas, landfill gas, or anaerobic digester gas. The $CO_2$ containing gas stream may be treated, used as an enthalpy, heat or cold source, or otherwise used prior to the absorption stage.

The remaining gas stream after at least a portion of $CO_2$(g) or other gas is absorbed, or 'inert gases' may undergo further treatment or utilization, including but not limited to, thermal or other exchange with incoming $CO_2$ lean solution, water wash to remove trace gases, such as ammonia or organic solvent, removal process for trace gases, additional $CO_2$ scrubbing method, including, but not limited to, amines, solid sorbent, SELEXOL, UCARSOL, membrane or strong base, separation, purification, or use of constituents, such as hydrogen, carbon monoxide, nitrogen, oxygen and/or argon.

water, ammonia, ammonium amine, primary amine, secondary amine, tertiary amine, methylamine (MEA), methylethanolamine, aminoethylethanolamine, azine, imine, strong base, hydroxide, sodium hydroxide, potassium hydroxide, sodium oxide, potassium oxide, organic solvent, commercial $CO_2$ capture absorbents, quaternary ammonium compound, Selexol, Rectisol, KS-1, UCARSOL, metal—organic framework, solid adsorbent, high surface area compounds, activated carbon, zeolites, carbon nanotubes, graphene, graphene oxide, amine, amino ethyl ethanol amine, 2-Amino-2-methylpropan-1-ol (AMP), MDEA, MEA, primary amine, secondary amine, or tertiary amine, low molecular weight primary or secondary amine, metal-ammine complex, metal-ammonia complex, metal-ammonium complex, sterically hindered amine, imines, azines, piperazine, amine functionalized polymers, alkali metal, lithium, sodium, potassium, rubidium, caesium, alkaline earth metal, calcium, magnesium, cations, ionic liquid, $CO_2$ switchable solvents, $CO_2$ switchable surfactants carbonate, polymer containing amine functional groups, poler containing $CO_2$ reactive functional groups, enzymes, metal—organic frameworks, glycolamine, diglycolamine, quaternary ammonia or quaternary ammonium cations, or quaternary ammonium cations embedded in polymer, or mixtures thereof.

piperazine, diethanolamine, diglycolamine, and diisopropanolamine residence time, added substance type or types, soluble substance concentration in the mixed $CO_2$ desorption solution, concentration of the soluble substance in the added substance solution, temperature, application of heating or cooling, $CO_2$ loading in the $CO_2$ rich solution, pressure, or $CO_2$ loading in the in the added substance solution.

Small concentrations of soluble substance may persist or be present in the $CO_2$ absorption solution. Low concentrations of soluble substances, such as organic solvents, may reduce ammonia slip or other $CO_2$ absorbent volatilization in the absorption column and reduce energy consumption during regeneration. Additionally, low concentrations of soluble substances, such as organic solvents, may increase $CO_2$ uptake and inhibit unintended $CO_2$ volatilization. The maximum said low concentration is dependent on the type of substance and includes, but is not limited to, vol/vol % concentrations of less than any of the following: 0.001%, or 0.1%, or 0.5%, or 1%, or 1.5%, or 2%, or 2.5%, or 3%, or 3.5%, or 4%, or 4.5%, or 5%, or 5.5%, or 6%, or 6.5%, or 7%, or 7.5%, or 8%, or 8.5%, or 9%, or 9.5%, or 10%, or 10.5%, or 11%, or 11.5%, or 12%, or 12.5%, or 13%, or 13.5%, or 14%, or 14.5%, or 15%, or 20%, or 30%, or 40%, or 50%, or 60%, or 70%, or 80%, or 90%, or 100%.

Carbon Dioxide Sources: Any process or resource producing or containing carbon dioxide. Examples of $CO_2$ sources include, but are not limited to, the following: Power Plant (Natural gas, coal, oil, petcoke, biofuel, municipal waste), Waste Water Treatment, Landfill gas, Air, Metal production/refining (such as Iron, Steel, Aluminum, etc.), Glass production, Oil refineries, HVAC, Transportation vehicles (ships, boats, cars, buses, trains, trucks, airplanes), Natural Gas, Biogas, Alcohol fermentation, Volcanic Activity, Decomposing leaves/biomass, Septic tank, Respiration, Manufacturing facilities, Fertilizer production, or Geothermal processes where $CO_2$(g) releases from a well or wells.

One or more embodiments may be aqueous or non-aqueous. Media include, for example, polar organic solvents, including, but not limited to, ethylene carbonate, propylene carbonate, ethylene glycol, propylene glycol, DMSO, water and acetonitrile or inorganic solvents, such as liquid ammonia or liquid amines and mixtures thereof. The non-aqueous system may use a solution media containing of one or more $CO_2$ absorbents, such as ammonia, ammonium, amines or amine functionalized polymers.

concentration may be as a low as 0.000001 M or as great as pure absorbent. In molarity terms, the concentration of the $CO_2$ absorbent may be as low as 0.00001M or less than any of the following: 0.01 M, or 0.05M, or 0.1M, or 0.3M, or 0.5M, or 0.8 M, or 1M, or 1.3M, or 1.5M, or 1.8M, or 2M, or 2.3M, or 2.5M, or 2.8M, or 3M, or 3.3M, or 3.5M, or 3.8M, or 4M, or 5M, or 6M, or 7M, or 8M, or 9M, or 10M, or 12M, or 15M, or 18M, or even pure absorbent.

concentration may be as a low as 0.000001 M or as great as pure absorbent. In molarity terms, the concentration of the $CO_2$ absorbent may be as low as 0.00001M or less than any of the following: 0.01 M, or 0.05M, or 0.1M, or 0.3M, or 0.5M, or 0.8 M, or 1M, or 1.3M, or 1.5M, or 1.8M, or 2M, or 2.3M, or 2.5M, or 2.8M, or 3M, or 3.3M, or 3.5M, or 3.8M, or 4M, or 5M, or 6M, or 7M, or 8M, or 9M, or 10M, or 12M, or 15M, or 18M, or even pure liquid phase.

concentration may be as a low as 0.000001 M or as great as pure absorbent. In molarity terms, the concentration of the $CO_2$ absorbent may be as low as 0.00001M or less than any of the following: 0.01 M, or 0.05M, or 0.1M, or 0.3M, or 0.5M, or 0.8 M, or 1M, or 1.3M, or 1.5M, or 1.8M, or 2M, or 2.3M, or 2.5M, or 2.8M, or 3M, or 3.3M, or 3.5M, or 3.8M, or 4M, or 5M, or 6M, or 7M, or 8M, or 9M, or 1GM, or 12M, or 15M, or 18M, or even pure reagent.

concentration may be as a low as 0.000001 M or as great as pure absorbent. In molarity terms, the concentration of the $CO_2$ absorbent may be as low as 0.00001M or less than any of the following: 0.01 M, or 0.05M, or 0.1M, or 0.3M, or 0.5M, or 0.8 M, or 1M, or 1.3M, or 1.5M, or 1.8M, or 2M, or 2.3M, or 2.5M, or 2.8M, or 3M, or 3.3M, or 3.5M, or 3.8M, or 4M, or 5M, or 6M, or 7M, or 8M, or 9M, or 1GM, or 12M, or 15M, or 18M, or even pure antisolvent.

The soluble substance may be preheated or cooled before injection into the mixing apparatus. The mixing apparatuses and methods include, but are not limited to, batch mixers, continuous stirred-tank reactors, CSTRs, distillation column, packed column, electrospray, spray column, counter-current spray column, and/or other apparatuses and/or methods. The apparatus may be heated using waste heat or other heat source for, including, but not limited to, promoting gas desorption, promoting gas desorption, reducing viscosity and/or increasing the rate of solvent mixing.

The one or more gases, such as $CO_2$, may pressurize, by any means, including but not limited to, closing and opening a release valve to allow the system to pressurize, utilizing a smaller gas release valve, temperature change, or using external compression. In the case where the $CO_2$(g) is desorbed at a pressure greater than atmospheric pressure, less energy may be required for compression of this $CO_2$(g), if compression is desired. The exiting gas stream may contain predominantly $CO_2$. At least a portion of this desorbed $CO_2$ may be used for, including, but not limited to, one or more or a combination of the following: enhanced oil recovery, methanol production, syngas production, fuel production, urea production, fertilizer production, carbonate, bicarbonate production, carbamate production, beverage production, greenhouse, agricultural applications, welding gas, turbine working fluid, laser gas, food production, inert gas, cement production, $CO_2$ conversion processes, and other existing and future applications. This gas stream may be further treated by, including, but not limited to, water wash down, aqueous wash down, non-aqueous wash down, changes in pressure, changes in temperature, compression, vacuum, and an additional carbon capture process. Additives may be added to this gas stream prior, during or after treatment or in the absence of treatment. These additives include, but are not limited to, ammonia, electricity, light, hydrogen, amine, oxygen, methane, methanol, carbon monoxide, hydrogen sulfide, haloalkanes, chlormethane, dimethylether, hydrogen cyanide, sulfur, acid or acid gas, hydroxide, oxide, carbonate, carbamate, and bicarbonate.

Reagents or substances may include, but is not limited to, one or more or a combination of the following: organic solvents, concentrated soluble substance solutions, water soluble polymers, combinations of soluble substances, solvent mixtures, emulsions, pure substance, pure solvent, aqueous solvent, surfactant containing solvents, zwitterions, solids, soluble solids, gases, liquid-solid mixtures, soluble gases, aerosols, suspended solids, solid-gas mixtures, super critical fluids, and fluid mixtures.

Application of Heating or Cooling: Heating or cooling may be incorporated throughout the integrated process.

In water, Polyethylene glycols (PEGs) and polypropylene glycols (PPGs), for example, have higher Gibbs free energy of mixing and osmotic pressure at lower temperatures.

Concentrated solution of the soluble substance, including, but not limited to, physical solvent, antisolvent, combined solution, one or more liquid phases, concentrate, permeate, or combination thereof may contain a vol/vol % concentration of soluble substance as low as 0.0001% to as great as 99.99999%. Vol/vol % concentrations of the soluble substance or concentrated soluble substance solution may be practically greater than any of the following: 1%, or 5%, or 10%, or 11%, or 12%, or 13%, or 14%, 15%, or 16%, or 17%, or 18%, or 19%, or 20%, or 21%, or 22%, or 23%, or 24%, or 25%, or 26%, or 27%, or 28%, or 29%, or 30%, or 31%, or 32%, or 33%, or 34%, or 35%, or 36%, or 37%, or 38%, or 39%, or 40%, or 41%, or 42%, or 43%, or 44%, or 45%, or 46%, or 47%, or 48%, or 49%, or 50%, or 51%, or 52%, or 53%, or 54%, or 55%, or 56%, or 57%, or 58%, or 59%, or 60%, or 65%, or 70%, or 75%, or 80%, or 85%, or 90%, or 95%, or less than or equal to 100%.

The resulting concentration of the soluble substance in one or more gas desorption may be a mass % concentration of soluble substance as low as 0.0001% to as great as 99.99999%. Mass % concentrations of the soluble substance in the one or more desorption steps, absorption steps, or resulting mixed solution may be practically greater than any of the following: 0.0001, 0.1%, or 1%, or 2%, or 3%, or 4%, or 5%, or 5.5%, or 6%, or 6.5%, or 7%, or 7.5%, or 8%, or 8.5%, or 9%, or 9.5%, or 10%, or 10.5%, or 11%, or 11.5%, or 12%, or 12.5%, or 13%, or 13.5%, or 14%, or 14.5%, or 15%, or 15.5%, or 16%, or 16.5%, or 17%, or 17.5% or 18%, or 18.5%, or 19%, or 19.5%, or 20%, or 20.5%, or 21%, or 21.5%, or 22%, or 22.5%, or 23%, or 23.5% or 24%, or 24.5%, or 25%, or 25.5%, or 26%, or 26.5%, or 27%, or 27.5%, or 28%, or 28.5%, or 29%, or 29.5%, or 30%, or 31%, or 32%, or 33%, or 34%, or 35%, or 36%, or 37%, or 38%, or 39%, or 40%, or 41%, or 42%, or 43%, or 44%, or 45%, or 46%, or 47%, or 48%, or 49%, or 50%, or 51%, or 52%, or 53%, or 54%, or 55%, or 56%, or 57%, or 58%, or 59%, or 60%, or 65%, or 70%, or 75%, or 80%, or 85%, or 90%, or 95%, or less than 99%, or less than 100% or 100%.

Mass % solubility of one or more substances may be practically greater than any of the following: insoluble, 0.001%, 0.01%, 0.1%, or 1%, or 2%, or 3%, or 4%, or 5%, or 6%, or 7%, or 8%, or 9%, or 10%, or 11%, or 12%, or 13%, or 14%, or 15%, or 16%, or 17%, or 18%, or 19%, or 20%, or 21%, or 22%, or 23%, or 24%, or 25%, or 26%, or 27%, or 28%, or 29%, or 30%, or 31%, or 32%, or 33%, or 34%, or 35%, or 36%, or 37%, or 38%, or 39%, or 40%, or 41%, or 42%, or 43%, or 44%, or 45%, or 46%, or 47%, or 48%, or 49%, or 50%, or 51%, or 52%, or 53%, or 54%, or 55%, or 56%, or 57%, or 58%, or 59%, or 60%, or 61%, or 62%, or 63%, or 64%, or 65%, or 66%, or 67%, or 68%, or 69%, or 70%, or 71%, or 72%, or 73%, or 74%, or 75%, or 76%, or 77%, or 78%, or 79%, or 80%, or 81%, or 82%, or 83%, or 84%, or 85%, or 86%, or 87%, or 88%, or 89%, or 90%, or 90.5%, or 91%, or 91.5%, or 92%, or 92.5%, or 93%, or 93.5%, or 94%, or 94.5%, or 95%, or 95.5%, or 96%, or 96.5%, or 97%, or 97.5%, or 98%, or 98.5%, or 99%, or 99.5%, or 99.9%, or 100%, or completely miscible.

The desorbed gas concentration range may be as low as 0.0001% to as great as 99.99999%. The purity or concentration of the desorbed gas may be as low as any of the following: 0.1% or greater than 0.1%, or 1%, or 2%, or 3%, or 4%, or 5%, or 6%, or 7%, or 8%, or 9%, or 10%, or 11%, or 12%, or 13%, or 14%, or 15%, or 16%, or 17%, or 18%, or 19%, or 20%, or 21 %, or 22%, or 23%, or 24%, or 25%, or 26%, or 27%, or 28%, or 29%, or 30%, or 31%, or 32%, or 33%, or 34%, or 35%, or 36%, or 37%, or 38%, or 39%, or 40%, or 41%, or 42%, or 43%, or 44%, or 45%, or 46%, or 47%, or 48%, or 49%, or 50%, or 51%, or 52%, or 53%, or 54%, or 55%, or 56%, or 57%, or 58%, or 59%, or 60%, or 61%, or 62%, or 63%, or 64%, or 65%, or 66%, or 67%, or 68%, or 69%, or 70%, or 71%, or 72%, or 73%, or 74%, or 75%, or 76%, or 77%, or 78%, or 79%, or 80%, or 81%, or 82%, or 83%, or 84%, or 85%, or 86%, or 87%, or 88%, or 89%, or 90%, or 90.5%, or 91%, or 91.5%, or 92%, or 92.5%, or 93%, or 93.5%, or 94%, or 94.5%, or 95%, or 95.5%, or 96%, or 96.5%, or 97%, or 97.5%, or 98%, or 98.5%, or 99%, or 99.5%, or 99.9%, or less than or equal to 100%.

Liquid $CO_2$, supercritical $CO_2$, or solid $CO_2$

The gas partial pressure range may be as low as 0.001 atm to as great as 100,000 atm. The partial pressure of one or more gases may be as low as, including, but not limited to, any of the following: 0.00001 atm, or 0.01 atm, or greater than or less than 0.05 atm, or 0.1 atm, or 0.2 atm, or 0.3 atm, or 0.4 atm, or 0.5 atm or 0.6 atm, or 0.7 atm, or 0.8 atm, or 0.9 atm, or 1 atm, or 1.1 atm, or 1.2 atm, or 1.3 atm, or 1.4 atm, or 1.5 atm, or 1.6 atm, or 1.7 atm, or 1.8 atm, or 1.9 atm, or 2 atm, or 2.1 atm, or 2.2 atm, or 2.3 atm, or 2.4 atm, or 2.5 atm, or 2.6 atm, or 2.7 atm, or 2.8 atm, or 2.9 atm, or 3 atm, or 3.5 atm, or 4 atm, or 4.5 atm, or 5 atm, or 5.5 atm, or 6 atm, or 6.5 atm, or 7 atm, or 7.5 atm, or 8 atm, or 8.5 atm, or 9 atm, or 9.5 atm, or 10 atm, or 12 atm, or 15 atm, or 18 atm, or 20 atm, or 22 atm, or 25 atm, or 28 atm, or 30 atm, or 40 atm, or 50 atm, or 60 atm, or 75 atm, or 100 atm, or 150 atm, or 200 atm, or 500 atm, or 1,000 atm, or 10,000 atm, or 100,000 atm, or less than 1,000,000 atm.

The purity or concentration of the desorbed gas or gases or final gas or gases produced may be dependent on the application. The setup may contain other gases than said desorbed gas or gases. The other gas or gases present in with this desorbed gas or gases may be dependent on the application. For example, if the $CO_2$ will be mixed with hydrogen (such as at about a 2:1 or 3:1 ratio) to produce $CO_2$ derived chemicals, hydrogen may be added as a headspace gas during $CO_2$ desorption. This example may reduce $CO_2$ capture energy requirements, including, but not limited to, due to the requirement of a lower partial pressure of $CO_2(g)$ desorbed and lower final solvent concentration required.

System conditions may include, but are not limited to, one or more or a combination of the following: temperature, pressure, light, sound, vibration, radiation, electromagnetic radiation, magnetism, acid gas concentration, basic gas concentration, dissolved gas concentration, presence one or more other reagents, lack of presence of one or more reagents, change in reagent concentration, the presence of one or more stimulants, the lack of presence or reduced presence of one or more stimulants Separation devices and mechanisms include, but are not limited to, one or more or a combination of the following: coalescer, switchable solvent, cyclone, semi-permeable membrane, nanofiltration, organic solvent nanofiltration, reverse osmosis, ultrafiltration, microfiltration, hot nanofiltration, hot ultrafiltration, distillation, membrane distillation, flash distillation, multi-effect distillation, mechanical vapor compression distillation, hybrid systems, thermally switchable solvent, centrifuge, or filter or combinations thereof.

The power source of one or more pumps may include, but is not limited to, one or more or a combination of the following: electricity, pressure exchanger, turbocharger, hydraulic pressure, heat, pressure retarded osmosis, or forward osmosis.

Following the membrane or filter based separation, energy can be recovered by both or either the permeate (the absorption solution) and the concentrate (the soluble substance containing solution). These energy recovery devices are known in the art and include, but are not limited to, pressure exchangers and turbochargers.

Any portion of the process may be heated or cooled. Heat sources may include, but are not limited to, waste heat, power plant waste heat, steam, heat, pump or compressor waste heat, industrial process waste heat, steel waste heat, metal refining and production waste heat, paper mill waste heat, cement production waste heat, calcination waste heat, factory waste heat, petroleum refining waste heat, solar heat, solar pond, air conditioner waste heat, combustion heat, geothermal heat, ocean or water body thermal heat, stored heat, and $CO_2(g)$ absorption solution heat. Temperatures of heating or cooling for any of the embodiments disclosed include, but are not limited to, less than any of the following: −20° C., or −10° C., or 0° C., or 10° C., or 20° C., or 25° C., or 30° C., or 35° C., or 40° C., or 41.5° C., or 41.5° C., or 41.5° C.–60° C., or 45° C., or 50° C., or 55° C., or 60° C., or 60-100° C., or 110° C., or 150° C.

Relatively lower molecular weight solvents may be employed if advantageous, including, but not limited to, polyethylene glycols 150-2000, polypropylene glycols 425-4000 and glycol ethers, such as triglyme.

1) exhibit lower viscosity, 2) higher solubility, 3) less prone to degradation, 4) less expensive, 5) lower concentration polarization, 6) higher mole fraction per given vol/vol %, 7) greater Gibbs free energy of mixing and 8) greater influence on dielectric constant, 9) lower osmotic pressure, 10) greater reduction of osmotic pressure with heat, 11) allow for the use of a larger pore size membrane or filter, 12) allow for the use of a higher permeability membrane, 13) may possess an LCST or UCST phase change with temperature or 14) may decrease in solubility with changes in temperature.

One or more embodiments may be constructed and transported in smaller scale modules or as a unit, such as in shipping containers and transported and used in other locations.

capture carbon dioxide in remote locations, in applications including, but not limited to, oil and gas production, cement production, mining and air $CO_2$ capture. One or more embodiments may also be constructed as stationary unit or units One or more embodiments may employ a reverse osmosis membrane with a low molecular weight cut-off, including but not limited to, less than any of the following: 250 da, or 200 da, or 150 da, or 125 da, or 100 da, or 95 da, or 90 da, or 85 da, or 80 da, or 75 da Multicomponent separation devices or multistage separation devices may be employed. Said device or devices may include, but are not limited to, one or more or a combination of the following: binary distillation, azeotrope distillation, membrane distillation, mechanical vapor compression, hybrid systems, flash distillation, multistage flash distillation, multieffect distillation, extractive distillation, switchable solvent, reverse osmosis, nanofiltration, organic solvent nanofiltration, ultrafiltration, and microfiltration. For example, such a hybrid system may involve at least partially recovering the soluble substance using nanofiltration and then further concentrating the soluble substance using membrane distillation. Another example of such a hybrid system may be a process wherein a switchable solvent 'switches' out of solution due to the presence of a stimulant, such as a change in temperature, then nanofiltration is employed to further concentrate the switchable solvent or remove remaining switchable solvent in other solution. The switchable solvent or other substance dissolved in solution may be further recovered or concentrated or even removed from the one or more layers or separate solutions that are formed.

Applied Pressure or Osmotic Pressure of Solution: The osmotic pressure range of the resulting water soluble substance solution may be as low as 0.001 atm to as great as 1,000,000 atm. The osmotic pressure may be as low as less than any of the following: 0.001 atm, or 0.01 atm, or greater than or less than 0.05 atm, or 0.1 atm, or 0.2 atm, or 0.3 atm, or 0.4 atm, or 0.5 atm or 0.6 atm, or 0.7 atm, or 0.8 atm, or 0.9 atm, or 1 atm, or 1.1 atm, or 1.2 atm, or 1.3 atm, or 1.4 atm, or 1.5 atm, or 1.6 atm, or 1.7 atm, or 1.8 atm, or 1.9 atm, or 2 atm, or 2.1 atm, or 2.2 atm, or 2.3 atm, or 2.4 atm, or 2.5 atm, or 2.6 atm, or 2.7 atm, or 2.8 atm, or 2.9 atm, or 3 atm, or 3.5 atm, or 4 atm, or 4.5 atm, or 5 atm, or 5.5 atm, or 6 atm, or 6.5 atm, or 7 atm, or 7.5 atm, or 8 atm, or 8.5 atm, or 9 atm, or 9.5 atm, or 10 atm, or 12 atm, or 15 atm, or 18 atm, or 20 atm, or 22 atm, or 25 atm, or 28 atm, or 30 atm, or 35 atm, or 40 atm, or 45 atm, or 50 atm, or 55 atm, or 60 atm, or 65 atm, or 70 atm, or 75 atm, or 80 atm, or 85 atm, or 90 atm, or 95 atm, or 100 atm, or 150 atm, or 200 atm, or 500 atm, or 1,000 atm, or 10,000 atm, or 100,000 atm, or less than 1,000,000 atm, or pure solvent.

Using waste heat or chilling to accelerate or foster gas desorption and other hybrid waste heat and membrane recovery process combinations Solid precipitation and dissolution may occur throughout the process, including, but not limited to, due to changes in concentrations, concentrations, dissolved gas concentrations, pressures, temperature, other system conditions, or combinations thereof.

The particular mechanism used to separate one or more solutions may include, but is not limited to, one or more or a combination of the following: binary distillation, azeotrope distillation, mechanical vapor compression, membrane distillation, hybrid systems, flash distillation, multistage flash distillation, multieffect distillation, extractive distillation, switchable solvent, reverse osmosis, nanofiltration, organic solvent nanofiltration, ultrafiltration, and microfiltration one or more separation techniques, including, but not limited to, one or more or a combination of the following: filtration, centrifuge, decanting, distillation, magnetism, and/or membrane based process, such as reverse osmosis, osmotically assisted reverse osmosis, disc tube reverse osmosis (DTRO), high pressure reverse osmosis, forward osmosis, electrodialysis, nanofiltration, organic solvent nanofiltration ultrafiltration, membrane distillation, integrated electric-field nanofiltration, hot nanofiltration, or hot ultrafiltration random or sequential copolymers of low molecular weight diols such as 1,2 propanediol, 1,2 ethanediol, and/or 1,3 propanediol.

Thermally responsive compounds include, but are not limited to, Lower Critical Solution Temperature (LCST) and Upper Critical Solution Temperature (UCST) compounds, thermosensitive magnetic nanoparticles, thermally responsive polyelectrolytes and thermally responsive ionic liquids.

LCST compounds are soluble or have a higher solubility below a certain threshold temperature, the lower critical solution temperature. For example, thermosensitive poly(N isopropylacrylamide) (PNIPAM) hydrogels can absorb water below the volume phase transition temperature (VPTT, ~32C) and expel water at temperatures above the VPTT. Other examples of these hydrogel substances include polyacrylamide (PAM), PNIPAM, and poly(Nisopropylacrylamide-co-acrylic acid) and sodium (P(NIPAM-co-SA)). Non-hydrogel LCST compounds include, but are not limited to, Methylcellulose and triethylamine.

Examples of thermosensitive magnetic nanoparticles include, but are not limited to those described in the following article http://pubs.rsc.org/en/content/articlelanding/2011/cc/c1cc13944d #!divAbstract which is incorporated herein by reference. These nanoparticles are typically hydrophilic and are coated with various functional groups to allow them to generate osmotic pressure in solution.

Substances showing magnetic field based change in solubility or other form of recovery via changes in magnetic field may be useful. These include, but are not limited to, magnetic nanoparticles with added functional groups (such as those described in http://pubs.acs.org/doi/abs/10.1021/ie100438x, incorporated herein by reference), and magnetic or inductive heating of nanoparticles in solution.

Substances that change solubility or other recovery method due to pressure or a combination of pressure and temperature may also be useful. These include, but are not limited to, PSA, polyacrylamide (PAM), PNIPAM, and poly(Nisopropylacrylamide-co-acrylic acid sodium (P(NIPAM-co-SA)) hydrogels.

Changes in solution kinetic energy can act as a stimulus to change or promote a change in the solubility or other form of recovery of an added substance. Kinetic energy can be of various forms, including, but not limited to, mixing and sonication. Ultrasonic sonication may either increase or decrease solubility and to promote precipitation and crystal nucleation. Ultrasonic sonication may be used to increase the rate of $CO_2$ desorption.

a soluble substance, a water soluble substance, an organic solvent, an organic substance, a soluble organic substance, a water soluble organic solvent, a soluble polymer, a water soluble organic substance, a substance containing carbon, a substance containing carbon and hydrogen, a substance containing carbon, hydrogen and oxygen, or a substance containing hydrogen and nitrogen, a non-ionic substance, a non-reactive substance, a non-ionic water soluble substance, non-reactive water soluble substance, inert soluble substance, inert water soluble substance, or inert substance.

Switchable Hydrophilicity (SHS), Switchable Polarity (SPS), Switchable Water (SW).

Examples of waste heat sources include, but are not limited to, the following: Power Plant (Natural gas, coal, oil, petcoke, biofuel, municipal waste), Condensing water, Flue Gas, Steam, Oil refineries, Metal production/refining (Iron, Steel, Aluminum, etc.), Glass production, Manufacturing facilities, Fertilizer production, Transportation vehicles (ships, boats, cars, buses, trains, trucks, airplanes), Waste Water Treatment, Solar thermal, Solar pond, Solar photovoltaic, Geothermal (Deep Well), Biofuel powered vehicles, Biofuel/Biomass/Municipal Waste Power Plants, Desulfurization, Alcohol production, hydrogen sulfide treatment, acid (e.g. sulfuric) production, Renewable fertilizer production, Ocean Thermal, Space heating, Grey water, Diurnal temperature variation, Geothermal (Shallow well/loop), or respiration.

Heat or cooling may be applied at any point of one or more embodiments

Heat exchangers and recovery devices may be employed where advantageous.

nitrogen, oxygen, hydrogen, argon, methane, carbon monoxide, volatile hydrocarbons, such as ethane, butane, propane.

- Mixing devices, include, but are not limited to, on or more or a combination of the following:
  - CSTR, Batch, Semibatch, or flash devices
  - Turbine
    - Rushton Turbine
    - Smith Turbine
    - Helical Turbine
    - Bakker Turbine
  - Low shear mixer, High shear mixer, Dynamic mixer, Inline mixer, Static mixer, Turbulent flow mixer, No mixer, Close-clearance mixer, High shear disperser, Static mixers, Liquid whistles, Mix-Itometer, Impeller mixer, Liquid-Liquid mixing, Liquid-Solid mixing, Liquid-Gas mixing, Liquid-Gas-Solid mixing, Multiphase mixing, Radial Flow, Axial Flow, Flat or curved blade geometry Any portion of the process may be heated or cooled. Heat sources may include, but are not limited to, waste heat, power plant waste heat, steam, heat, pump or compressor waste heat, industrial process waste heat, steel waste heat, metal refining and production waste heat, paper mill waste heat, factory waste heat, petroleum refining waste heat, solar heat, solar pond, air conditioner waste heat, combustion heat, geothermal heat, ocean or water body thermal heat, stored heat, and $CO_2$(g) absorption solution heat.

may comprise, including, but not limited to, one or more or a combination of the following phases throughout the integrated process: liquid, solid, liquid-solid slurry, liquid-solid mixture, gas, two-phase solution, three-phase solution, two-layer solution, or supercritical Aqueous solution, Water soluble polymer, Soluble polymer, Glycol Polyethylene Glycol, Polypropylene Glycol Ethers, Glycol Ethers, Glycol ether esters, Triglyme. Polyethylene Glycols of multiple geometries, Methoxypolyethylene Glycol, Polyvinyl Alcohol Polyvinylpyrrolidone, Polyacrylic Acid, Diol polymers, 1,2 propanediol, 1,2 ethanediol, 1,3 propanediol, Cellulose Ethers, Methylcellulose, Cellosize, Carboxymethylcellulose, Hydroxyethylcellulose, Sugar Alcohol, Sugars, Alcohols Ketones, Aldehydes, Esters, Organosilicon compounds, Halogenated solvents Non-Volatile Substances:

- Poly(ethylene glycol) (PEG) and Poly(ethylene oxide) (PEO)
  - Heterobifunctional PEGs
    - Azide (—N3) Functionalized
    - Biotin Functionalized
    - Maleimide Functionalized
    - NHS Ester Functionalized
    - Thiol Functionalized
    - COOH Functionalized
    - Amine Functionalized
    - Hydroxyl Functionalized
    - Acrylate/Methacrylate Functionalized
  - Homobifunctional PEGs
  - Monofunctional PEGs
  - PEG Dendrimers and Multi-arm PEGs
    - PEG-core Dendrimers
    - Multi-arm PEGs
    - Multi-arm PEG Block Copolymers
  - PEG Copolymers
    - PEG Diblock Copolymers
    - PEG/PPG Triblock Copolymers
    - Biodegradable PEG Triblock Copolymers
    - Multi-arm PEG Block Copolymers
    - Random Copolymers
  - PEG and Oligo Ethylene Glycol
    - Examples: PEG 200, PEG 300, PEG 400, PEG 600, PEG 1000, PEG 1450, PEG 1500, PEG 2050, PEG 3350, PEG 8000, PEG 10000
  - Poly(ethylene oxide)
  - High Oligomer Purity PEG
  - Polyethylene glycol-polyvinyl alcohol (PEG-PVA)
- Polypropylene Glycol (PPG)
  - Examples: PPG 425-4000
- Poly(N-isopropylacrylamide) (PNIPAM) and Polyacrylamide (PAM)
  - PNIPAM Copolymers
  - Poly(N-isopropylacrylamide) (PNIPAM)
  - Polyacrylamide (PAM) and Copolymers
- Poly(2-oxazoline) and Polyethylenimine (PEI)
- Poly(acrylic acid), Polymethacrylate and Other Acrylic Polymers
- Poly(vinyl alcohol) (PVA) and Copolymers
  - Poly(vinyl alcohol) (PVA)
  - Poly(vinyl alcohol-co-ethylene) ethylene

- Poly(vinylpyrrolidone) (PVP) and Copolymers
- Polyelectrolytes
  - Poly(styrenesulfonate) (PSS) and Copolymers
  - Polyacrylamide (PAM)-based Polyelectrolytes
  - Poly(acrylic acid) (PAA), Sodium Salt
  - Poly(allylamine hydrochloride)
  - Poly(diallyldimethylammonium chloride) Solution
  - Poly(vinyl acid)
  - Miscellaneous—(1)
- Cucurbit[n]uril Hydrate
- Quaternary ammonium polymers
- Carboxypolymethylene (carbomer)
- Polyvinyl methyl ether-maleic anhydride (PVM-MA)
- Carboxypolymethylene (carboxyvinyl polymer)
- Polyvinyl methyl ether-maleic anhydride
- Carboxymethylcellulose
- Hydroxyethylcellulose and derivatives
- Methylcellulose and derivatives
- Other cellulose ethers
  - Ethylcellulose
  - Hydroxypropylcellulose
- Sodium carboxymethylcellulose
- Hydroxyethylcellulose and ethyl hydroxyethylcellulose
- Natural water-soluble polymers: Starches, Sugars, Polysaccharides, Agar, Alginates, Carrageenan, Furcellaran, Casein and caseinates, Gelatin, Guar gum and derivatives, Gum arabic, Locust bean gum, Pectin, *Cassia* gum, Fenugreek gum, *Psyllium* seed gum, Tamarind gum, Tara gum, Gum ghatti, Gum karaya, Gum tragacanth, Xanthan gum, Curdlan, Diutan gum, Gellan gum, Pullulan, Scleroglucan (*sclerotium* gum)

PEGs are available with different geometries, including, but not limited to, the following:

- Branched PEGs: have three to ten PEG chains emanating from a central core group.
- Star PEGs: have 10 to 100 PEG chains emanating from a central core group.
- Comb PEGs: have multiple PEG chains normally grafted onto a polymer backbone.

Substance Details for embodiments, including, but not limited to, one or more or a combination of the following:

- Soluble substance
- Soluble organic solvent
- Soluble polymer
- Water soluble substance
- Soluble substance separable with a membrane
- Water soluble substance separable with a membrane
- Water soluble organic solvent
- Water soluble polymer
- Organic solvent separable with a membrane
- Polymer separable with a membrane
- Soluble organic solvent separable with a membrane
- Soluble polymer separable with a membrane
- Large molecular weight water soluble organic solvent
- Small molecular weight water soluble polymer
- Non-volatile organic solvent
- Low volatility organic solvent
- High volatility organic solvent that is separable with a membrane
- Organic solvent with a molecular weight, including, but not limited to, greater than 100 da or any of the following: 125 da, or 150 da, or 175 da, or 200 da, or 225 da, or 250 da, or 275 da, or 300 da, or 325 da, or 350 da, or 375 da, or 400 da, or 425 da, or 450 da, or 475 da, or 500 da, or 525 da, or 550 da, or 575 da, or 600 da
- Polymer with a molecular weight, including, but not limited to, greater than 100 da or greater than any of the following: 125 da, or 150 da, or 175 da, or 200 da, or 225 da, or 250 da, or 275 da, or 300 da, or 325 da, or 350 da, or 375 da, or 400 da, or 425 da, or 450 da, or 475 da, or 500 da, or 525 da, or 550 da, or 575 da, or 600 da
- Substance with a molecular weight, including, but not limited to, greater than 100 da or greater than any of the following: 125 da, or 150 da, or 175 da, or 200 da, or 225 da, or 250 da, or 275 da, or 300 da, or 325 da, or 350 da, or 375 da, or 400 da, or 425 da, or 450 da, or 475 da, or 500 da, or 525 da, or 550 da, or 575 da, or 600 da
- Organic solvent with a hydration radius, including, but not limited to, greater than 100 da, or greater than any of the following: 125 da, or 150 da, or 175 da, or 200 da, or 225 da, or 250 da, or 275 da, or 300 da, or 325 da, or 350 da, or 375 da, or 400 da, or 425 da, or 450 da, or 475 da, or 500 da, or 525 da, or 550 da, or 575 da, or 600 da
- Polymer with a hydration radius, including, but not limited to, greater than 100 da, or greater than any of the following: 125 da, or 150 da, or 175 da, or 200 da, or 225 da, or 250 da, or 275 da, or 300 da, or 325 da, or 350 da, or 375 da, or 400 da, or 425 da, or 450 da, or 475 da, or 500 da, or 525 da, or 550 da, or 575 da, or 600 da
- Substance with a hydration radius, including, but not limited to, greater than 100 da, or greater than any of the following: 125 da, or 150 da, or 175 da, or 200 da, or 225 da, or 250 da, or 275 da, or 300 da, or 325 da, or 350 da, or 375 da, or 400 da, or 425 da, or 450 da, or 475 da, or 500 da, or 525 da, or 550 da, or 575 da, or 600 da

Water Removal from Air Embodiments

Water removal from gas streams is an essential component of the economy today. For example, in HVAC, water removal from air or dehumidification is essential for low relative humidity, which ensures comfort of building occupants and preventing the formation of mold. For example, in the oil & gas industry, separating water vapor from natural gas and biogas is an essential component of upgrading or processing natural gas for natural gas pipelines and other natural gas transport or natural gas use. For example, in air separation, water separation from air is essential for the operation of these processes. For example, in hydrogen production and ammonia production, water vapor separation from synthesis gas and/or hydrogen is essential for effective operations and preventing fouling of catalysts.

Additionally, water removal from air is a tremendous opportunity for providing clean, potable water to people and regions where potable water or freshwater resources are scarce or non-existent. Prior art technologies are very energy intensive. The US military (which is a user of water from air technologies in disaster relief missions) often refers to water separation from air technologies as exchanging oil for water. In prior art technologies, the general rule of thumb is a ratio of up to 5 gallons of water per gallon of fuel (e.g. diesel).

In prior art, technologies for separating water vapor from air into liquid water fall into two categories: 1) air cooling and water vapor condensation; or 2) water vapor absorption in absorbent or adsorbent and distillation of water from absorbent or adsorbent, also known as desiccant processes.

1) Prior art air cooling water generators involves the energy intensive process of cooling air below its dew point to condense water vapor from the air. Because water vapor generally comprises less than 4% of air, a significant mass of other non-water gases need to be cooled, resulting in a very significant parasitic energy loss relative to the amount of liquid water generated.

2) Prior art liquid desiccant water generators involve absorbing or adsorbing water in a desiccant at a low temperature, then heating the desiccant to release the water vapor at a high water vapor pressure, then condensing this water vapor. To release the water vapor from the desiccant, a very significant amount of energy is required. Not only does the thermal energy have to overcome the enthalpy of vaporization of the water, but it also must overcome the enthalpy of hydration of the desiccant, and heating to a temperature significantly greater than the boiling point of freshwater.

Although water removal from air feasible using prior art technologies, it is not a scalable or economical solution or environmentally friendly solution to water scarcity challenges due to its high energy intensity.

The present invention pertains to systems and methods for separating water vapor or other condensable vapors from gas streams.

Some embodiments of the present invention involve absorbing a vapor, such as water vapor, in a reagent which exhibits a LCST or UCST liquid-liquid phase transition in a solution comprising said reagent and chemical comprising said condensed reagent. For example, some embodiments of the present invention may involve absorbing water vapor from a gas stream in a water-lean reagent, wherein at some temperature range, said reagent may possess a LCST or UCST liquid-liquid phase transition. For example, some embodiments of the present invention may involve absorbing water vapor from a gas stream into a water-lean reagent at a relatively low temperature, forming a water-rich reagent, then heating said water-rich reagent to above its LCST temperature or LCST temperature range to form two or more liquid phases, wherein at least one liquid phase comprises mostly water and at least one liquid phase comprises mostly water-lean reagent. In some embodiments, it may be desirable for additional water (or other reagent) to be added to the condensable liquid—rich or water—rich reagent before or during liquid-liquid phase transition to, for example, facilitate said liquid-liquid phase transition. Said mostly water liquid phase may undergo further treatment to separate or recover residual 'reagent' and generate freshwater or nearly pure water or water with less or no contamination. Said further treatment may comprise, for example, a membrane-based process, such as reverse osmosis, nanofiltration, or ultrafiltration, or a combination thereof. The concentrate or retentate of said further treatment may be added to the 'water-rich reagent' before its liquid-liquid phase transition and may comprise additional water or aqueous solution which may facilitate a liquid-liquid phase transition. The permeate of said further treatment may comprise freshwater and may be used for various freshwater applications or undergo additional treatment.

Some embodiments of the present invention advantageously use significantly less energy than prior art technologies for separation of condensable vapors, such as water vapor, from gas streams. During the regeneration of the water-lean reagent form the water-rich reagent, the system undergoes a liquid-liquid phase transition, which is significantly less energy intensive.

Figure 12:
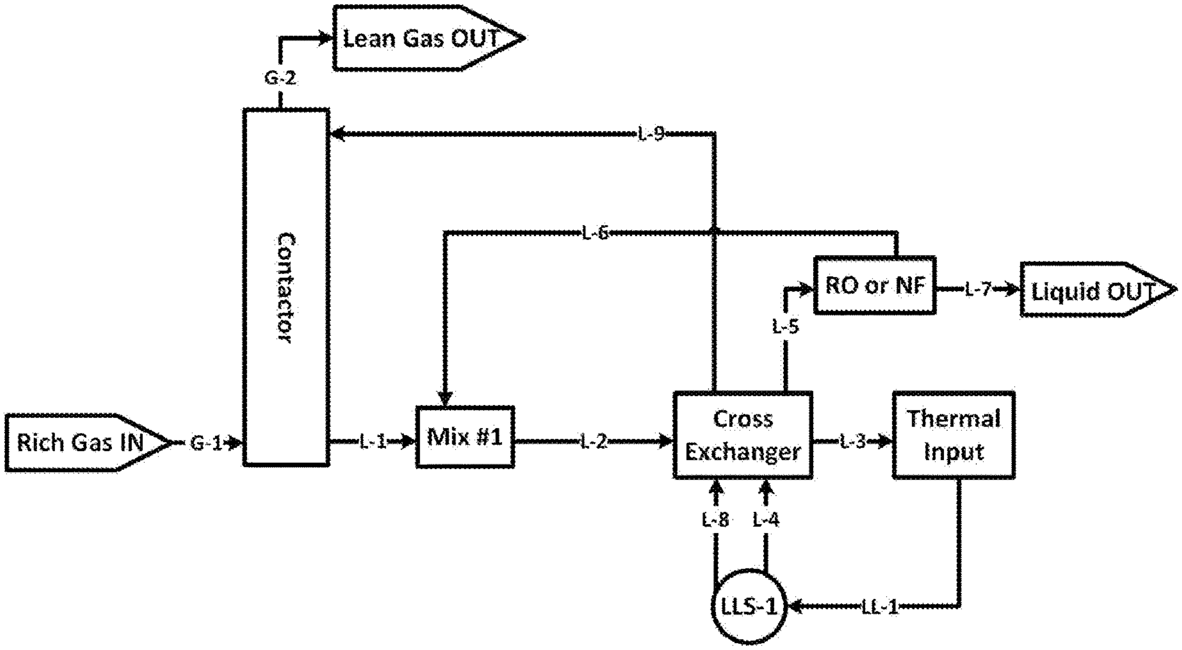
FIG. 12 illustrates a process for separating a vapor from a gas stream using a liquid-liquid phase transitioning desiccant reagent.

FIG. 12: FIG. 1 comprises a process for separating a vapor from a gas stream using a liquid-liquid phase transitioning desiccant reagent.

Figure 13:
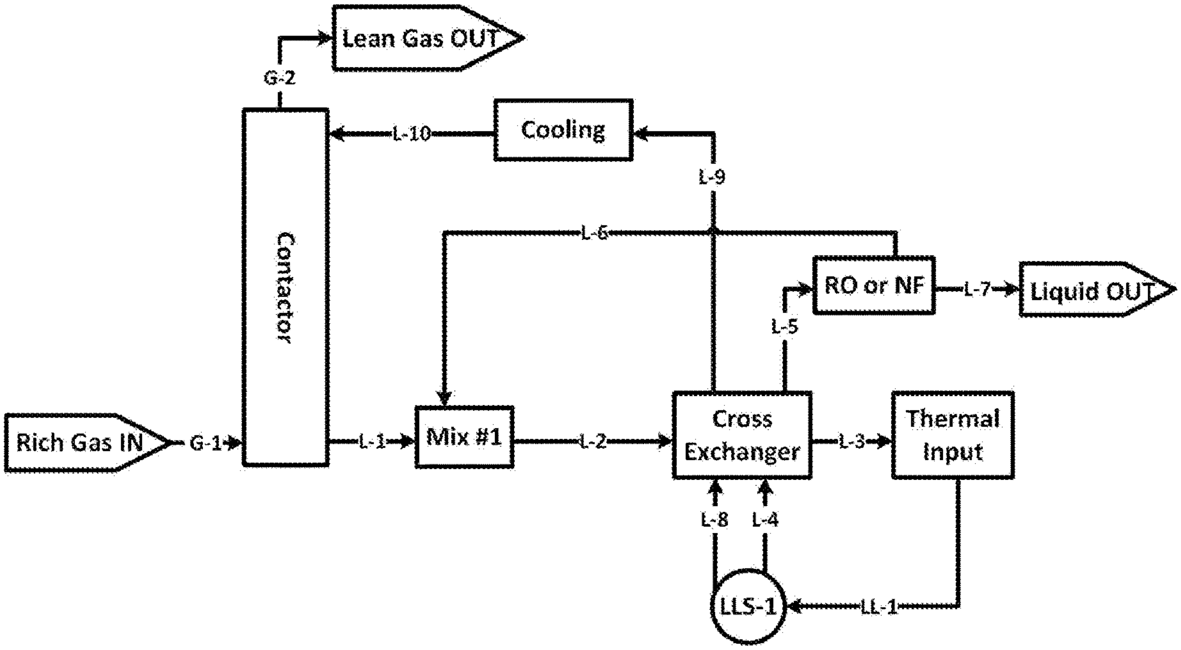
FIG. 13 illustrates a process for separating a vapor from a gas stream using a liquid-liquid phase transitioning desiccant reagent and further comprises a precooling step to cool said liquid-liquid phase transitioning desiccant reagent before or during or after or a combination thereof water vapor absorption.

FIG. 13: FIG. 2 comprises a process for separating a vapor from a gas stream using a liquid-liquid phase transitioning desiccant reagent and further comprises a precooling step to cool said liquid-liquid phase transitioning desiccant reagent before or during or after or a combination thereof water vapor absorption.

Figure Keys for FIGS. 12-13

FIG. 12 Key

| Label in Figure | Description |
|---|---|
| G-1/'Rich Gas IN' | G-1 may comprise a gaseous input into the 'Contactor'. G-1 may comprise a gas 'rich' in a vapor which may be at least in part absorbed by a reagent or solution in the 'Contactor'. G-1, for example, may comprise a gas rich in water vapor. |
| Contactor | The 'Contactor' may comprise an absorption column or other gas-liquid contactor which may enable the absorption of at least a portion of a vapor in at least a portion of a liquid. For example, 'Contactor' may contact G-1 with L-9. For example, may contact G-1 with L-9, wherein L-9 absorbs vapor from G-1, which may result in absorbed vapor rich liquid (L-1) and vapor lean gas (G-2). The 'Contactor' may incorporate methods to prevent losses of liquid desiccant reagent and minimize the presence of liquid desiccant reagent as, for example, an aerosol, in G-2. |
| G-2 | G-2 may comprise a gaseous output from the 'Contactor'. G-2 may comprise a gas 'lean' in a vapor relative to G-1. G-2 may comprise, for example, a gas lean in water vapor. |
| L-1 | L-1 may comprise a liquid desiccant reagent rich in dissolved vapor exiting the 'Contactor'. At least a portion of the liquid desiccant reagent in L-1 comprises a reagent which exhibits a liquid-liquid phase transition with a liquid-liquid phase transition temperature range in a solution comprising the condensed vapor. For example, L-1 may comprise a water-rich liquid desiccant reagent, wherein said reagent possesses a liquid-liquid phase transition with a liquid-liquid phase transition temperature range in a solution comprising water. |
| L-6 | L-6 may comprise retentate produced by 'RO or NF' or other treatment process or a combination thereof. L-6 may comprise recovered or separated or concentrated solution of the liquid desiccant reagent residual in L-5. L-6 may comprise a return stream of the residual liquid desiccant reagent from L-5. If, for example, water vapor is the solvent recovered, L-6 may comprise an aqueous solution of residual liquid desiccant reagent. Mixing L-6 with L-1 may facilitate the liquid-liquid phase transition properties or characteristics of L-2 relative to L-1. For example, mixing L-6 with L-1 may increase the water (or other condensed vapor) concentration in the resulting L-2 solution relative to L-1. For example, L-6 may contain a dissolved salt which may, for example, including, but not limited to, one or more or a combination of the following: decrease the liquid-liquid phase transition temperature, reduce the concentration of water in L-8 or L-9 or L-10, increase the density difference between L-8 and L-4, reduce the enthalpy of liquid-liquid phase transition, or beneficially enhance another liquid-liquid phase transition or vapor absorption property. |

-continued

| Label in Figure | Description |
|---|---|
| Mix #1 | Mix #1 may comprise a mixing device to mix L-6 with L-1 to produce L-2. Mix #1 may re-incorporate residual reagent and water (or other condensed vapor or solvent) into the process from L-5. Mix #1 may add water or other reagent to L-1, forming L-2, which may facilitate a liquid-liquid phase transition in Thermal Input relative to the same process with L-1. Mix #1 may ensure mass balance and prevent loss of reagents. Mixing L-6 with L-1 may facilitate the liquid-liquid phase transition properties or characteristics of L-2 relative to L-1. For example, mixing L-6 with L-1 may increase the water (or other condensed vapor) concentration in the resulting L-2 solution relative to L-1. For example, L-6 may contain a dissolved salt which may, for example, including, but not limited to, one or more or a combination of the following: decrease the liquid-liquid phase transition temperature, reduce the concentration of water in L-8 or L-9 or L-10, increase the density difference between L-8 and L-4, reduce the enthalpy of liquid-liquid phase transition, or beneficially enhance another liquid-liquid phase transition or vapor absorption property. |
| L-2 | L-2 may comprise a solution comprising a combination of L-1 and L-6. L- may comprise a greater wt % concentration of the condensed vapor reagent(s) than L-1. For example, L-2 may comprise a greater water wt % concentration than L-1. L-2 may be pre-heated in the 'Cross Exchanger' to form L-3. |
| L-3 | L-3 may comprise a pre-heated solution of L-2. L-3 may be at or near or less than or slightly less than its liquid-liquid phase transition temperature range. L-3 may be further heated to above its liquid-liquid phase transition temperature in, for example, 'Thermal Input'. |
| Thermal Input | Thermal Input may comprise a heat input source and/or heat exchanger to, for example, heat L-3 to at or above its liquid-liquid phase transition temperature range and enable L-3 to undergo a liquid-liquid phase transition into a multi-liquid phase mixture, LL-1. |
| LL-1 | LL-1 may comprise a multi-liquid phase mixture after a liquid-liquid phase transition in 'Thermal Input'. LL-1 may comprise L-3 at or above its liquid-liquid phase transition temperature. LL-1 may be separated into two or more separate liquid phases in LLS-1. |
| LLS-1 | LLS-1 may comprise a liquid-liquid separation device. LLS-1 may separate LL-1 into two or more liquid phases. For example, LLS-1 may separate LL-1 into a water lean liquid desiccant reagent liquid phase (L-8) and a mostly water liquid phase (L-4), which may comprise LL-1's constituent liquid phases. |
| L-4 | L-4 may comprise a mostly condensed vapor liquid phase separated from LL-1 into a non-contiguously separate liquid phase using LLS-1. Said condensed vapor may comprise one or more or a combination of condensed vapors, which may include, but is not limited to, water vapor or organic solvent vapor. L-4 may be warm in temperature. L-4 may at or near the temperature of LL-1. Due to, for example, its warm temperature, L-4 may be heat exchanged with L-2 in 'Cross Exchanger', pre-heating L-2 to form L-3 and pre-cooling or cooling L-4 to form L-5. L-4 may be heat exchanged in 'Cross Exchanger' simultaneously as L-8. It is important to note L-8 may be non-contiguously separate from L-4 during a heat exchange in 'Cross Exchanger', to, for example, to prevent L-8 from dissolving in L-4 or vise versa. |
| L-8 | L-8 may comprise a condensed vapor-lean liquid desiccant reagent liquid phase separated from LL-1 into a non-contiguously separate liquid phase using LLS-1. Said condensed vapor may comprise one or more or a combination of condensed vapors, which may include, but is not limited to, water vapor or organic solvent vapor. L-8 may be warm in temperature. L-8 may at or near the temperature of LL-1. Due to, for example, its warm temperature, L-8 may be heat exchanged with L-2 in 'Cross Exchanger', pre-heating L-2 to form L-3 and pre-cooling or cooling L-8 to form L-9. L-8 may be heat exchanged in 'Cross Exchanger' simultaneously as L-4. It is important to note L-4 may be non-contiguously separate from L-8 during a heat exchange in 'Cross Exchanger', to, for example, to prevent L-4 from dissolving in L-8 or vise versa. |
| Cross Exchanger | Cross Exchanger may comprise a heat exchanger. Cross Exchanger may comprise a heat exchanger which heat exchanges the inputs and outputs of the liquid-liquid phase transition regeneration step(s) to, for example, recover heat and ensure energy efficiency. Cross Exchanger may involve heat exchanging 'cold' L-2 with 'warm' L-4 and L-8 to produce 'warm' L-3 and 'cold' L-5 and L-9. The Cross Exchanger may heat exchanger L-4 and L-8 as non-contiguously separate liquid phases. |
| L-9 | L-9 may comprise a cooled or pre-cooled solution of L-8. L-9 may comprise a condensed vapor-lean liquid desiccant reagent. For example, L-9 may comprise a water-lean liquid desiccant reagent. L-9 may be transferred to 'Contactor' to absorb vapor. L-9 may undergo further treatment or cooling before entering the 'Contactor'. |
| L-5 | L-5 may comprise a cooled or pre-cooled solution of L-4. L-5 may comprise a solution comprising mostly condensed vapor. L-5 may contain residual liquid desiccant reagent, which, for example, may not have been fully separated in LLS-1 or may be dissolved in L-5. 'RO or NF' may separate said residual liquid desiccant reagent and/or contaminants. L-5 may undergo further treatment, cooling, or heating before or during 'RO or NF'. |
| RO or NF | 'RO or NF' may comprise a separation device to separate L-5 into a retentate or concentrate solution (L-6) and a permeate or nearly pure condensed vapor liquid (L-7). 'RO or NF' may comprise a membrane based process, such as reverse osmosis, nanofiltration, ultrafiltration, or forward osmosis, or a combination thereof. 'RO or NF' additionally or alternatively may comprise other processes, which may include, but are not limited to, one or more or a combination of the following: membrane distillation, filtration, ion exchange, scrubbing, chemical scrubbing, extraction, precipitation, liquid-liquid phase transition, 'salting-out', UV treatment, ozone treatment, water treatment, antiscaling, lubricating, concentration adjustment, or adding makeup reagents. 'RO or NF' may also be employed to separate components or reagents other than or in addition to residual liquid desiccant reagent, such as, for example, including, but not limited to, one or more or a combination of the following: biofoulants, foulants, scalants, degradation products, or contaminants. |
| L-7/'Liquid OUT' | L-7 may comprise treated, nearly pure, or pure or a combination thereof condensed vapor. For example, L-7 may comprise liquid water generated from water vapor in air or other gas stream by the present device. If desired, a portion of L-7 may be recycled or returned to the process, for example, in a similar manner to L-6. |

FIG. 13 Key

| Label in Figure | Description |
|---|---|
| G-1/'Rich Gas IN' | G-1 may comprise a gaseous input into the 'Contactor'. G-1 may comprise a gas 'rich' in a vapor which may be at least in part absorbed by a reagent or solution in the 'Contactor'. G-1, for example, may comprise a gas rich in water vapor. |
| Contactor | The 'Contactor' may comprise an absorption column or other gas-liquid contactor which may enable the absorption of at least a portion of a vapor in at least a portion of a liquid. For example, 'Contactor' may contact G-1 with L-9. For example, may contact G-1 with L-9, wherein L-9 |

-continued

FIG. 13 Key

| Label in Figure | Description |
|---|---|
| | absorbs vapor from G-1, which may result in absorbed vapor rich liquid (L-1) and vapor lean gas (G-2). The 'Contactor' may incorporate methods to prevent losses of liquid desiccant reagent and minimize the presence of liquid desiccant reagent as, for example, an aerosol, in G-2. |
| G-2 | G-2 may comprise a gaseous output from the 'Contactor'. G-2 may comprise a gas 'lean' in a vapor relative to G-1. G-2 may comprise, for example, a gas lean in water vapor. |
| L-1 | L-1 may comprise a liquid desiccant reagent rich in dissolved vapor exiting the 'Contactor'. At least a portion of the liquid desiccant reagent in L-1 comprises a reagent which exhibits a liquid-liquid phase transition with a liquid-liquid phase transition temperature range in a solution comprising the condensed vapor. For example, L-1 may comprise a water-rich liquid desiccant reagent, wherein said reagent possesses a liquid-liquid phase transition with a liquid-liquid phase transition temperature range in a solution comprising water. |
| L-6 | L-6 may comprise retentate produced by 'RO or NF' or other treatment process or a combination thereof. L-6 may comprise recovered or separated or concentrated solution of the liquid desiccant reagent residual in L-5. L-6 may comprise a return stream of the residual liquid desiccant reagent from L-5. If, for example, water vapor is the solvent recovered, L-6 may comprise an aqueous solution of residual liquid desiccant reagent. Mixing L-6 with L-1 may facilitate the liquid-liquid phase transition properties or characteristics of L-2 relative to L-1. For example, mixing L-6 with L-1 may increase the water (or other condensed vapor) concentration in the resulting L-2 solution relative to L-1. For example, L-6 may contain a dissolved salt which may, for example, including, but not limited to, one or more or a combination of the following: decrease the liquid-liquid phase transition temperature, reduce the concentration of water in L-8 or L-9 or L-10, increase the density difference between L-8 and L-4, reduce the enthalpy of liquid-liquid phase transition, or beneficially enhance another liquid-liquid phase transition or vapor absorption property. |
| Mix #1 | Mix #1 may comprise a mixing device to mix L-6 with L-1 to produce L-2. Mix #1 may re-incorporate residual reagent and water (or other condensed vapor or solvent) into the process from L-5. Mix #1 may add water or other reagent to L-1, forming L-2, which may facilitate a liquid-liquid phase transition in Thermal Input relative to the same process with L-1. Mix #1 may ensure mass balance and prevent loss of reagents. Mixing L-6 with L-1 may facilitate the liquid-liquid phase transition properties or characteristics of L-2 relative to L-1. For example, mixing L-6 with L-1 may increase the water (or other condensed vapor) concentration in the resulting L-2 solution relative to L-1. For example, L-6 may contain a dissolved salt which may, for example, including, but not limited to, one or more or a combination of the following: decrease the liquid-liquid phase transition temperature, reduce the concentration of water in L-8 or L-9 or L-10, increase the density difference between L-8 and L-4, reduce the enthalpy of liquid-liquid phase transition, or beneficially enhance another liquid-liquid phase transition or vapor absorption property. |
| L-2 | L-2 may comprise a solution comprising a combination of L-1 and L-6. L- may comprise a greater wt % concentration of the condensed vapor reagent(s) than L-1. For example, L-2 may comprise a greater water wt % concentration than L-1. L-2 may be pre-heated in the 'Cross Exchanger' to form L-3. |
| L-3 | L-3 may comprise a pre-heated solution of L-2. L-3 may be at or near or less than or slightly less than its liquid-liquid phase transition temperature range. L-3 may be further heated to above its liquid-liquid phase transition temperature in, for example, 'Thermal Input'. |

-continued

FIG. 13 Key

| Label in Figure | Description |
|---|---|
| Thermal Input | Thermal Input may comprise a heat input source and/or heat exchanger to, for example, heat L-3 to at or above its liquid-liquid phase transition temperature range and enable L-3 to undergo a liquid-liquid phase transition into a multi-liquid phase mixture, LL-1. |
| LL-1 | LL-1 may comprise a multi-liquid phase mixture after a liquid-liquid phase transition in 'Thermal Input'. LL-1 may comprise L-3 at or above its liquid-liquid phase transition temperature. LL-1 may be separated into two or more separate liquid phases in LLS-1. |
| LLS-1 | LLS-1 may comprise a liquid-liquid separation device. LLS-1 may separate LL-1 into two or more liquid phases. For example, LLS-1 may separate LL-1 into a water lean liquid desiccant reagent liquid phase (L-8) and a mostly water liquid phase (L-4), which may comprise LL-1's constituent liquid phases. |
| L-4 | L-4 may comprise a mostly condensed vapor liquid phase separated from LL-1 into a non-contiguously separate liquid phase using LLS-1. Said condensed vapor may comprise one or more or a combination of condensed vapors, which may include, but is not limited to, water vapor or organic solvent vapor. L-4 may be warm in temperature. L-4 may at or near the temperature of LL-1. Due to, for example, its warm temperature, L-4 may be heat exchanged with L-2 in 'Cross Exchanger', pre-heating L-2 to form L-3 and pre-cooling or cooling L-4 to form L-5. L-4 may be heat exchanged in 'Cross Exchanger' simultaneously as L-8. It is important to note L-8 may be non-contiguously separate from L-4 during a heat exchange in 'Cross Exchanger', to, for example, to prevent L-8 from dissolving in L-4 or vise versa. |
| L-8 | L-8 may comprise a condensed vapor-lean liquid desiccant reagent liquid phase separated from LL-1 into a non-contiguously separate liquid phase using LLS-1. Said condensed vapor may comprise one or more or a combination of condensed vapors, which may include, but is not limited to, water vapor or organic solvent vapor. L-8 may be warm in temperature. L-8 may at or near the temperature of LL-1. Due to, for example, its warm temperature, L-8 may be heat exchanged with L-2 in 'Cross Exchanger', pre-heating L-2 to form L-3 and pre-cooling or cooling L-8 to form L-9. L-8 may be heat exchanged in 'Cross Exchanger' simultaneously as L-4. It is important to note L-4 may be non-contiguously separate from L-8 during a heat exchange in 'Cross Exchanger', to, for example, to prevent L-4 from dissolving in L-8 or vise versa. |
| Cross Exchanger | Cross Exchanger may comprise a heat exchanger. Cross Exchanger may comprise a heat exchanger which heat exchanges the inputs and outputs of the liquid-liquid phase transition regeneration step(s) to, for example, recover heat and ensure energy efficiency. Cross Exchanger may involve heat exchanging 'cold' L-2 with 'warm' L-4 and L-8 to produce 'warm' L-3 and 'cold' L-5 and L-9. The Cross Exchanger may heat exchanger L-4 and L-8 as non-contiguously separate liquid phases. |
| L-9 | L-9 may comprise a cooled or pre-cooled solution of L-8. L-9 may comprise a condensed vapor-lean liquid desiccant reagent. For example, L-9 may comprise a water-lean liquid desiccant reagent. L-9 may be transferred to 'Contactor' to absorb vapor. L-9 may undergo further treatment or cooling before entering the 'Contactor'. For example, L-9 may be cooled in 'Cooling' to form L-10. |
| L-10 | L-10 may comprise a further solution of L-9. L-10 may comprise a condensed vapor-lean liquid desiccant reagent. For example, L-10 may comprise a further cooled water-lean liquid desiccant reagent. L-10 may be transferred to 'Contactor' to absorb vapor. |

-continued

| FIG. 13 Key | |
|---|---|
| Label in Figure | Description |
| L-5 | L-5 may comprise a cooled or pre-cooled solution of L-4. L-5 may comprise a solution comprising mostly condensed vapor. L-5 may contain residual liquid desiccant reagent, which, for example, may not have been fully separated in LLS-1 or may be dissolved in L-5. 'RO or NF' may separate said residual liquid desiccant reagent and/or contaminants. L-5 may undergo furthertreatment, cooling, or heating before or during 'RO or NF'. |
| RO or NF | 'RO or NF' may comprise a separation device to separate L-5 into a retentate or concentrate solution (L-6) and a permeate or nearly pure condensed vapor liquid (L-7). 'RO or NF' may comprise a membrane based process, such as reverse osmosis, nanofiltration, ultrafiltration, or forward osmosis, or a combination thereof. 'RO or NF' additionally or alternatively may comprise other processes, which may include, but are not limited to, one or more or a combination of the following: membrane distillation, filtration, ion exchange, scrubbing, chemical scrubbing, extraction, precipitation, liquid-liquid phase transition, 'salting-out', UV treatment, ozone treatment, water treatment, anti-scaling, lubricating, concentration adjustment, or adding makeup reagents. 'RO or NF' may also be employed to separate components or reagents other than or in addition to residual liquid desiccant reagent, such as, for example, including, but not limited to, one or more or a combination of the following: biofoulants, foulants, scalants, degradation products, or contaminants. |
| L-7/'Liquid OUT' | L-7 may comprise treated, nearly pure, or pure or a combination thereof condensed vapor. For example, L-7 may comprise liquid water generated from water vapor in air or other gas stream by the present device. If desired, a portion of L-7 may be recycled or returned to the process, for example, in a similar manner to L-6. |

FIGS. 12-13 Step-by-Step Description

1) Vapor Absorption: A gas stream rich in a vapor (G-1) may be fed into a gas-liquid contactor or vapor absorber ('Contactor'), where it may be contacted with a condensed or absorbed vapor lean liquid reagent (L-9 or L-10), which may result in a condensed or absorbed vapor rich liquid reagent (L-1) and a gas stream lean in vapor (G-2). Vapor may be absorbed in said liquid reagent at a temperature less than or significantly less than the liquid-liquid phase transition temperature range of said liquid reagent in a solution comprising condensed vapor solvent or liquid.

2) Mixing or Combining with a Second Liquid Stream: L-1 may be mixed with retentate or recovered residual reagents or recirculated condensed vapor or recirculated salt solution or reagents which facilitate liquid-liquid separation or a combination thereof (L-6) in a mixing device (Mix #1), resulting in a solution comprising the components of L-1 and L-6 (L-2). Said resulting solution (L-2) may comprise a greater concentration of condensed vapor. Said resulting solution (L-2) may possess more favorable properties for liquid-liquid phase transitioning or liquid-liquid separation or both compared to L-1.

3) Preheating in Heat Exchanger: L-2 may be preheated in a heat exchange with warm separated liquid phases from the liquid-liquid phase transition and liquid-liquid separation regeneration steps (L-4 and/or L-8) in a heat exchanger ('Cross Exchanger'), which may result in pre-heated L-2 (L-3) and pre-cooled or cooled L-4 and L-8 (L-5 and L-9, respectively). L-3 may be near, at, or above the liquid-liquid phase transition temperature range of L-3.

4) Liquid-Liquid Phase Transition: L-3 may be heated by a heat source (Thermal Input) which may also comprise a heat exchanger and/or, if desirable, additional facilitators for liquid-liquid phase transition. Thermal Input may involve heating L-3 to a temperature at or above a liquid-liquid phase transition temperature range of L-3, which may result in L-3 forming a multi-liquid phase mixture (LL-1) due to a liquid-liquid phase transition.

5) Liquid-Liquid Separation: LL-1 may be separated into two or more separate liquid streams (L-4 and L-8) using a liquid-liquid separation device (LLS-1). LL-1 may comprise two liquid phases, one liquid phase comprising condensed or absorbed vapor lean absorbent and one liquid phase comprising a mostly condensed vapor solution. LLS-1 may separate LL-1 into its constituent liquid phases by means of, including, but not limited to, one or more or a combination of the following: physical property, density, ability of liquids to self-separate, hydrophobicity, hydrophilicity, or coalescer. If desirable, L-8 may undergo further treatment to become even more water lean or to remove liquid-liquid phase transition facilitators (if any), which may be conducted before heat exchanging in the 'Cross Exchanger'.

6) Pre-Cooling or Cooling in Cross Exchanger: L-4 and L-8 may be pre-cooled or cooled by heat exchanging with L-2, which may result in cooler temperature L-4 (L-5) and cooler temperature L-8 (L-9). L-4 and L-8 may be non-contiguously separate before cooling beneath their liquid-liquid phase transition temperature (their liquid-liquid phase transition temperature as a combined mixture or solution) to prevent L-4 and L-8 from dissolving in each other. L-9 may be further cooled using, for example, devices in methods for cooling liquids known in the art, forming cooler temperature L-10, before or during transfer into the Contactor. If desirable, L-9 or L-10 may be further treated to be more water lean or to remove liquid-liquid phase transition facilitators (if any), before the Contactor.

7) Treatment of Mostly Condensed Vapor Solution: L-5 may be treated to remove or separate non-condensed vapor components, which may include, but is not limited to, one or more or a combination of the following: residual absorbent reagent, liquid-liquid phase transition facilitator reagents, liquid-liquid phase separation facilitator reagents, scalants, foulants, degradation products, dissolved gases, or particulates. Said treatment may involve one or more or a combination of water or liquid treatment devices, which may be labeled 'RO or NF' in FIGS. 1 and 2. Said treatment may involve, for example, feeding L-5 into a reverse osmosis or nanofiltration process, which may involve concentrating at least a portion of dissolved non-condensed vapor components and forming a nearly pure or pure condensed vapor liquid stream, which may result in a concentrate or retentate (L-6) and a pure or nearly pure permeate output (L-7).

Example Reagents

Example reagents with one or more or a combination of the properties described herein (for example: liquid-liquid phase transitioning and/or absorbing water vapor [or other condensable vapor] from gas streams) may include, but are not limited to, one or more or a combination of the following:

- Glycol ethers
- Glycol ether polymers
  - Polyethylene Glycol Dimethyl Ether
  - Polyethylene Glycol Monomethyl Ether Glycol Polymers
  Polypropylene Glycol
  Polyethylene Glycol
  Polymers Combining PEG and PPG
    PEG-PPG-PEG
    PPG-PEG-PPG
    'Rand' Polymers
Ionic Liquids
Ethers
  Glycol Ethers
  Butoxyethanol
  Diethylene Glycol Hexyl Ether
Reagents with a liquid-liquid phase transition in water
Reagents with a liquid-liquid phase transition in a solvent
Reagents with a liquid-liquid phase transition in a volatile solvent
Reagents with a liquid-liquid phase transition in a solution comprising condensed or absorbed vapor Notes Note: Temperatures of operation may include, but are not limited to, greater than, or less than, or equal to, one or more or a combination of the following: −100° C., −90° C., −80° C., −70° C., −60° C., −50° C., −40° C., −30° C., −20° C., −10° C., −5° C., 0° C., 5° C., 10° C., 15° C., 20° C., 25° C., 30° C., 35° C., 40° C., 45° C., 50° C., 55° C., 60° C., 65° C., 70° C., 75° C., 80° C., 85° C., 90° C., 95° C., 100° C., 105° C., 110° C., 120° C., 130° C., 140° C., 150° C., 175° C., 200° C., 250° C., 300° C., 400° C., 500° C., 750° C., 1000° C.

Note: Pressures of operation may include, but are not limited to, greater than, or less than, or equal to, one or more or a combination of the following: 0.001 atm, 0.01 atm, 0.05 atm, 0.1 atm, 0.15 atm, 0.20 atm, 0.25 atm, 0.3 atm, 0.35 atm, 0.4 atm, 0.45 atm, 0.5 atm, 0.6 atm, 0.7 atm, 0.8 atm, 0.9 atm, 1.0 atm, 1.1 atm, 1.2 atm, 1.3 atm, 1.4 atm, 1.5 atm, 1.6 atm, 1.7 atm, 1.8 atm, 1.9 atm, 2.0 atm, 2.1 atm, 2.2 atm, 2.3 atm, 2.4 atm, 2.5 atm, 2.6 atm, 2.7 atm, 2.8 atm, 2.9 atm, 3.0 atm, 3.5 atm, 4.0 atm, 5.0 atm, 6.0 atm, 7.0 atm, 8.0 atm, 9.0 atm, 10 atm, 11 atm, 12 atm, 13 atm, 14 atm, 15 atm, 20 atm, 25 atm, 30 atm, 35 atm, 40 atm, 45 atm, 50 atm, 55 atm, 60 atm, 65 atm, 70 atm, 75 atm, 80 atm, 85 atm, 90 atm, 100 atm, 105 atm, 110 atm, 115 atm, 120 atm, 130 atm, 140 atm, 150 atm, 160 atm, 170 atm, 180 atm, 190 atm, 200 atm, 250 atm, 300 atm, 400 atm, 500 atm, 750 atm, 1000 atm, 2000 atm, 5000 atm, 10000 atm Note: Concentrations of vapor may include, but are not limited to, greater than, or less than, or equal to, one or more or a combination of the following: 0%, 0.001%, 0.01%, 0.05% 0.1%, 0.15%, 0.2%, 0.25%, 0.3%, 0.35%, 0.4%, 0.5%, 0.6%, 0.7%, 0.8%, 0.9%, 1%, 1.5%, 2%, 2.5%, 3%, 3.5%, 4%, 4.5%, 5%, 5.5%, 6%, 6.5%, 7%, 7.5%, 8%, 8.5%, 9%, 9.5%, 10%, 11%, 12%, 13%, 14%, 15%, 16%, 17%, 18%, 19%, 20%, 25%, 30%, 35%, 40%, 45%, 50%, 55%, 60%, 65%, 70%, 75%, 80%, 85%, 90%, 95%, 99%, 100%

Note: Concentrations may include, but are not limited to, one or more or a combination of the following: 0%, 0.001%, 0.01%, 0.05% 0.1%, 0.15%, 0.2%, 0.25%, 0.3%, 0.35%, 0.4%, 0.5%, 0.6%, 0.7%, 0.8%, 0.9%, 1%, 1.5%, 2%, 2.5%, 3%, 3.5%, 4%, 4.5%, 5%, 5.5%, 6%, 6.5%, 7%, 7.5%, 8%, 8.5%, 9%, 9.5%, 10%, 11%, 12%, 13%, 14%, 15%, 16%, 17%, 18%, 19%, 20%, 25%, 30%, 35%, 40%, 45%, 50%, 55%, 60%, 65%, 70%, 75%, 80%, 85%, 90%, 95%, 99%, 100%

Note: Concentrations of liquid phase reagents may include, but are not limited to, one or more or a combination of the following: 0%, 0.001%, 0.01%, 0.05% 0.1%, 0.15%, 0.2%, 0.25%, 0.3%, 0.35%, 0.4%, 0.5%, 0.6%, 0.7%, 0.8%, 0.9%, 1%, 1.5%, 2%, 2.5%, 3%, 3.5%, 4%, 4.5%, 5%, 5.5%, 6%, 6.5%, 7%, 7.5%, 8%, 8.5%, 9%, 9.5%, 10%, 11%, 12%, 13%, 14%, 15%, 16%, 17%, 18%, 19%, 20%, 25%, 30%, 35%, 40%, 45%, 50%, 55%, 60%, 65%, 70%, 75%, 80%, 85%, 90%, 95%, 99%, 100%

Note: Cooling or cooling sources or cooling devices may include, but are not limited to, one or more or a combination of the following: water, air, chilling, chiller, refrigeration cycle, evaporative cooling, enthalpy of fusion, liquid-liquid phase transition, liquid-liquid phase transition temperature adjustment, 'salting-out', cold water, geothermal, cryogenic, gas depressurization, peltier, endothermic reaction, refrigeration device, heat pump, phase transition, gas-liquid phase transition, solid-liquid phase transition, solid-gas phase transition.

Note: Vapors may include, but are not limited to, one or more or a combination of the following: water vapor, organic solvent vapor, ammonia vapor Note: Heat sources for thermal input may include, but are not limited to, one or more or a combination of the following: solar thermal, industrial process heat, waste heat, radiative heat, natural gas, combustion of one or more fuels, liquid-liquid phase transition, heat pump, geothermal, electricity, resistive heating, curtailing energy, nuclear heat, ocean thermal heat, exhaust heat, microwave heat, radiation heat, exothermic reaction heat, exothermic phase transition heat Note: Liquid-liquid separation devices may include, but are not limited to, one or more or a combination of the following: decanter, coalescer, filter, separatory funnel, centrifuge, baffles, packing material, membrane Note: Further treatment steps or 'RO or NF' may include, but are not limited to, one or more or a combination of the following: membrane based process, forward osmosis, reverse osmosis, nanofiltration, ultrafiltration, membrane distillation Note: Pumps and/or energy recovery devices may not be shown in the figures, although may be included in any construction of the systems shown in FIG. 1 and FIG. 2.

Note: Mixing devices may include, but are not limited to, one or more or a combination of the following: static mixing, continuous mixer, batch mixer, continuous stirred reactor, stirred reactor, rotary reactor, reactor, mixer, valve, coupler, T-coupler Note: Gas streams may include, but are not limited to, one or more or a combination of the following: air, natural gas, hydrogen, ammonia, carbon dioxide, carbon monoxide, synthesis gas, hydrocarbons, refinery gases, hydrogen sulfide, biogas landfill gas, manufacturing facility, chemical production facility, textiles facility, dyeing facility Note: Contactor may employ a gas-liquid membrane contactor if desired. If desired contactor may employ an absorption tower, which may include. But is not limited to, absorption columns or contactors employed for gas absorption known in the art.

Note: Thermal Input may be integrated with the Cross Exchanger.

Note: Cross exchanger and/or other heat exchangers may comprise more or less heat exchangers than shown in the Figures.

Note: Storage tanks may be employed. Each liquid stream shown in FIGS. 1 and 2 may be stored in storage tanks. Storage of, for example, L-9, or L-10, or L-1, or L-6, or L-2, or L-5 may enable the aspects of process to run when certain other aspects of the process are off or unavailable. For example, Thermal Input may be temporarily 'off', while stored L-9 and/or L-5 enable the Contactor and/or RO or NF to continue to operate. For example, RO or NF may be off, although the rest of the process may operate and accumulate L-5 in a storage vessel until RO or NF return to operation. For example, One component of the process may operate at a greater capacity continuously or under certain conditions, which may result in certain components of the process over producing relative to other components of the process. For example, the Contactor may absorb more water than can be regenerated by the Thermal Input or RO or NF or both. For example, the Contactor may temporarily absorb more water than can be regenerated by the Thermal Input or RO or NF or both, and L-1 or L-6 or L-2 may be temporarily stored and L-10 may be released from storage to enable the process to continue operating even if Thermal Input or RO or NF cannot regenerate at the same rate. For example, the process may be intentionally designed to have certain components operate under greater relative capacity under certain conditions and lesser relative capacity during certain different conditions. For example, it may be more humid at night than during the day, which may enable greater production capacity or rate from the Contactor during the night and lesser during the day, while Thermal Input capacity may be the same continuously or greater during the day and lesser during the night, and/or while RO or NF runs the same continuously or greater during the day and lesser during the night. Liquid storage may enable the balancing of these capacity loads. Similarly, Liquid Storage may enable the present invention to operate certain components only when energy is least expensive or under demand response, for, for example, an electric power source or utility.

Note: 'Thermal Input' may be integrated with the Cross Exchanger and 'Cooling'. 'Thermal Input' may comprise a refrigeration cycle or heat pump which may further cool L-5 and L-9, while further heating L-3.

Note: In embodiments separating water vapor from gas streams, the liquid desiccant reagent may be referred to as a 'non-water reagent'. Other non-water reagents may be employed, which may include, but are not limited to, salts. Said 'other non-water reagents' may be distinguishable from the liquid desiccant reagent(s), for example, because said 'other non-water reagents' may remain primarily in the aqueous liquid phase or mostly water liquid phase during a liquid-liquid phase transition.

Note: Mixing L-6 with L-1 may facilitate the liquid-liquid phase transition properties or characteristics of L-2 relative to L-1. For example, mixing L-6 with L-1 may increase the water (or other condensed vapor) concentration in the resulting L-2 solution relative to L-1. For example, L-6 may contain a dissolved salt which may, for example, including, but not limited to, one or more or a combination of the following: decrease a liquid-liquid phase transition temperature, reduce a concentration of water in L-8 or L-9 or L-10, reduce the concentration of liquid desiccant reagent in L-4 or L-5, increase a density difference between L-8 and L-4, reduce a enthalpy of liquid-liquid phase transition, or beneficially enhance another liquid-liquid phase transition or vapor absorption property. If desirable, 'RO or NF' may prevent or mostly prevent said salt from entering L-7. If desirable, due to solubility characteristics, minimal salt may be present in L-8 or L-9 or L-10.

Note: Condensed vapor or absorbed vapor may be used interchangeably. Condensed vapor or absorbed vapor may refer to a liquid comprising a reagent which was formally at a gas phase or may have been absorbed or condensed from a gas phase into a liquid phase.

Note: Liquid-liquid phase transition facilitator reagents may include, but are not limited to, salts, or inorganics, or organics, or other reagents which may improve one or more or a combination of properties which enable or facilitate liquid-liquid phase transition. Said properties may include, but are not limited to, liquid-liquid phase transition temperature range, liquid-liquid phase transition temperature, composition of the constituent liquid phases, condensed vapor concentration in condensed vapor lean absorbent liquid phase, residual absorbent concentration in mostly condensed vapor liquid phase, enthalpy of liquid-liquid phase transition, toxicity, volatility, flammability, cost, corrosion inhibitors, degradation inhibitors, antiscalants, anti-foulants, anti-biofoulants, oxygen scavengers, pH buffers, density, hydrophobicity, hydrophilicity, surface tension, self-attraction forces, repelling forces, coalescing properties, viscosity, or a combination thereof.

Note: Liquid-liquid phase separation facilitator reagents may include, but are not limited to, salts, or inorganics, or organics, or other reagents which may improve one or more or a combination of properties which enable or facilitate liquid-liquid phase separation. Said properties may include, but are not limited to, density, hydrophobicity, hydrophilicity, surface tension, self-attraction forces, repelling forces, coalescing properties, viscosity, or a combination thereof.

1) absorbing water vapor from the air in a water lean, single liquid phase solution, forming a water rich combined single liquid phase solution.

2) The water rich combined single liquid phase solution is heated above a LCST to form a multi-liquid phase mixture, wherein one of the liquid phases comprises mostly water and one of the liquid phases comprises mostly organic. The two liquid phases are separated.

3) Water may be further separated from the mostly water liquid phase and is the 'output' of the process. The mostly organic liquid phase is returned to step 1 as it comprises regenerated 'water lean, single liquid phase solution'.

Representative Embodiments

1. A process comprising:

absorbing water vapor in a liquid system comprising one or more physical solvents, wherein said one or more physical solvents comprise one or more liquid phases in the liquid system; and increasing the number of liquid phases in said liquid system by changing one or more system conditions wherein the temperature of said liquid system is greater than −30° C. and less than 500° C. during the changing and wherein at least one liquid phase in said liquid system comprises absorbed water vapor; and separating the at least one liquid phase comprising absorbed water vapor from said liquid system.

2. The process of Embodiment 1 wherein the one or more liquid solvents is non-aqueous.

3. The process of Embodiment 1 wherein the one or more liquid solvents comprises an organic solvent.

4. The process of Embodiment 1 wherein increasing the number of liquid phases in said liquid system by changing one or more system conditions comprises increasing the temperature of the liquid system above a LCST.

5. The process of Embodiment 1 further comprising separating water from the at least one liquid phase comprising absorbed water vapor.

6. The process of Embodiment 1 wherein the increasing the number of liquid phases in said liquid system comprises increasing the number of liquid phases from one liquid phase to two or more liquid phases.

7. The process of Embodiment 1 which further comprises a separation step prior to said absorbing step.

8. The process of Embodiment 1 wherein said changing the number of liquid phases in said liquid system results in one or more of the following: (1) change in the solubility of one or more gases; (2) change in the partial pressure of one or more gases; (3) change in the partial pressure of one or more gases to facilitate the desorption of one or more gases; (4) change in the partial pressure of one or more gases to facilitate the absorption of one or more gases; (5) release heat; (6) absorb heat; (7) change the solubility of one or more gases relative to the solubility of one or more other gases; or (8) a combination thereof.

9. The process of Embodiment 1 wherein two or more steps occur simultaneously.

10. The process of Embodiment 1 wherein the temperature of said liquid system is greater than −10° C. and less than 200° C. during the changing.

11. A process for separating water from a gas stream comprising:

absorbing water vapor in an non-water reagent to form a single phase LCST solution; and heating the single phase LCST solution above the LCST to form a first phase comprising water and a second phase comprising a non-water reagent; and separating the first phase from the second phase.

12. The process of Embodiment 11 wherein the non-water reagent comprises an organic solvent.

13. The process of Embodiment 11 further comprising absorbing water vapor in the second phase.

14. The process of Embodiment 11 further comprising treating said first phase comprising water and a second phase with reverse osmosis, nanofiltration, ultrafiltration, osmotically assisted reverse osmosis, forward osmosis, or a combination thereof.

15. The process of Embodiment 11 further comprising concentrating at least a portion of residual non-water reagent from said first phase comprising water with reverse osmosis, nanofiltration, ultrafiltration, osmotically assisted reverse osmosis, forward osmosis, or a combination thereof.

16. The process of Embodiment 15 wherein said concentrating comprises forming a retentate comprising a greater concentration of non-water reagent than said first phase and a permeate comprising a lesser concentration of non-water reagent than said first phase.

17. The process of Embodiment 16 wherein said permeate comprises greater than 95 weight percent, or 96 weight percent, or 97 weight percent, or 98 weight percent, or 99 weight percent water.

18. The process of Embodiment 15 further comprising adding said retentate to said single phase LCST solution before or during said heating the single phase LCST solution above the LCST.

19. The process of Embodiment 18 wherein said retentate addition results in a solution with a lesser LCST than said single phase LCST solution.

20. The process of Embodiment 18 wherein said retentate addition results in a solution with a greater LCST than said single phase LCST solution.

21. The process of Embodiment 11 wherein said first phase comprising water also comprises a dissolved salt 22. The process of Embodiment 21 wherein the presence of said dissolved salt facilitates said separation by enhancing the density difference between the first and second phases, or by reducing the LCST, or by reducing the concentration of non-water reagent in said phase comprising water, or by reducing the concentration of water in said phase comprising non-water reagent, or by increasing the difference in hydrophobicity between the first and second phases, or by increasing the difference in hydrophilicity between the first and second phases, or by increasing the interfacial tension between the first and second phases, or by a combination thereof.

23. The process of Embodiment 21 further comprising concentrating at least a portion of said dissolved salt or residual non-water reagent or both from said first phase comprising water with reverse osmosis, nanofiltration, ultrafiltration, osmotically assisted reverse osmosis, forward osmosis, or a combination thereof.

24. The process of Embodiment 21 wherein said concentrating comprises forming a retentate comprising a greater concentration of dissolved salt or non-water reagent or both than said first phase and a permeate comprising a lesser concentration of dissolved salt or non-water reagent or both than said first phase.

25. The process of Embodiment 24 wherein said permeate comprises greater than 95 weight percent, or 96 weight percent, or 97 weight percent, or 98 weight percent, or 99 weight percent water.

26. The process of Embodiment 24 further comprising adding said retentate to said single phase LCST solution before or during said heating the single phase LCST solution above the LCST.

27. The process of Embodiment 26 wherein said retentate addition results in a solution with a lesser LCST than said single phase LCST solution.

28. The process of Embodiment 26 wherein said retentate addition results in a solution with a greater LCST than said single phase LCST solution.

29. The process of Embodiment 11 wherein said heating is conducted at a temperature greater than the boiling point of one of the liquid phases at atmospheric pressure.

30. The process of Embodiment 11 wherein said heating is conducted under pressure or in a closed environment to prevent evaporation, or vaporization, or boiling of a liquid phase.

What is claimed:

1. A process comprising:

absorbing an acid gas into a first solution comprising an acid gas-lean diammonium phosphate to form a second solution comprising an acid gas-rich diammonium phosphate; and desorbing at least a portion of an acid gas from the second solution comprising an acid gas-rich diammonium phosphate to form a solution comprising an acid gas-lean diammonium phosphate; wherein said acid gas is selected from the group consisting of $CO_2$, or $H_2S$, or $SO_2$, or HF, or $NO_2$, or any combination thereof.

2. The process of claim 1 which further comprises employing the formed solution comprising an acid gas-lean diammonium phosphate in the absorbing step.

3. The process of claim 1, wherein the second solution is agitated during the desorbing.

4. The process of claim 1, wherein the second solution is heated during the desorbing to facilitate acid gas desorption.

5. The process of claim 1, wherein the desorbed acid gas is recirculated or sparged into the second solution through a pressure release valve to facilitate further acid gas desorption.

6. The process of claim 1, wherein the desorbed acid gas undergoes further treatment, compression, or both.

7. The process of claim 6, wherein the further treatment comprises removal of at least a portion of water vapor from the desorbed acid gas.

* * * * *